(12) United States Patent
Nielsen

(10) Patent No.: US 6,591,011 B1
(45) Date of Patent: Jul. 8, 2003

(54) PICTURE PROCESSING METHOD AND APPARATUS

(75) Inventor: Frank Nielsen, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/440,382

(22) Filed: Nov. 15, 1999

(30) Foreign Application Priority Data

Nov. 16, 1998 (JP) ............................................. 10-325641
Oct. 5, 1999 (JP) ............................................. 11-284955

(51) Int. Cl.$^7$ ............................ G06K 9/66; G06K 9/68; G06K 9/62; G06K 9/32
(52) U.S. Cl. ...................... 382/218; 382/194; 382/225; 382/295; 382/296; 382/298
(58) Field of Search ................................ 382/190, 192, 382/194, 195, 203, 205, 209, 217, 218, 225, 295, 296, 297, 298; 358/1.9; 707/6

(56) References Cited

U.S. PATENT DOCUMENTS 6,006,226 A * 12/1999 Cullen et al. .................... 707/6
6,111,983 A * 8/2000 Fenster et al. ............... 382/203
6,348,980 B1 * 2/2002 Cullen et al. ................. 358/1.9

OTHER PUBLICATIONS

S. Irani & P. Raghavan, "Combinatorial and Experimental Results for Randomized Point Matching Algorithms," Proceedings of 12th Annual ACM Symposium on Computational Geometry, May 1996, pp. 68–77.

A. Efrat & M. Katz, "Computing Fair and Bottleneck Matchings in Geometric Graphs," Proceedings—7th Annual Internet Symposium on Algorithms Computing, Dec. 1996, pp. 115–125.

D. Mount et al., "Improved Algorithms for Robust Point Pattern Matching and Applications to Image Registration," Proceedings of 14th Annual ACM Symposium on Computational Geometry, Jul. 1998, 155–164.

T. Akutsu et al., "Distribution of Distances and Triangles in a Poing Set and Algorithms for Computing the Largest Common Point Sets," Discrete and Computational Geometry, vol. 20, Sep. 1998, pp. 307–331.

M. Gavrilov et al., "Geometric Pattern Matching: A Performance Study," Proceedings of the 15th Symposium of Computational Geometry, Jun. 1999, pp. 79–85.

D. Cardoze et al., "Pattern Matching for Spatial Point Sets," FOCS: IEEE Symposium on Foundation of Computer Science, Nov. 1998, pp. 156–165.

M. Hagedoorn and R. Veltkamp, "A General Method for Partial Point Set Matching," Proceedings of the 13th Annual Symposium on Computational Geometry, Jun. 1997, pp. 406–408.

(List continued on next page.)

Primary Examiner—Mehrdad Dastouri
(74) Attorney, Agent, or Firm—Bell, Boyd & Lloyd LLC

(57) ABSTRACT

A method and apparatus for processing plural pictures to generate a synthesized picture, in which plural images are synthesized by application of a geometrical model. An image processing apparatus 10 extracts feature points from each of two or more images. Feature points of one of the images and those of the other image or images are compared to each other to effect matching. Based on the results of this matching, computations are conducted to change the relative position of the one and the other images to synthesize the two or more images.

12 Claims, 35 Drawing Sheets

OTHER PUBLICATIONS

M.D. Atkinson, An Optimal Algorithm of Geometrical Congruence, Journal of Algorithms, vol. 8, No. 2, Jun. 1987, pp. 159–172.

H. Alt et al., "Congruence, Similarity, and Symmetries of Geometric Objects," Discrete & Computational Geometry, vol. 3, Sep. 1988, pp. 237–256.

E. Sculte, "Symmetry of Polytopes and Polyhedra," Chapter 16, *Handbook of Discrete and Computational Geometry*, Jul. 1997, pp. 311–330.

D.E. Knuth et al., "Fast Pattern Matching in Strings," SIAM Journal on Computing, vol. 6, No. 2, Jun. 1977, pp. 323–350.

M.J. Atallah, "On Symmetry Detections," IEEE Transactions on computers, vol. C–34, No. 7, Jul. 1985, pp. 663–666.

S. Iwanowski, "Testing Approximate Symmetry in the Plane is NP–Hard," Theoretical Computer Science, vol. 80, May 1991, pp. 227–262.

R. Cole & R. Hariharan, "Tree Pattern Matching and Subset Matching in Randomized O($n\log^3 m$) Time," Proceedings of the 29th Annual ACM Symposium on Theory of Computing, May 1997, pp. 66–75.

R. Cole & R. Hariharan, "Tree Pattern Matching and Subset Matching in Randomized O($n\log^3 m$) Time," Proceedings of Tenth Annual ACM–SIAM Symposium on Discrete Algorithms, Jan. 1999, pp. 245–254.

J.E. Hopcroft & R.E. Tarjan, A V log V Algorithm for Isomorphism of Triconnected Planar Graphs, Journal of Computer and System Sciences, vol. 7, Jun. 1973, pp. 323–331.

S. Bespamyatnikh, "An Efficient Algorithm for the Three–Dimensional Diameter Problem," Proceedings of 9th ACM–SIAM Symposium on Discrete Algorithms, Jan. 1998, pp. 137–146.

J. Sprinzak & M. Werman, "Affine Point Matching," Pattern Recognition Letters, vol. 15, Apr. 1994, pp. 337–339.

X. Jiang et al., "Detection of Rotational and Involutional Symmetries and Congruity of Polyhedra," The Visual Computer, vol. 12, No. 4, Apr. 1996, pp. 193–201.

J. Bentley & M. Shamos, "Divide–and–Conquer in Multi-dimensional Space," Proceedings of the 8th Annual ACM Symposium on Theory of Computing, May 1976, pp. 220–230.

H. Lenhof & M. Smig, "Sequential and Parallel Algorithms for the κ Closest Pairs Problem," International Journal of Computational Geometry & Applications, vol. 5, No. 3. 1995, pp. 273–288.

R. Seidel, "Constructing Higher–Dimensional Convex Hulls at Logarithmic Cost Per Face," Proceedings of 18th Annual ACM Symposium on Theory of Computing, May 1986, pp. 404–413.

B. Chazelle, "An Optimal Convex Hull Algorithm in Any Fixed Dimension," Discrete & Computational Geometry, vol. 10, 1993, pp. 377–409.

P.M. Vaidya, "An O(n log n) Algorithm for the All–nearset-–Neighbors Problem," Discrete Computational Gemotry, vol. 4, 1989, pp. 101–115.

P. Heffernan & S. Schirra, "Approximate Decision Algorithms for Point Set Congruence," Computational Geometry—Theory & Applications, vol. 4, 1994, pp. 137–156.

M. Goodrich et al., "Practical Methods for Approximate Geometric Pattern Maching Under Rigid Motions (Preliminary Version)," Proceedings of the 10 th Annual ACM Symposium on Computational Geometry, Jun. 1994, pp. 103–112.

T. Chan, "On Enumerating an Selecting Distances," In Proceedings of Computational Geometry, 1998, pp. 279–286.

P. Gupta et al., "On Intersection Searching Problems Involving Curved Objects," Proceedings of 4th Annual Scandinavian Workshop on Algorithm Theory, vol. S24, 1994, pp. 183–194.

P. Gupta et al., "Further Results on Generalized Intersection Searching Problems: Counting, Reporting, and Dynamization," Journal of Algorithms, vol. 19, 1995, 282–317.

T. Akutsu and. M.M. Halldorsson, "On the Approximation of Largest Common Subtrees Ad Largest Common Point Sets," Proceedings of 5th Annual International Symposium on Algorithm Computing, vol. 834 of the Lecture Notes in Computational Science, 1994, pp. 405–413.

Y. Lamdan & H. Wolfson, "Geometric Hashing: A General & Efficient Model–Based Recognition Scheme," Proceedings of the 2nd International Conference on Computer Vision, 1988, pp. 238–249.

Y. Lamdan et al., "Object Recognition by Affine Invariant Matching," Proceedings of IEEE International Conference on Computer Vision, 1988, pp. 334–344.

Y. Lamdan & H. Wolfson, "On the Error Analysis of 'Geometric Hashing'," Proceedings of the IEEE International Conference on Computer Vision Pattern Recognition, 1991, pp. 22–27.

J. Köbler et al., *The Graph Isomorphism Problem: Its Structural Complexity*, Birkhäuser, 1993.

\* cited by examiner

1: H = Id {This is $A_{LG}$. 2}
2: while not found a $(\alpha,\varepsilon)$-matching homography H do
3:   Draw at random the k-tuple $P_1$ : k = $|P_1|$ points of $S_1$
4:   for all k-tuple $P_2$ : k = $|P_2|$ points of $S_2$ do
5:     for all permutations $P'_2$ or $P_2$ do
6:       Compute the homography H that perfectly matches tuple $P_1$ to tuple $P'_2$
7:       if H is a $(\alpha,\varepsilon)$-matching then
8:         if the characteristics of matched points correlates satisfactorily then
9:           Stop
10:         end if
11:       end if
12:     end for
13:   end for
14: end while

FIG.9

1: H = Id {This is $A_{LG}$. 2' : } | GEOMETRIC FILTERING |
2: while not found a $(\alpha,\varepsilon)$-matching homography H do
3:   Draw at random a k-tuple $P_1 = (L_1,...,L_k) : k = |P_1|$ points of $S_1$
4:     for all | Feature point $R_1$ in $P_2$ | do
5:       for all | Feature point $R_2$ in Ring($R_1,d_2(L_1,L_2) - \varepsilon/2,\varepsilon$) | do
6:         for all ⎡...⎤ do
7:           for all | Feature point $R_k$ in Ring($R_{k-1},d_2(L_{k-1},L_k) - \varepsilon/2,\varepsilon$) | do
8:             for all permutations $P'_2$ or $P_2$ do
9:               Compute the homography H that perfectly matches tuple $P_1$ to tuple $P'_2$
10:              if H is a $(\alpha,\varepsilon)$-matching then
11:                if the characteristics of matched points correlates satisfactorily then
12:                  Stop
13:                end if
14:              end if
15:            end for
16:          end for
17:        end for
18:      end for
19:    end for
20: end while

FIG.11

1: H = Id {This is A_LG. 3. Two randomization steps coupled with  geometric filtering .}
2: while not found a ($\alpha,\varepsilon$)-matching homography H do
3:   Choose r points S'$_1$ from S$_1$
4:     Draw at random a k-tuple P$_1$ from S'$_1$
5:     for all k-tuple P$_2$ : k = |P$_2$| points of  S$_2$(P$_1$)  do
6:       for all permutations P'$_2$ or P$_2$ do
7:         Compute the homography H that perfectly matches tuple P$_1$ to tuple P'$_2$
8:         if S'$_1$ is a ($\lambda,\varepsilon$)-match in S$_2$ then
9:           if S$_1$ is a ($\alpha,\varepsilon$)-match in S$_2$ then
10:            if the characteristics of matched points correlates satisfactorily then
11:              Stop
12:            end if
13:          end if
14:        end if
15:      end for
16:    end for
17: end while

FIG.12

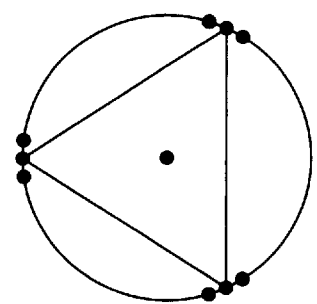
FIG.24
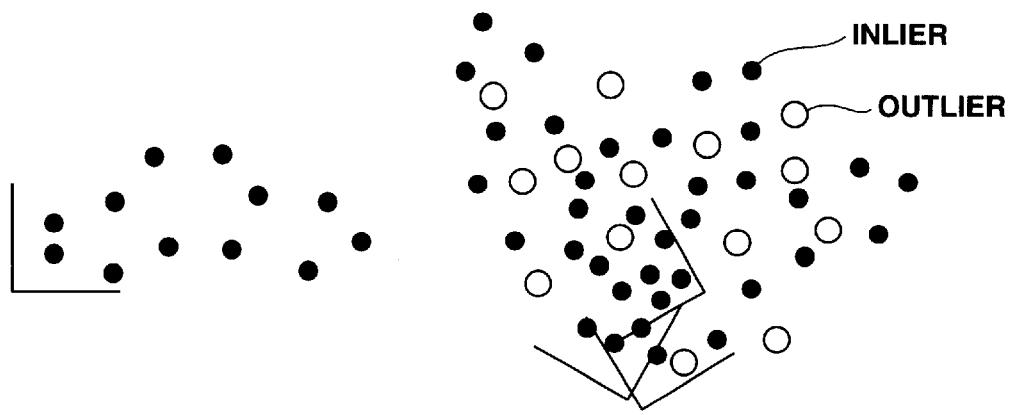
FIG.25A  FIG.25B

FULL
PACKET  VACANT  PRE-ADJUSTED
         PACKET   PACKET

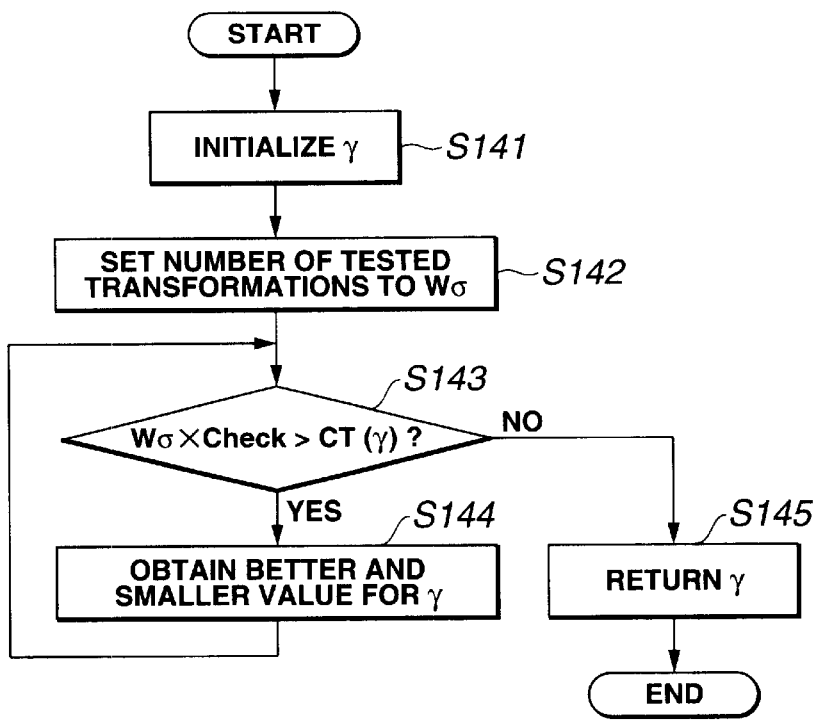
FIG.32
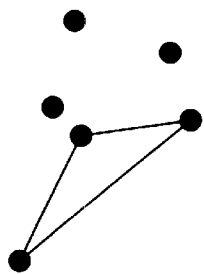 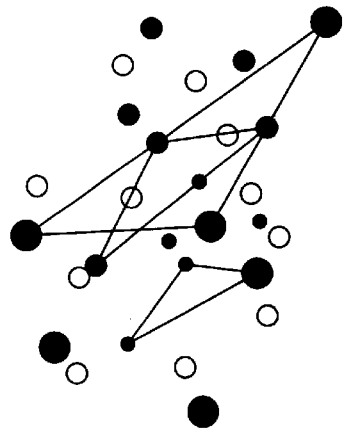
FIG.33A  FIG.33B

PICTURE PROCESSING METHOD AND APPARATUS

BACKGROUND OF THE INVENTION

1. Field of the Invention

This invention relates to a method and apparatus for processing plural pictures to generate a synthesized picture.

2. Description of the Related Art

In keeping up with improvement in computer performance, a wide variety of processing algorithms have been developed in many technical fields to yield tremendous results. Among these image processing techniques, pattern matching is stirring up notice.

The problem of pattern matching, in case the coordinates of points of point sets are more or less inaccurate, as in feature points afforded by e.g., pleissey corner detection or Kanade Lucas Tomari (so called KLT) corner detection algorithm in two point sets $S=\{S_1, \ldots, S_n\}$ and $Q=\{Q_1, \ldots, Q_m\}$ in a Euclid d-dimensional space $E^d$, having different densities. What is to be done in such case is to discriminate inliers, as matched points, from outliers, as non-matched points.

Given a transformation T, accuracy of the matching can be calculated using the Haussdorf distance in percent representation. That is, with the so-called n-k outlier effect removed, by employing this Haussdorf distance, matching accuracy is given as shown in the following equation (1):

$$h_k(\{S, Q\}) = \min_{kS \in S} \min_{Q \in Q} d(S, Q) \quad (1).$$

In the above equation (1), mink means returning the least kth element, and $d(\cdot, \cdot)$ is a distance function. As stated in "A. Efrat and M. J. Katz, Computing Fair and Bottleneck Matchings in Geometric Graphs, in Proc. 7th Annu. Internat. Sympos. Algorithms Comp., pages 115–125, 1996", the defect of this Haussdorf index is that a sole point is eventually matched a plural number of times. In such case, meaningful results cannot be achieved in visual geometric like images having different zoom values.

One of the latest technologies in the pattern matching is disclosed in "H. Alt and L. Guibas, Resemblance of Geometric Objects, in "Jorg-Rudiger Sack and Jorge Urruitia, editors, Handbook of Computational Geometry, Elsevier Science Publishers B. V. North-Holland, Amsterdam, 1998". Irani and Raghavan have proposed in "Sandy Irani and Prabhakar Raghavan, Combinatorial and Experimental Results for Randomized Point Matching Algorithms, in Proc. 12th annual ACM Symposium on Computational Geometry, pages 68–77, 1996", a randomized Monte Carlo method as a technique for finding the transformation under the supposition that the sets S and Q are matched at least densely, that is that at least portions of points are matched. This randomized Monte Carlo method is based on involute feature points defining the transformation and represents global processing.

The local processing, employed extremely widely in pattern matching, assumes the space of parameters defining a space of a transformation matrix T and applies to these generating parameters the branch and bound method as shown in "Michiel Hagedoorn and Remco C. Veltkamp, Reliable and Efficient Pattern Matching Using and Affine Invariant Metric, Technical Report UU-CS-1997-33, Utrecht University, Department of Computing Science, October, 1997" or in "D. Mount, N. Netanyahu and J. Le Moigne, Improved Algorithms for Robust Point Pattern Matching and Applications to Image Registration, in 14th Annual ACM Symposium on Computational Geometry, 1998". For example, if translation and/or rotation of a plane is allowed, a 3×3 matrix generated by three parameters (x, y, θ), representing the amount and direction of translation, expressed as $T = R2 \times [0, 2\pi]$ using the homogeneous coordinates, is defined.

As another technique for finding the pattern matching, there is a majority decision method, which represents an example of generalization of the Hough transformation, as disclosed in "T. Akutsu, H. Tamaki and T. Tokuyama, Distribution of Distances and Triangles in a Point Set and Algorithms for Computing the Largest Common Point Set, Discrete and Computational Geometry, pages 207–331, 1998". Recently, Indyk et al., has proposed in "P. Indyk, R. Motwani and S. Venkatasubramanian, Geometric Matching under Noise: Combinatorial Bounds and Algorithms, In SODA: Symposium of Datastructures and Algorithms 1999 and in "M. Gavrirov, P. Indyk, R. Motowni and S.Venkatasubramanian, Geometric Pattern Matching: A Performance Study, In. Proc. of the 15th Symp. of Comp. Geo., 1999" an algorithm for executing pattern matching by taking the diameter of a point set into account if there exists a noise. Also, Cardoze and Schulman related in "Cardoze and Schulman, Pattern Matching for Spatial Point Sets, In FOCS: IEEE Symposium on Foundations of Computer Science (FOCS), 1998" the pattern matching with the number theory and proposed a fast algorithm of executing Fourier transform in accordance with the diameter of a point set.

In the field of the above-described picture processing, it is desired to further raise the efficiency of the technique for a user to generate a synthesized picture. Among the techniques for the user to generate synthesized pictures, there are such a system of synthesizing a picture taking into account a digital still camera having lens distortion or an offset optical system in a camera such as a sequence of pictures making up a motion picture.

However, difficulties are encountered in applying a geometrical model for picture synthesis, such that the processing volume becomes enormous while the processing becomes extremely time-consuming. Consequently, a demand is raised for establishing a technique for efficiently synthesizing a picture using a geometrical model.

SUMMARY OF THE INVENTION

It is therefore an object of the present invention to provide a picture processing method and apparatus whereby plural pictures can be synthesized efficiently by applying a geometrical model.

In one aspect, the present invention provides an image processing method including a feature extracting step of extracting feature points of two or more images, a matching step of comparing feature points of one of the two or more images to those of other images for effecting matching and a computing step of performing computations for changing the relative position between the one image and the other image based on the results of the matching step.

In this image processing method, feature points of each of two or more images are extracted, the feature points of one of the two or more images are compared to those of the other image or images to effect matching. Based on the results of this matching, computations are carried out to change the relative positions of the one image and the other image or images to synthesize the two or more images.

In another aspect, the present invention provides an image processing apparatus including feature extracting means for extracting feature points of two or more images, matching means for comparing feature points of one of the two or more images to those of other images for effecting matching and computing means for performing computations for changing the relative position between the one image and the other image based on the results of matching by the matching means.

In this image processing apparatus, feature points of each of the two or more images are extracted by the feature extracting means and the feature points of one of the images are compared to those of the other image or images by the matching means by way of matching. Based on the results of this matching, computations are executed by the computing means such as to change the relative position between the one image and the other image or images to synthesize the two or more images.

BRIEF DESCRIPTION OF THE DRAWINGS

FIG. 5A shows two image data obtained on imaging a point on a three-dimensional space and on projecting the image on a two-dimensional image and FIG. 5B shows two image data being overlapped together.

FIG. 9 shows an example of an algorithm of the Monte Carlo method applied in executing matching taking into account the use of characteristics of feature points.

FIG. 11 shows an example of a geometric filtering algorithm.

FIG. 12 shows an example of an algorithm performing the matching by random combination with the geometric filtering algorithm shown in FIG. 11.

Th FIG. 17A shows an example of congruence on rotating a pattern and an example of non-congruence where an outlier is present and FIG. 17B shows an example of congruence representing translation, rotation and mirroring for a pattern.

FIG. 18A shows a case in which the smallest point-to-point distance of a point set is smaller than the radius of a sphere and FIG. 18B shows a case in which the smallest point-to-point distance of a point set is larger than the radius of a sphere.

FIG. 21A shows two point sets each having a sole point on a circle having the same radius and FIG. 21B shows two point sets each having plural points on a circle having the same radius.

FIG. 24 shows an example of point sets exhibiting similitude a symmetry.

FIGS. 25A and 25B illustrate the problem on congruence of subsets, where FIG. 25A shows a point set and FIG. 25B shows a point set showing a scene containing a partial duplication of the point set shown in FIG. 25A.

FIG. 29A shows a bucket of a cyclic inquiry and FIG. 29B shows a bucket of sector-shaped inquiry.

FIG. 32 is a flowchart for illustrating a sequence of processing operations in estimating a parameter $\gamma$ in the image processing apparatus.

FIGS. 33A and 33B show examples of partial congruence in case of scaling, wherein FIG. 33A shows a set and FIG. 33B shows a set containing a partial congruence different in size from the set shown in FIG. 33A.

DESCRIPTION OF THE PREFERRED EMBODIMENTS

Figure 1:
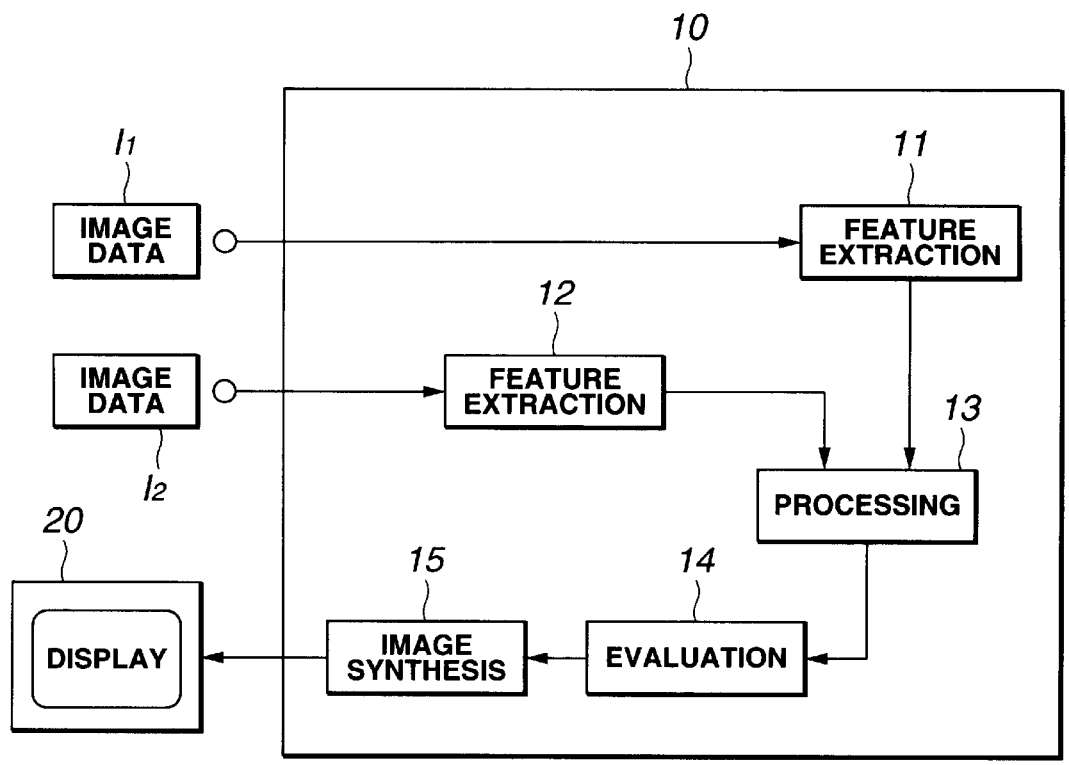
FIG. 1 is a block diagram for illustrating the structure of a picture processing apparatus embodying the present invention.

Referring to the drawings, a preferred embodiment of the present invention will be explained in detail.

An image processing apparatus 10, according to a preferred embodiment of the present invention, shown in FIG. 1, has the function of synthesizing plural images photographed by a camera, such as still images, moving pictures or graphics images, to generate a synthesized image.

Referring to FIG. 1, the present image processing apparatus 10 includes feature extraction units 11, 12 for extracting feature points from each of input image data $I_1$ and $I_2$, and a processing executing unit 13 for executing various processing operations, such as detection of a set of the large or largest common points, as later explained, based on two point sets specifying the two feature point sets extracted by the feature extraction units 11, 12. The image processing apparatus 10 also includes an evaluation unit 14 for evaluating the set of the largest common point detected by the processing executing unit 13 and an image synthesis unit 15 for synthesizing the image data $I_1$ and the image data $I_2$ based on the evaluation by the evaluation unit 14 to output a synthesized image data $I_3$ to a display unit 20. The image processing apparatus 10 also includes buffers for transiently storing the input image data $I_1$ and $I_2$, a memory for storing various programs and data and a memory, not shown, as a work area in performing various processing operations.

Figure 2:
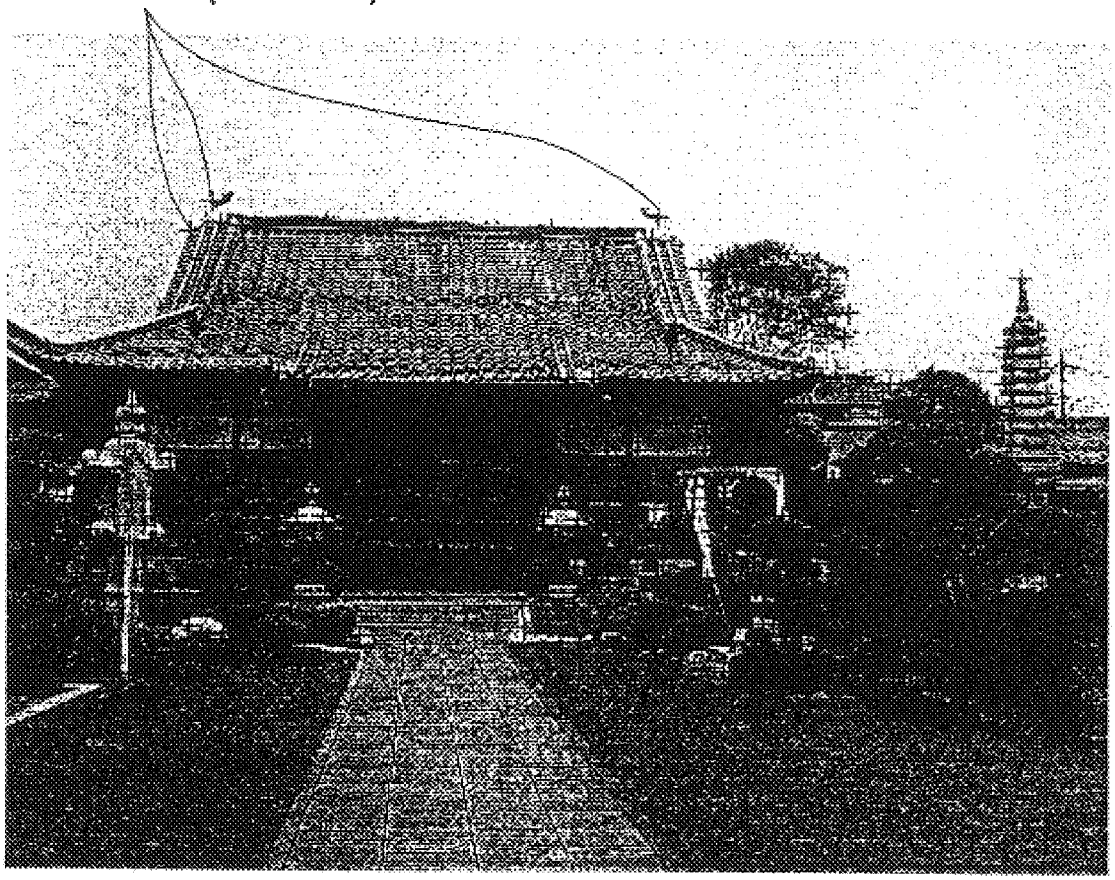
FIG. 2 shows an example of picture data with features (corners) detected.
Figure 3:
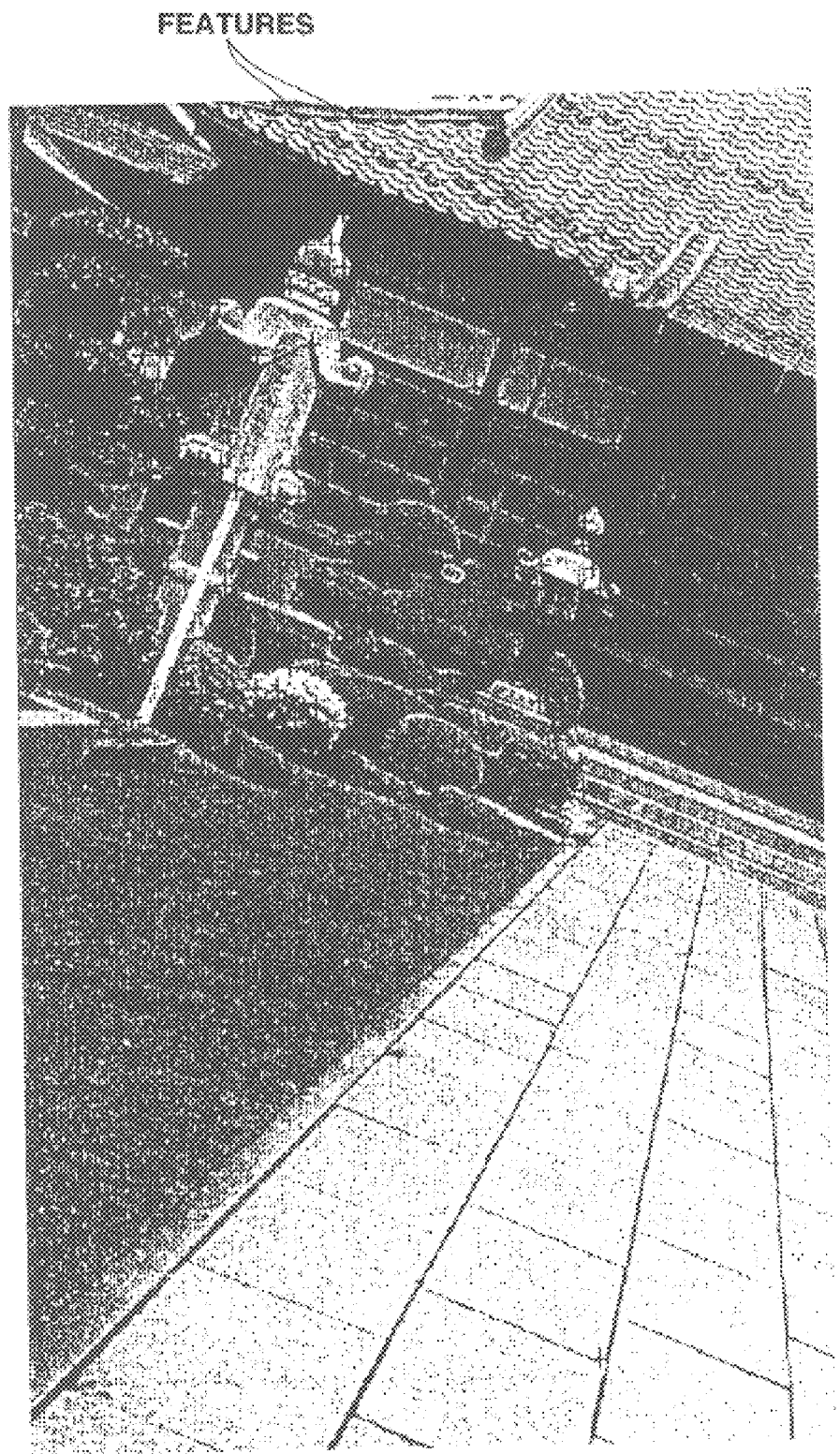
FIG. 3 shows another example of picture data with features (corners) detected.
Figure 4:
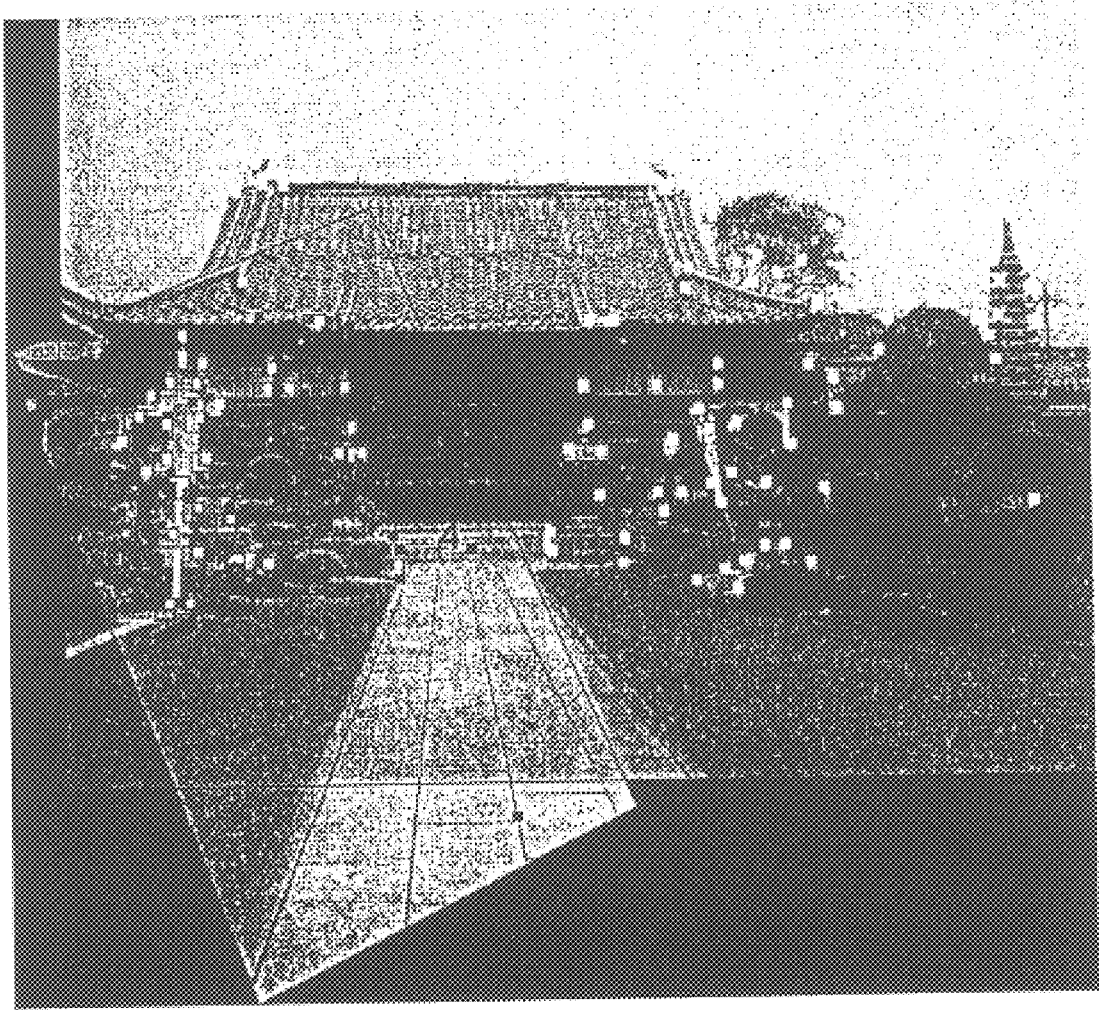
FIG. 4 shows an example of synthesized picture data.

The image processing apparatus 10 receives, as inputs, the image data $I_1$ and $I_2$, such as still images and/or moving pictures or graphic images, photographed by e;.g., a camera. Specifically, these image data $I_1$ and $I_2$ are two-dimensional images, with the number of pixels of the order of 1,000,000, such as an image obtained on imaging a landscape as shown in FIG. 2 and an image obtained on imaging a portion of the same landscape to an enlarged scale, as shown in FIG. 3. The image processing apparatus 10 synthesizes these image data $I_1$ and $I_2$ to generate a synthesized image data $I_3$, as shown in FIG. 4, to output the generated image data to the display unit 20. Of course, the image data may be other than the image data $I_1$, $I_2$ and data $I_3$ shown in FIGS. 2 to 4.

The feature extraction units 11, 12 receive the image data $I_1$ and $I_2$ as inputs and extract feature points from these data. That is, the feature extraction units 11, 12 overlap at least portions of the image data $I_1$ and $I_2$ under a user's command or automatically, while extracting feature points of each of the image data $I_1$, $I_2$.

Figure 5A:
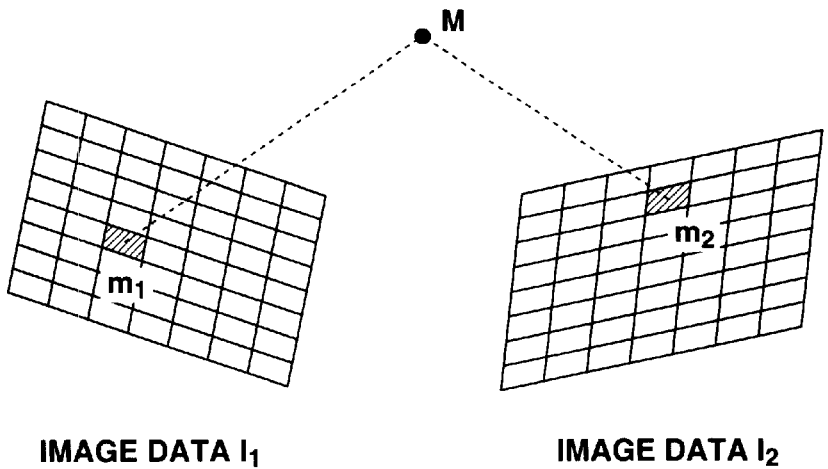
FIGS. 5A and 5B show overlapped portions, where
Figure 5B:
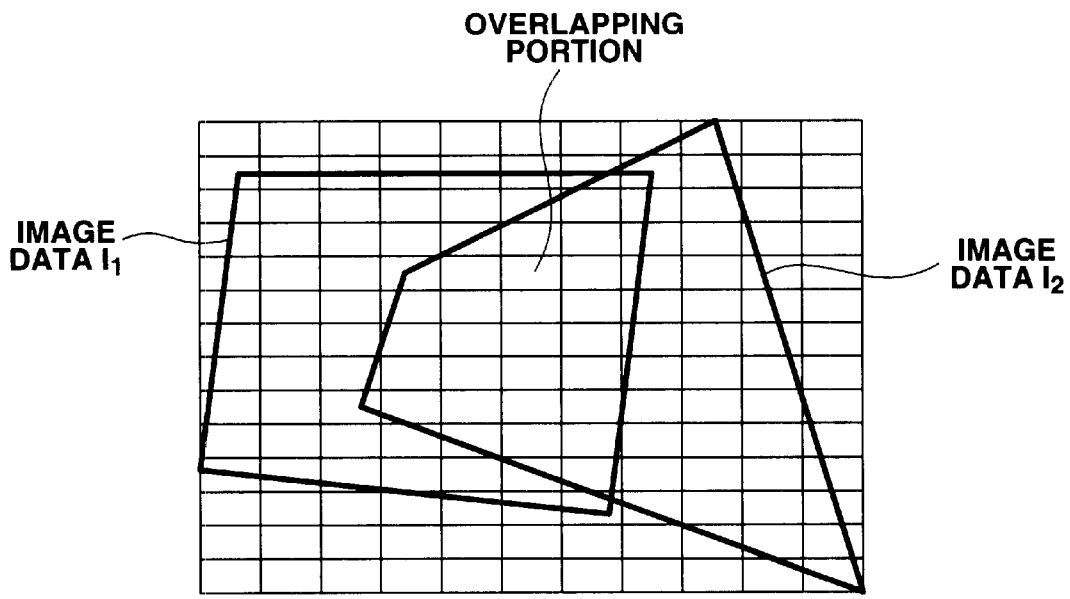
Figure 6:
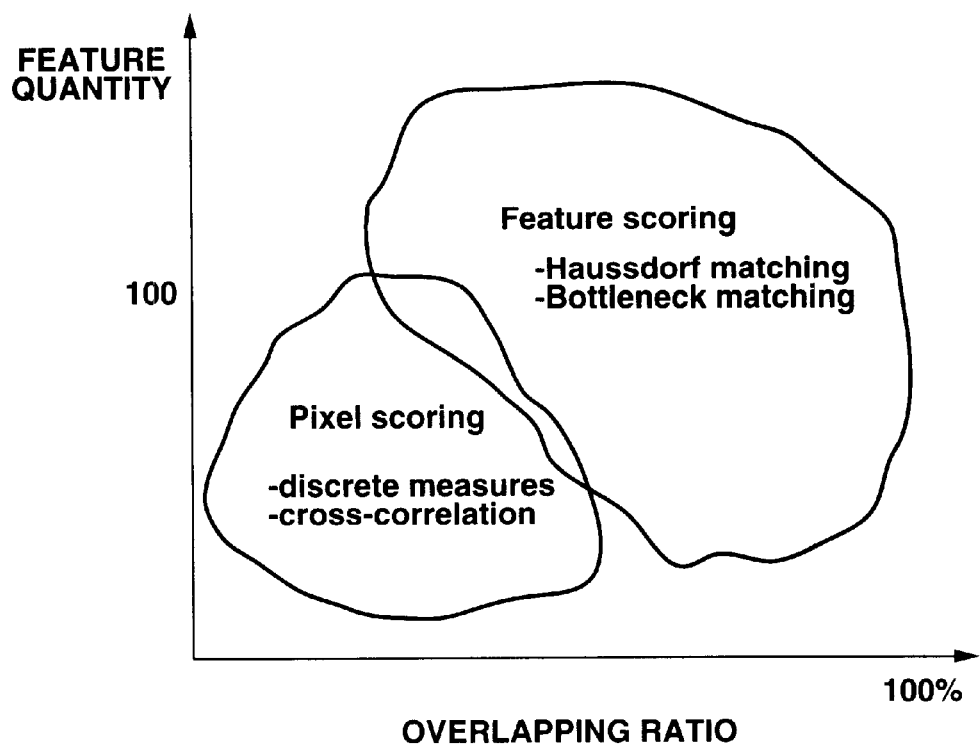
FIG. 6 illustrates changing the technique of matching depending on the overlapping ratio.

It is noted that the overlapped portion, obtained on at least partially overlapping the image data $I_1$ and $I_2$, is produced by producing the image data $I_1$ and $I_2$, obtained on imaging a point M on a three-dimensional space by e.g. a camera, as shown in FIG. 5A, and to project the point on points $m_1$ and $m_2$ on two-dimensional images, and by overlapping the image data $I_1$ and $I_2$, as shown in FIG. 5B. For example, if the coordinates of the point M in the three-dimensional space are expressed as (x, y, z), the points $m_1$ and $m_2$ are expressed as homogeneous coordinates $(x_1/w_1, y_1/w_1)$, $(x_2/w_2, y_2/w_2)$, respectively.

The feature extraction units 11, 12 detect corners, edges, angles, etc. and connections of patterns contained in the image data $I_1$, and $I_2$ to extract as many feature points as possible either to a pixel or subpixel accuracies. At this time, the feature extraction units 11, 12 can preferentially extract feature points of the image data $I_1$ and $I_2$ lying in the overlapping portion, including its neighboring regions. The feature extraction units 11, 12 is also able to perform digital zooming on the image data $I_1$ and $I_2$ to extract feature points. The feature extraction units 11, 12 also send the point sets, made up of the extracted feature points, to the downstream side processing executing unit 13.

The feature extraction units 11, 12 are also responsive to the overlapping ratio specifying the proportion of the overlapping portions of the image data $I_1$ and $I_2$ to generate selection signals of selecting the matching processing technique used in adjusting the relative position between the image data $I_1$ and $I_2$. That is, the feature extraction units 11, 12 generate a selection signal stating that a technique of matching processing using a feature quantity as a parameter proportionate to the number of feature points will be selected if the overlapping ratio is closer 100%, while generating a selection signal stating that a technique of matching processing will be used if the overlapping ratio is smaller. The feature extraction units 11, 12 route the generated selection signals to a downstream side processing executing unit 13.

The processing executing unit 13 performs geometrical processing based on two point sets routed from the feature extraction units 11, 12 and on the selection signal. In particular, the processing executing unit 13 detects the set of the largest or large common points based on the two point sets routed from the feature extraction units 11, 12, in order to synthesize the image data $I_1$ and $I_2$. The processing for detecting the set of the largest common points will be explained subsequently in detail.

If the processing executing unit 13 has decided to perform matching using the feature points, it directs its attention to e.g., intensities of plural pixels making up the image data $I_1$ and $I_2$. If, as a condition under which the feature point P1 contained in the feature point set S1 for the image data $I_1$ is matched to the feature point P2 contained in the feature point set S2 for the image data $I_2$, the following equation (2) by a matrix H:

$$d_2(p_2, Hp_1) \leq \epsilon \qquad (2)$$

is met, the image data $I_1$ and $I_2$ are recognized to be matched to each other.

In the above equation (2), r is a value that meets $\epsilon \geq 0$, $d_2$ is a Euclidean distance. And H is a matrix for synthesizing the image data $I_1$ and $I_2$.

Figure 7:
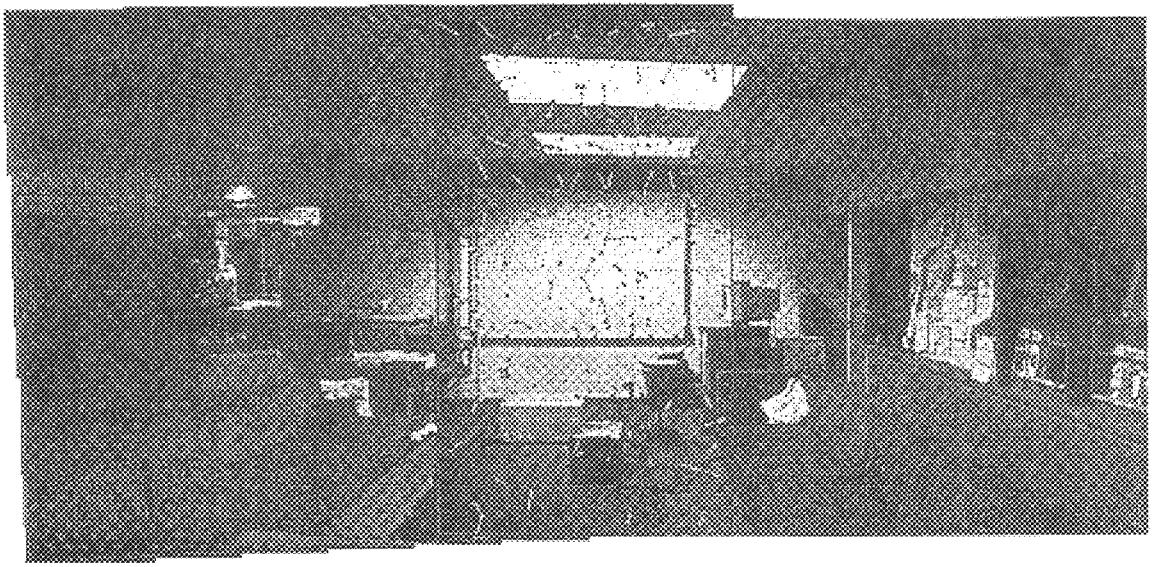
FIG. 7 shows an example of synthesized image data on Haussdorf matching.
Figure 8:
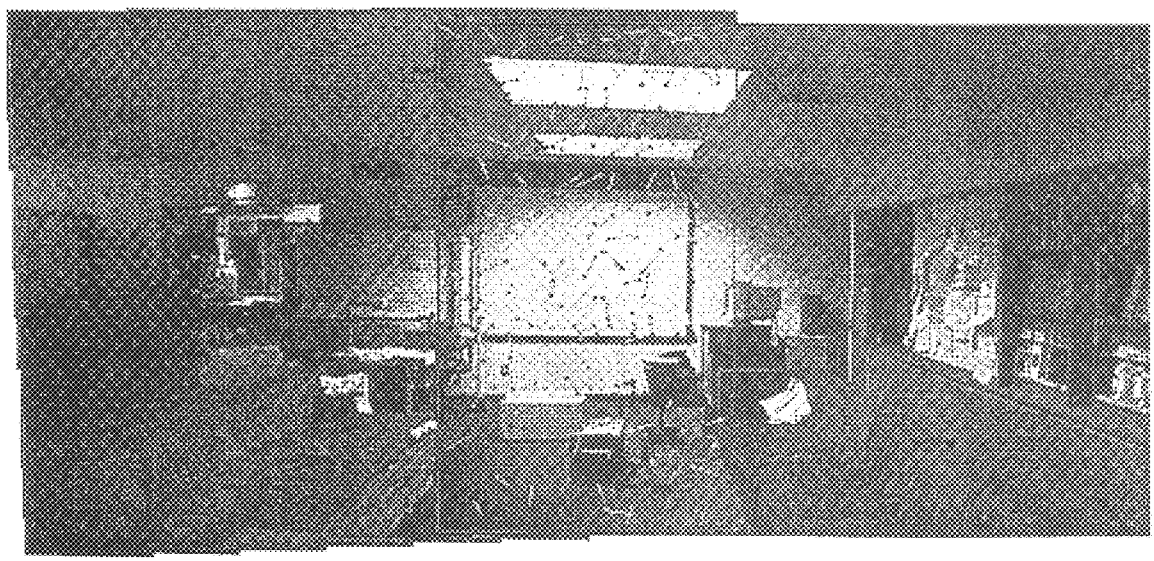
FIG. 8 shows an example of synthesized image data on bottleneck matching.

It is also possible for the processing executing unit 13 to search the common point using the feature points for the image data $I_1$ and $I_2$, as described above, if the matching is other than that described above, such as the so-called Haussdorf matching processing or the so-called bottleneck processing. FIGS. 7 and 8 show an example of synthesized image data $I_3$ obtained on Haussdorf matching and an example of synthesized image data $I_3$ obtained on bottleneck matching.

The Haussdorf matching is the processing of interconnecting a feature point p2 contained in the feature point set S2 for the image data $I_2$ and a feature point p1 for the image data $I_1$ lying proximate to the feature point p2. In this Haussdorf matching, there is generated a Haussdorf matching which is an evaluation value specifying the degree of coincidence between the image data $I_1$ and $I_2$ for the synthesized image data $I_3$.

On the other hand, the bottleneck matching is the matching processing suited for checking similitude between the image data $I_1$ and $I_2$. In this bottleneck matching processing, similarly to the Haussdorf matching processing, there is generated an evaluation value specifying the degree of similitude between the image data $I_1$ and $I_2$ and the overlapping portion between the image data $I_1$ and $I_2$. The bottleneck matching can handle different zoom values.

It is also possible for the processing executing unit 13 to use the Monte Carlo method, which takes into account the characteristics of the feature points, in addition to the above-described matching processing, to improve the accuracy in matching more significantly. FIG. 9 shows an example of the algorithm of the Monte Carlo method. That is, in effecting matching processing, the processing executing unit 13 randomly selects the number of k, k being the number of feature points necessary for calculating the fundamental transformation for which matching can be achieved completely with 2 k feature points, and uses k feature points of the feature point set S2 to effect matching processing in accordance with the Monte Carlo method.

Figure 10:
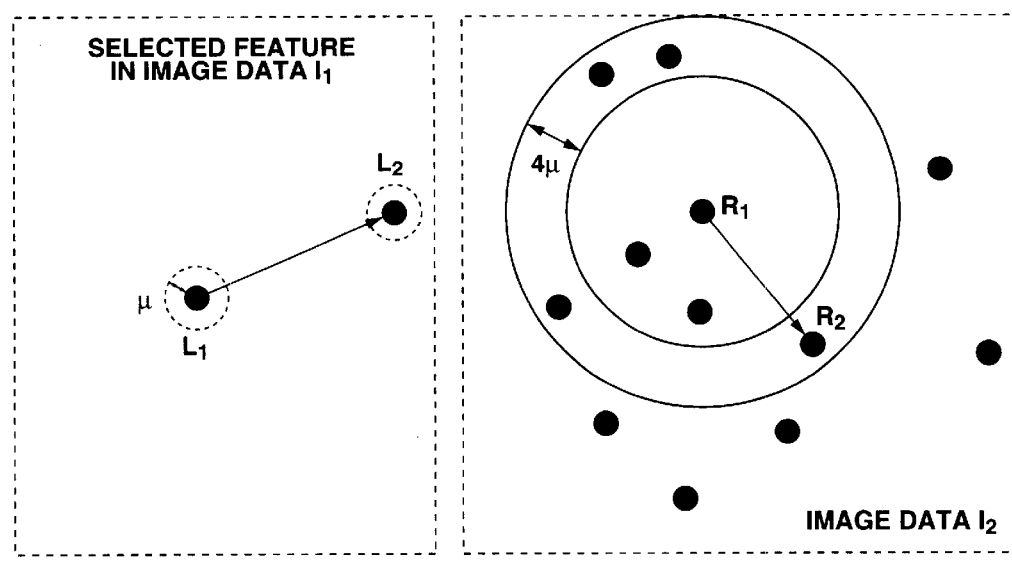
FIG. 10 illustrates matching processing performed by a processing executing unit.

The processing executing unit 13 performs the processing of searching the amount of translation and rotational displacement for the image data $I_1$ and $I_2$ matched to the feature of the image data $I_1$ contained in the image data $I_2$. That is, the processing executing unit 13 selects the feature points $(L_1, L_2)$ contained in the image data $I_1$, as shown in FIG. 10. At this time, the processing executing unit 13 selects the feature points $(L_1, L_2)$ contained in the image data $I_1$ as it evades an area possibly containing feature points $(R_1, R_2)$ contained in the image data $I_2$ used in the subsequent geometrical filtering. It is noted that the feature points $(R_1, R_2)$ contained in the image data $I_2$ have been selected from a circular area, for example ring or annulus, $(d_2(L_1, L_2)-2\mu$ (inner radius), $d_2(L_1, L_2)+4\mu$ (outer radius)) centered at $R_1$. The processing executing unit 13 set a circular area larger in radius by $4\mu$, as it takes account of position errors of feature points extracted from the feature extraction units 11, 12.

The processing executing unit 13 uses the geometrical filtering algorithm shown in FIG. 11 to adopt the feature point p* as being a feature point contacting with the feature point p by means of parameter ε. By applying the geometrical filtering algorithm, the relation between the feature point p and the feature point p* is expressed by the following equation (3):

$$|d_2(p^*_1, p^*_2) - d_2(p_1, p_2)| \leq 2\epsilon \tag{3}.$$

The processing executing unit 13 adaptively uses geometrical filtering algorithm for the detected feature points. In the geometrical filtering algorithm, shown in FIG. 11, the processing executing unit 13 uses the feature point group $S_1$ $(L_1, L_2, \ldots, L_k)$ for the image data $I_1$, made up of randomly selected k feature points, to select sequentially the feature points p2 on the image data $I_2$ from the feature point group $S_2$ $(R_1, R_2, \ldots, R_k)$ to search a feature point matched to the feature points contained in the feature point group $S_1$. It is noted that $R_2$ is a feature point contained in a circular area $(R_1, L_1L_2-2\mu, 4\mu)$, while $R_3$ is a feature point contained in a circular area $(R_2, L_2L_3-2\mu, 4\mu)$ and $R_k$ is a feature point contained in a circular area $(R_{k-1}, L_{k-1}L_k-2\mu, 4\mu)$.

Moreover, the processing executing unit 13 randomly combines the algorithm shown in FIG. 12 with the geometrical filtering algorithm shown in FIG. 11 to effect matching between the image data $I_1$ and $I_2$. The processing executing unit 13 furnishes the results of matching to the evaluation unit 14.

In addition, the processing executing unit 13 effects registration between the image data $I_1$ and $I_2$. At this time, the processing executing unit 13 performs processing shown in "D. Mount, N. Netanyahu and J. Le Moigne, Improved Algorithms for Robust Point Pattern Matching and Applications to Image Registration, in 14th Annual ACM Symposium on Computational Geometry, 1998".

The processing executing unit 13 causes translation and/or rotation of the image data $I_1$ and/or the image data $I_2$, by application of, for example, a 3 row by 3 column matrix, which takes linearity and the perspective relation between the image data $I_1$ and $I_2$ into account, to generate a synthesized image data $I_3$. At this time, the processing executing unit 13 performs the processing described in, for example, "M. Hagedoorn and R. Veltkamp, A General Method for Partial Point Set Matching, In Proceedings of the 13rd International Annual Symposium on Computational Geometry (SGG-97), pages 406 to 408, New York, Jun. 4–6, 1997, ACM Press".

Figure 13:
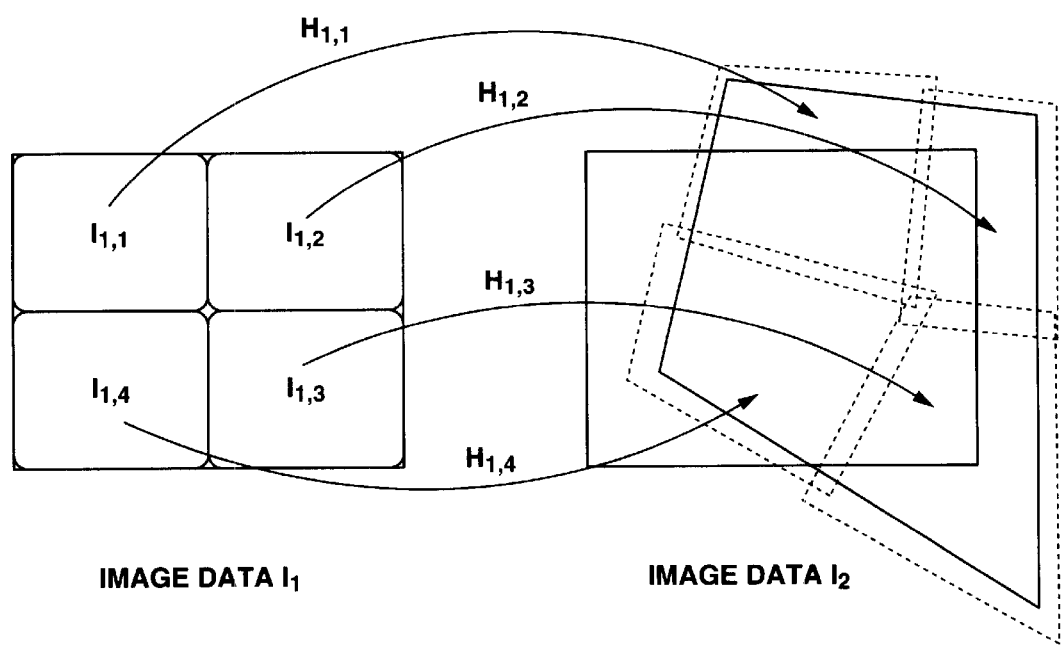
FIG. 13 illustrates image synthesis and specifically the division into four of image data of one of two image data for image synthesis.

It is also possible for the processing executing unit 13 to divide the image data $I_1$ into four portions to cause translation and/or rotation of these four portions, before synthesizing the image data $I_1$ and $I_2$, as shown in FIG. 13. This permits the processing executing unit 13 to synthesize the image data $I_1$ and $I_2$ more accurately to generate the synthesized image data $I_3$. At this time, the processing executing unit 13 applies the 3-row by 3-column matrix to each of the four portions of the image data to synthesize the image data. Specifically, the processing executing unit 13 applies matrices $H_{1.1}$, $H_{1.2}$, $H_{1.3}$ and $H_{1.4}$ to the image data $I_{1.1}$, $I_{1.2}$, $I_{1.3}$ and $I_{1.4}$, divided from the image data I1, respectively, and causes translation and/or rotation to adjust the relative positions with respect to the image I2 to synthesize the image.

It is also possible to use the affine transformation or the perspective relation to adjust the relative position between the image data $I_1$ and $I_2$.

The processing executing unit 13 also uses a 3 row by 3 column matrix H', which causes translation and/or rotation of the above-described matrix a minor amount, in accordance with the so-called Levenberg-Marquadt optimizing system, by way of the minimizing processing.

The evaluation unit 14 receives the results of the above-described matching from the processing executing unit 13 to evaluate the large/largest common point set detected by, for example, the processing executing unit 13, to generate an evaluation value. The evaluation unit 14 performs the above-mentioned Haussdorf matching or bottleneck matching, as the evaluation function. In case of matching with the pixel value, the pixel values of the image data $I_1$ and $I_2$ are detected and the correlation between the pixel values of the image data $I_1$ and $I_2$ is utilized to generate the evaluation value.

If the evaluation by the evaluation unit 14 is optimum, the image synthesis unit 15 synthesizes the image data $I_1$ and $I_2$ to output the synthesized image data $I_3$ to the display unit 20, which then is able to demonstrate the synthesized image data $I_3$ from the image synthesis unit 15 on a display screen, not shown.

Figure 14:
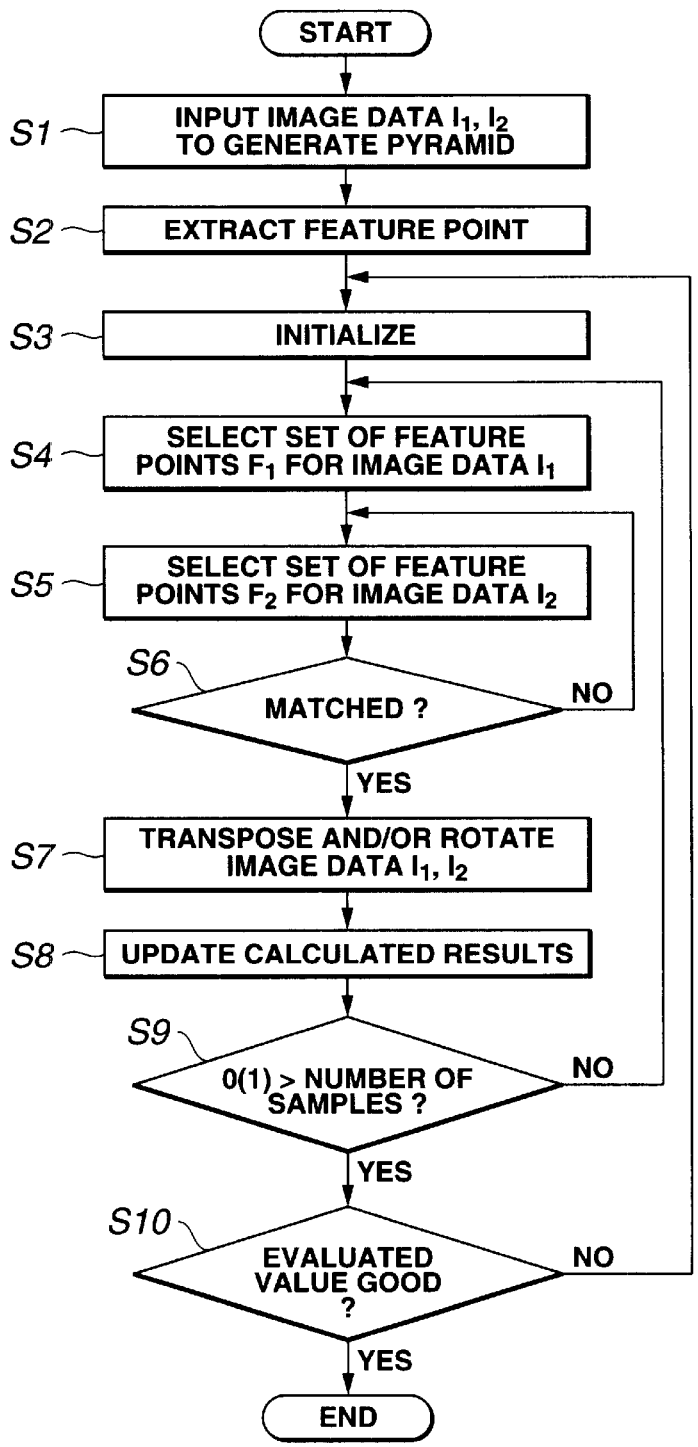
FIG. 14 is a flowchart for illustrating two image data in an image processing apparatus.

The above-described image processing apparatus 10 performs a sequence of processing operations, shown in FIG. 14, to synthesize the image data $I_1$ and $I_2$ to generate the synthesized image data $I_3$.

The image processing apparatus 10 first receives the image data $I_1$ and $I_2$ at step $S_1$ as inputs, as shown in FIG. 14. The image data $I_1$ and $I_2$ may be those photographed by e.g., a camera or selected as an object of image synthesis subject to designation by the user. The image processing apparatus 10 also generates a pyramid, composed of image data, enlarged and/or contracted from the input image data $I_1$ and $I_2$ with different values of the zooming ratio.

At step S2, the image processing apparatus 10 routes respective pyramids of the image data $I_1$ and $I_2$, generated at step S1, to the feature extraction units 11, 12. By the feature extraction units 11, 12, the image processing apparatus 10 overlaps the image data making up the pyramid of the image data $I_1$ and the image data making up the pyramid of the image data $I_2$, under a command by the user, or automatically, while extracting the feature points of the respective image data, as described above. By so doing, the image data $I_1$ and $I_2$ having different contracting ratios can be synthesized by varying the respective contracting ratios of the image data $I_1$ and $I_2$ so that the two image data synthesized together are of an appropriate contracting ratio. In the following, image data $I_1$ having the appropriate contracting ratio is termed the image data $I_1$, while image data $I_2$ having the appropriate contracting ratio is termed the image data $I_2$.

In extracting the respective feature points, the feature extraction units 11, 12 extract feature points in the respective two-dimensional directions of the image data $I_1$ and $I_2$. Based on the overlapping ratios of the feature extraction units 11, 12, the image processing apparatus 10 refers to the overlapping ratios of the image data $I_1$ and $I_2$ to generate a selection signal selecting the matching processing technique.

The image processing apparatus 10 then proceeds to the initializing step of step S3 by the processing executing unit 13.

The image processing apparatus 10 then selects, at step S4, an optional set of feature points $F_1$ from the feature points for the image data $I_1$.

The image processing apparatus 10 then selects, at step S5, an optional set of feature points $F_2$ from the feature points on the image data $I_2$ by the processing executing unit 13.

At step S6, the image processing apparatus 10 proceeds to matching, using the feature points $F_1$ and $F_2$, at the processing executing unit 13, to discriminate whether or not the feature points $F_1$ and $F_2$ coincide with each other.

If the feature point $F_1$ is not coincident with the feature point $F_2$, the image processing apparatus 10 proceeds to the processing at step S5 to select the other feature point $F_2$ and again performs the matching.

If the feature point $F_1$ is coincident with the feature point $F_2$, the image processing apparatus 10 proceeds to the processing at step S7 where the processing executing unit 13 causes translation and/or rotation of the image data $I_1$ and $I_2$ using the results of computations obtained at step S6. At this time, the image processing apparatus 10 generates evaluation values by the evaluation unit 14.

The image processing apparatus 10 at step S8 then updates the results of computations for translation and/or rotation obtained by computations prior to step S7.

The image processing apparatus 10 at step S9 then discriminates whether or not O(1) (that is a predefined constant value) used in the so-called Hungary theory is larger than the number of samples in the above-described processing.

If O(1) is not larger than the number of samples, the image processing apparatus 10 proceeds to step S4 to repeat the processing as from step S4.

On the other hand, if O(1) is larger than the number of samples, the image processing apparatus 10 discriminates at step S10 whether or not the evaluated value generated at step S7 by the evaluation unit 14 is better than that obtained on previous matching.

If the result of check at step S10 is NO, the image processing apparatus 10 proceeds to step S3 to repeat the processing as from step S3.

If the result of check at step S10 is YES, the image processing apparatus 10 generates the synthesized image data $I_3$ to terminate the sequence of operations.

The image processing apparatus 10 thus executes the processing as from step S3 to step S10, until the optimum evaluation value is obtained, to synthesize the image data $I_1$ and $I_2$, to generate panoramic or perspective synthesized image data $I_3$.

Since the image processing apparatus 10 matches the feature points of the image data $I_1$ and $I_2$, using the above-described geometric technique, thus realizing efficient image synthesis processing.

The various processing operations, executed by the above-described image processing apparatus 10, are explained hereinafter in detail. In the following, feature point sets in the image data $I_1$ and $I_2$ are termed point sets S and Q and explanation is made of the processing for detecting the congruence, symmetry, pattern matching and largest common point sets. Reference is also made to their application.

With the above-described image processing apparatus 10, it is possible to find a transformation T for which matching of (T(S), Q) is maximum in case of application of the transformation T in the transformation space T to the point set S as for two point sets $S=\{S1, \ldots, Sn\}$, $Q=\{Q1, \ldots, Qm\}$ in the Euclid d-dimensional space $E^d$. Also, the image processing apparatus 10 is able to impose geometrical constraint on the transformation T to realize the deterministic algorithm and random algorithm for performing conditional pattern matching like zoom ranges, angle ranges, etc.

If each point is wobbled a minor quantity $\epsilon$, the image processing apparatus 10 is able to find point set pattern matching substantially accurately. This allowable wobbling quantity $\epsilon$ is varied by $d_{min}/2\sqrt{d}$ where $d_{min}$ is the smallest point-to-point distance and d is the dimension of the point set. In this image processing apparatus 10, the counted number of scores of 1-for-1 matching, which allows for an error of the maximum value of the allowable wobbling quantity $\epsilon$, rather than the continuous scores to matching (S, Q), such as Haussdorf indices or symmetry difference indices, are used as matching indices.

Meanwhile, in the following explanation, $1\epsilon(P, Q)$ is assumed to be a (0,1) function such that $1\epsilon(P, Q)=1$ if and if only $d_2(P,Q) \leq 2\epsilon$ and $1\epsilon(P,Q)=0$ otherwise. Also, in the following explanation, the score ($\{S, Q\}$) specifying the matching accuracy is assumed to be defined by the following equation (4):

$$\text{score}(\{S,Q\})=\max_{\sigma}\Sigma_{i=1}^{n}1_{\epsilon}(P_1,Q_{\sigma(i)}) \tag{4}$$

where $\sigma$ is a value changed throughout the permutation m! of the point set Q, it is noted that the definition shown in the equation (4) holds for he entire range of $\epsilon \geq 0$.

The image processing apparatus 10 first distinguishes "inliers", which are matched points, from "outliers", which are non-matched points, and affixes the same label to the matched points. By performing this preliminary processing, the image processing apparatus 10 is able to handle consecutive distance indices in R as well as to improve matching in locally smallest portions.

For example, the image processing apparatus 10 is able to use the branch and bound method (local processing) in the transformation space, in "D. Mount, N. Netanyahu and J. Le Moigne, Improved Algorithms for Robust Point Pattern Matching and Applications to Image Registration, In COMPGEOM: Annual ACM Symposium on Computational Geometry, 1998" or in "M. Hagedoorn and R. Veltkamp, A General Method for Partial Point Set Matching, In Proceedings of the 13rd International Annual Symposium on Computational Geometry (SGG-97), pages 406 to 408, New York, Jun. 4–6, 1997, ACM Press" as proposed recently. That is, the image processing apparatus 10 can find approximately all of the matched transformations for the upper level, while it can improve respective locally smallest portions for the lower level so that the matched transformations will be more accurate.

Figure 15:
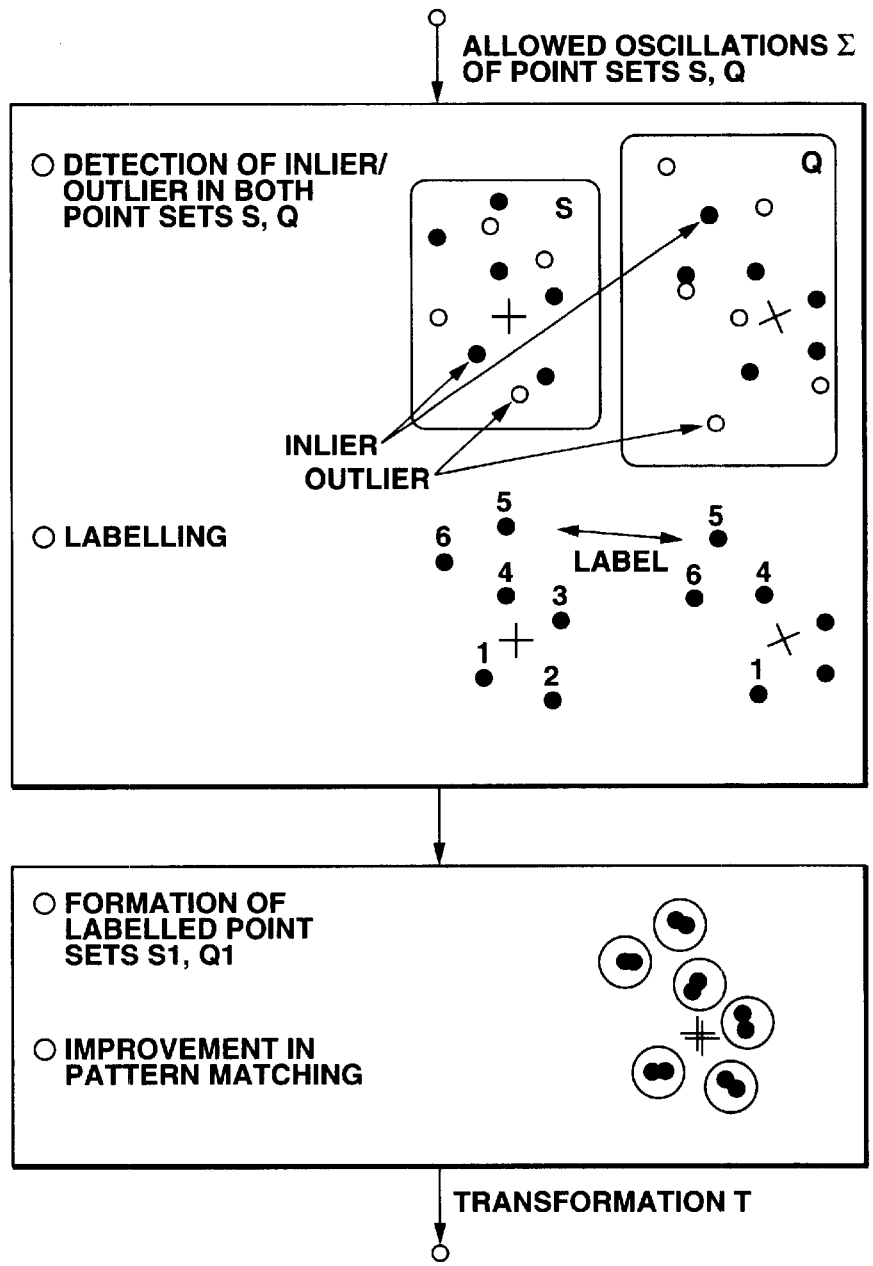
FIG. 15 illustrates the technique of geometric pattern matching in an image processing apparatus.

Globally, the image processing apparatus 10 effects geometrical pattern matching by the technique shown in FIG. 15. That is, the image processing apparatus 10 separately detects the inliers and outliers in both of the point sets S and Q, as global processing, based on the two input point sets S and Q and the allowable wobbling quantity $\epsilon$, and affixes the same label to the matched points. This processing is carried out using non-contiguous indices, rather than by adopting consecutive indices of scoring the matching (S, Q). The image processing apparatus 10 generates labelled point sets S1, Q1, as local processing, and adopts the above-described consecutive indices to improve pattern matching to output a set of transformations T in the space of transformation T.

Since the necessity of selecting the candidates from extracted inaccurate feature points occurs frequently in visual geometric, the image processing apparatus 10 reports on all transformations having a certain feature, and counts the number of such transformations.

The processing in this image processing apparatus 10 is hereinafter explained in detail.

First, the problem of congruence in the two-dimensional and three-dimensional spaces is defined. It is also explained how the operator of the congruence is related to the number symmetry. The relation between the problem of congruence, graph theory, symmetry and the number theory is also explained. In the following explanation, correct matching is indicated by a suffix E, whilst that corrupted by noise is indicated by a suffix N. Also, in the following explanation, the illustrations, queries, reports and counts are expressed by W, Q, R and C, respectively. For example, "EW congruence problem" means a problem in which the transformation $T \epsilon T$ which gives T(S)=Q, that is a problem requesting reporting that the point sets S, Q are congruent (S≡Q). On the other hand, TI, TR, TT, TH, TS and TA represent isometric transformation, rotational transformation, translational transformation, homothetic transformation, similitude transformation (transformation with isometric transformation and scaling) and affine transformation group space, respectively.

The "problem of congruence" generally inquires whether or not two point sets S and Q are congruent. Meanwhile, in the following explanation, suffices are used if an environmental space is desirably emphasized. For example, $S \equiv_{TS} Q$ means that the point set S is congruous with respect to the point set Q in the space of similitude. It is noted that, if the suffices are not demonstrated explicitly, "≡" means "$\equiv_{TH}$".

Let us now consider the following congruence problem: "Given two d-dimensional Euclid n-point sets S={S1, . . . , Si=(Si,1, . . . , Si,d), . . . , Sn} and Q={Q1, . . . , Qi=(Qi,1, . . . , Qi,d), . . . , Qn}, is the point set S congruent with respect to a point set Q?—that is, does S≡Q hold?".

The solution to this problem can be found by the so-called real RAM model in O (n log n) time, as described in "M. D. Atkinson, An Optimal Algorithm for Geometrical Congruence, J. Algorithms, 8:159–172, 1987" or in "H. Alt, K. Mehlhorn, H. Wagener and Emo Welzel, Congruence, Similarity and Symmetries of Geometric Objects,Discrete Comput. Geom., 3:237–256, 1988". However, for other optional dimensions, it is difficult to find a solution, as in a graphic isomorphic problem. Meanwhile, characterization on how such difficulties are produced is not yet clarified, as shown in "J. Kobler, U. Schoning and J. Toran, The Graph Isomorphism Problem: Its Structural Complexity, Birkhauser, Boston, 1993".

Alt et al., discussed in the aforementioned "H. Alt, K. Mehlhorn, H. Wagener and Emo Welzel, Congruence, Similarity and Symmetries of Geometric Objects, Discrete Comput. Geom., 3:237–256, 1988" on a deterministic algorithm of O $(n^{d-2} \log n)$ for a d-dimensional point set. Recently, Akutsu proposed in "Tatsuya Akutsu, On Determining the Congruence of Point Sets in a d-dimensions, Comput. Geom. Theory Appl., 9(4): 247–256, 1988" a random $O\hat{}(n^{d-\frac{1}{2}}\log 2n)$ time $O\hat{}(n^{d-\frac{1}{2}})$ space algorithm which is based on a birthday paradox shown in "Meijer, Cryptology and the Birthday Paradox, UMAP: The Journal of Undergraduate mathematics and its Applications, 17, 1996". Meanwhile, $O\hat{}(\cdot)$ means the processing capability of a randomized algorithm.

Figure 16:
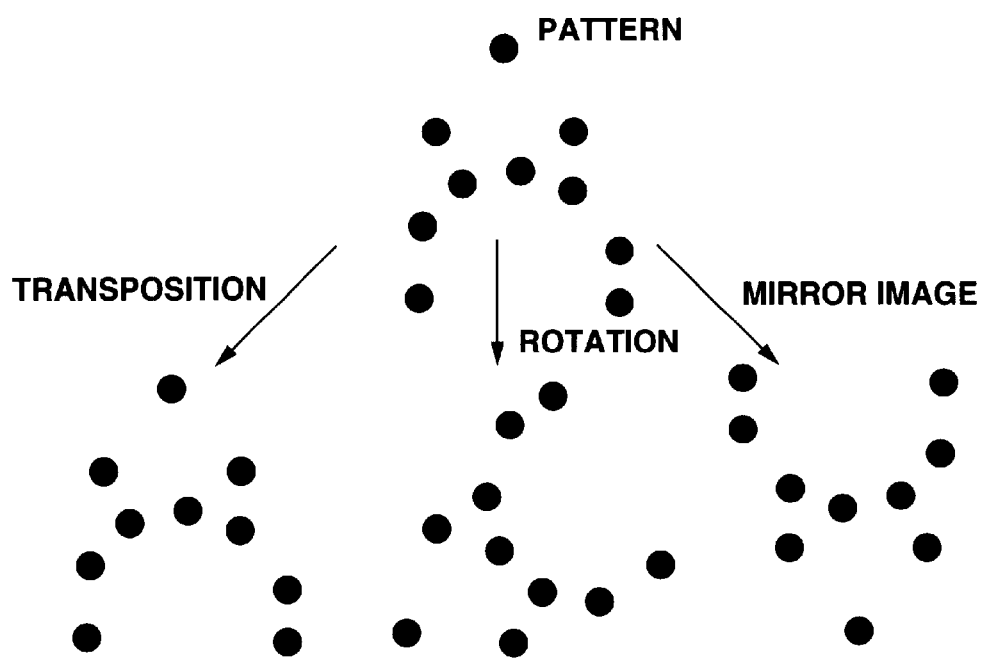
FIG. 16 shows an example of isometric conversion and shows translation, rotation and mirroring for a given pattern.

It is noted that $E^d \rightarrow E^d$ represents isometric mapping. That is, $d(P, Q)=d(T(P), T(Q)) \forall P, Q \in E^d$. The isometric mapping is also termed a rigid motion and may or may not be accompanied by mirroring. An optional isometric transformation $T \epsilon TI$ may be resolved into a d×d orthogonal matrix $R_d \epsilon TR$ and a translation portion $t_d \epsilon TT$. That is, $T(x):=R_d x+t_d$. Meanwhile, the chilarity of the isometric transformation is determined by the sign of a matrix of a d×d orthogonal matrix $R_d$. That is, with $\det(R_d)=1$ or with $\det(R_d)=-1$, its isometric transformation is said to be regular and abnormal, respectively. It is noted that synthesis of two isometric transformations is still the isometric transformation. For example, the synthesis of mirroring and translation, and is used for generating a regularly repeated pattern. FIG. 16 shows several examples of the isometric transformations.

In the following explanation, only regular isometric transformation is discussed. The reason is that, in the case of abnormal isometric transformation, it is sufficient if mirroring transformation x1→−x1 is applied to a first set, for example, S. The standard form for the point set S is an object O(S) for which O(S)=O(Q) for all Q≡S. The object is also termed a category.

Therefore, what is necessary to do for detecting the congruence is first computing both standard form O(S) and O(Q) of point sets S and Q and then checking whether or not these standard forms O(S) and O(Q) are equal to each other. For a regular polyhedral, the symbol of Schlafli, shown in "E. Sculti, Symmetry of Polytopes and Polyhedra, In Jacob E. Goodman and Joseph O'Rourke, editors, Handbook of Discrete and Computational Geometry, chapter 16, pages 311–330, CRC Press LLC, Boca Raton, Fla., 1997". The Schlafli's symbol $(P_1, \ldots, P_{point-to-point\ distance-1})$ encodes the local structure of the polyhedral in the following manner: That is, in an optional (i+1) plane F, present invention represents the number of i-planes including given (i−1) plane of F. For example, a regular two-dimensional p-gon may be represented by the combination of symbols (p), with the symmetric group being a set of 2p-dimensional dihedrals. If p≧3, a transcendental number needs to be handled. What is at issue are cyclic group $C_p$ and its mirroring $C_p'$. Moreover, an optional d-dimensional polyhedral can be uniquely expressed by the combination of generalized Schlafli symbols as in the Wythoff constructing method shown in "J. E. Goodman and J. O'Rourke, editors. Handbook of Discrete and Compuatinal Geometry, CRC Press Inc. Boca Raton Fla., 1997". Therefore, given two point sets S, Q, corresponding Schlafli symbols of the convex closure is first calculated to check for possible coincidence. If the combined standard form differs between the two point sets S and Q, the result is negative. On the other hand, if the combined standard form coincides between the two point sets S and Q, the comprehensive testing is executed.

Then, detection of congruence on a plane is explained. The simple method for detecting congruence on a plane is finding centroids cs and cq of the point sets S and Q by computing the following equations (5) and (6):

$$c_S = \frac{1}{n}\sum_{i=1}^{n} S_i \quad (5)$$

$$c_Q = \frac{1}{n}\sum_{i=1}^{n} Q_i \quad (6)$$

as stated in the aforementioned "M. D. Atkinson, An optimal Algorithm for Geometrical Congruence, J. Algorithms, 8:159–172, 1987", and by subsequently performing translation so that the centroid $c_S$ will be mapped to the centroid $c_Q$.

The reason is that, for an optional affine transformation T, that is for a rigid motion, $c_{T(S)}=T(c_S)$ holds. That is, if S≡Q, there is a transformation T∈T for which Q=T(S), while $c_Q=c_{T(S)}=T(c_S)$ for an optional T∈TA, so that the centroids $c_S$ and $c_Q$ of the point sets S and Q coincide completely with each other.

Let the coordinates of the respective points be represented using polar coordinates (θ, r) centered about the respective centroids. If and if only there exists a complete cyclic pattern matched to the polar coordinates arrayed in the dictionary order, the point set S is congruent with respect to the point set Q, as can be found on the linear time axis using the Morris-Knuth-Pratt algorithm shown in "D. E. Knuth, J. H. Morris and V. R. Pratt, Past pattern Matching in Strings, SIAM Journal on Computing, 6:323–350, 1977". It is noted that the cyclic pattern matching can be grasped as a partial letter string pattern matching with a length n in a letter string with a length 2n.

Figure 17A:
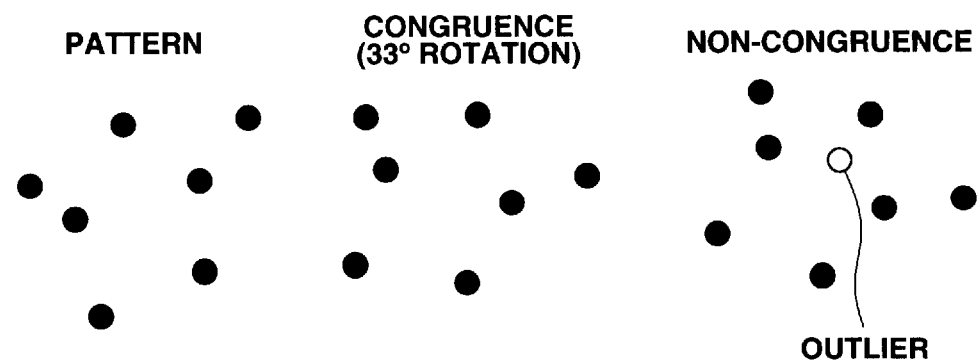
FIGS. 17A and 17B show examples of involute rotational symmetry, where
Figure 17B:
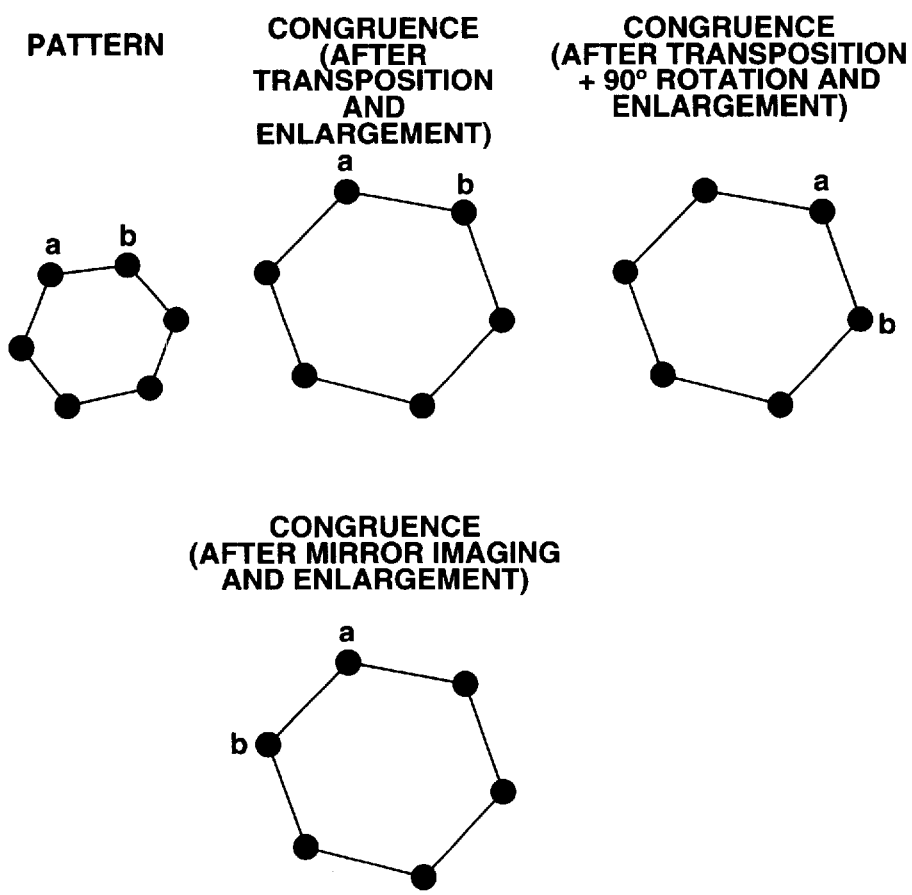

Although there may exist plural, specifically, up to a maximum of 2n=O(n), isometric transformations, S≡Q may or may not hold. All of these are listed and the number thereof is counted. Also, illustration is executed. In FIG. 17, several examples of the involute rotational symmetries are shown. Although it is not so difficult to detect whether or not S≡Q, it is difficult to list all transformations for which T(S)=Q. The set of transformations of the point sets S is represented by T(S)=(T|T(S)=S). Meanwhile, the symmetric group or the mirror group shown in "H. S. M. Coxeter, Introduction to Geometry, John Wiley & Sons, New York, 2nd Edition, 1969". "H. S. M. Coxeter, Refular Polytopes, Dover, New York, N.Y., 2nd Edition, 1973" and in "H. S. M. Coxeter, Regular Complex Polytopes, Cambridge University Press, Cambridge, England, 2nd Edition, 1991" is also represented by T(S)=(T|T(S)=S).

Atallah proposed an algorithm for detecting symmetry on a plane in "M. J. Atallah, On Symmetry Detection, IEEE Trans. Compt. C-34:663–666, 1985". It is also known from "S. Iwanowski, testing Approximate Symmetry in the Plane is NP-Hard, Theoret. Compt. Sci., 80: 227–262, 1991" that, if a point is allowed to wobble, the problem becomes so-called NP-difficult because the wobbling which renders the point set congruent needs to be found from point to point. The improvement concerning stability of the algorithm will be discussed subsequently.

The problem which renders the algorithm detecting the similarity of the point sets difficult is explained. The following problem of matching of all of the subsets of the letter string is to be solved: "Find Boolean array which gives 0[i]=1 if and if only a pattern p[1, ..., n] appears cyclically in a letter string s[1, ..., n], given such letter string s[1, ... m] and such pattern p[1, ..., m] on a finite alphabet Γ".

The problem of matching of all subset letter strings can be solved within O(n log³m), as shown in "Richard Cole and Ramesh Hariharan, Tree Pattern matching and Subset Matching in Randomized O(n log³m) time, In Proceedings of the Twenty-Ninth Annual ACM Symposium on Theory of Computing, pages 66–75, El Paso, Tex., May 4–6, 1997" or in "Richard Cole, Ramesh Hariharan and Piotr Indyk, Tree Pattern Matching and Subset Matching in Randomized O(n log³m), In proceedings of SODA, 1999, January 1999".

The sorted one-dimensional point sets S and Q can be solved within O(nm) time, using a simple algorithm. In the above-referenced "Tatsuya Akutsu, On Determining the Congruence of Point Sets in a d-dimensions, Comput. Geom. Theory Appl., 9(4): 247–256, 1988", Akutsu states that O^((M/n²) polylog n) time is required to detect whether or not the point set S is contained in the point set Q. Recently, Cardoze and Schulman proposed O^(N logN+ polylog Δ) algorithm, wherein N=max (n, m), with Δ being the diameter of the point set Q, in "Cardoze and Schulman, Pattern Matching for Spatial Point Sets, In FOCS: IEEE Symposium on Foundations of Computer Science (FOCS), 1998". In crystallography, in which the lattice is handled as an encoded infinite d-dimensional point set, it is routine practice to classify crystals by the transformation T labelled by the transformation groups. For example, it is known that 17, 320 and 4783 crystallographic groups exist in the two-dimensional space E2, three-dimensional space E3 and in the four-dimensional space E4, respectively.

As a noise model, a sphere having a center p and a radius ε is represented by the following equation (7):

$$\text{ball}(p,\epsilon)=\{q\epsilon E^d s.t. d_2(p,q)\leq \epsilon\} \quad (7)$$

whilst a point set containing wobbling is represented by the following equation (8):

$$S_\epsilon=\{S\epsilon\text{ball}(S_i, \epsilon)s.t.S\epsilon S\} \quad (8).$$

Figure 18A:
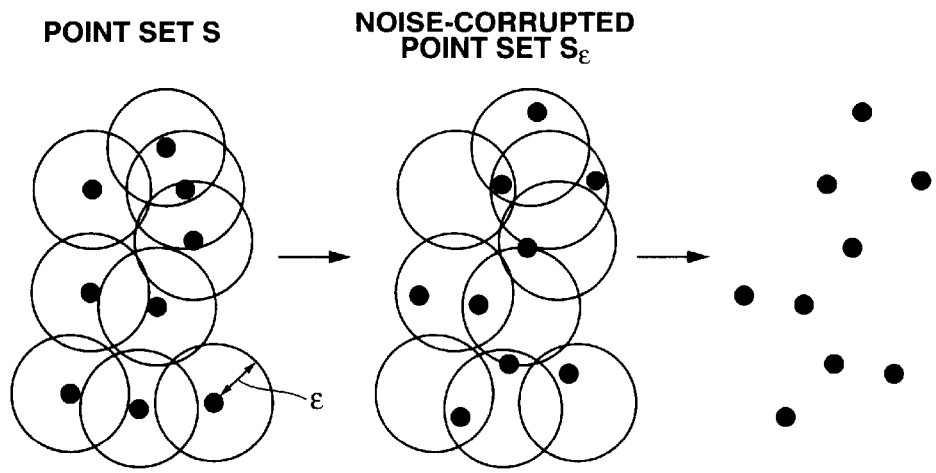
FIGS. 18A and 18B show point sets containing point sets and noise, where
Figure 18B:
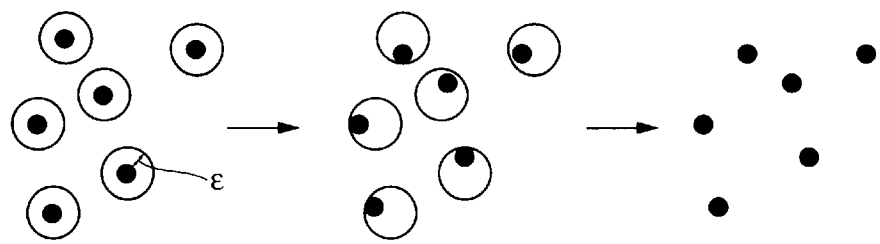

It is assumed that these points S∈S have been moved into a sphere having a radius ε. FIG. 18 shows a point set S and a noise-containing point set $S_\epsilon$. If the smallest point-to-point distance of the point set $d_{min}>\epsilon$, spheres centered about respective points in the point set S are elementary with respect to one another. This strengthens the pattern matching algorithm as will be explained subsequently.

The principle of congruence detection in the above-described two-dimensional space can be extended to congruence detection in the three-dimensional space. That is, centroids of both the point sets S, Q are computed and all points are projected on a unit spherical surface centered about the centroid of each set. The convex closure of the projected points is calculated. The original distance from the centroid is annexed as a label to each projected point and an adjacent list in the clockwise direction of the apex points of angles constituted by reciprocally adjacent points of the convex closure. Using a modification of the Tarjan plane graph congruence algorithm, shown in "J. E. Hopcroft and R. E. Tarjan, A. VlogV Algorithm for Isomorphism of Triconnected Planar Graphs, Journal of Computer and System Sciences, 7(3), June 1973", it is evaluated, within O(n log n) time, whether or not these two connotated planar graph congruence algorithm is isomorphic. If scaling is possible, both the point sets S, Q are normalized within O(n log n) time, with the smallest point-to-point distance being set to "1" for all fixed dimensions, as shown in "F. P. Preparata and M. I. Shamos, Computational Geometry: An Introduction, Spring-Verlag, New York, N.Y. 1985". If the number of dimensions is not less than "3", the smallest point-to-point distance is adopted, since there is not known the deterministic algorithm of computing the diameter of the n-point set of the d-dimensional space $E^d$ within $O_d(n \log n)$, as disclosed in "Sergel N. Bespamyatnikh, An Efficient Algorithm for the Three-dimensional Diameter Problem, In Proc. 9th ACM-SIAM Sympos. Discrete Algorithms, pages 137–146, 1998".

In the affine transformation, in place of the Euclid rigid motion (≡TA), the complexity is the same, as reported by Sprinzak and Werman in "J. Sprinzak and M. Werman, Affine Point Matching, Pattern Recogn. Lett., 15:337–339, 1994". This is particularly useful in recognizing a three-dimensional object from a two-dimensional image by orthogonal projection (affine transformation). Meanwhile, if it is required to list all of the possible O(n) transformations, it becomes necessary to use other effective algorithms. Wolter et al., proposed an optimum quadratic time and linear spatial algorithm, as a method for detecting the symmetry of a two-dimensional polyhedral and a three-dimensional polyhedral, in "Jan D. Wolter, Tony C. Woo and Richard A. Volz, Optimal Algorithms for Symmetry Detection in Two and Three Dimensions, The Visual Computer, 12(4): 193–201, 1996, ISSN0178-2789". This method can be used for detecting both symmetry and congruence, as in an optimum congruence three-dimensional polyhedral detection unit, as shown in "K. Sugihara, An n log algorithm for determining the congruity of polyhedra, J. Comput. Syst. Sci., 29:36–47, 1984".

The congruence in a higher order becomes more difficult to detect. Alt et al., acquires the algorithm of $O_d(n^{d-2} \log n)$ time shown in "H. Alt, K. Mehlhorn and Emo Welzl, Congruence, Similarity and Symmetries of Geometric Objects, Discrete Comput. Geom., 3:237–256, 1988", by reducing the space, as shown in "H. Alt and L. Guibas, Resemblance of Geometric Objects. In Jorg-Rudiger Sack and Jorge Urruitia, editors, Handbook of Computational Geometry, Elsevier Science Publishers B. V. north-Holland, Amsterdam, 1998". In actuality, the congruence in the d-dimensional space can be realized by carrying out congruence detection in the (d−1) dimensional space n times. Akutsu recently proposed random time and spatial algorithm in "Tatsuya Akutsu, On Determining the Congruence of Point Sets in d-dimensions, Comput. Geom. Theory Appl., 9(4): 247–256, 1998". The primitive technique in solving whether or not the sets S and Q is such that S≡Q is selecting an optional (d−1) simplex $\delta s = (S_1, \ldots, S_d)$ of a set S to compute all of x transformations to the set Q. meanwhile, x is represented by the following equation (9):

$$d! \binom{n}{d}. \tag{9}$$

If each transformation corresponds to the motion of a rigid body, physical identity is evaluated within $O_d(n \log n)$ time. Given a subset made up of non-degrading d set $S=(S_1, \ldots, S_d)$ and d points of the set Q, there are d! possible transformations to be checked, corresponding to the different permutations of the points of the simplex δs, these not necessarily being a motion of a rigid body. That is, the matrix and Rd are not necessarily be orthogonal. The transformation which gives a mapping $S_i \rightarrow Q_i$ for all $i \in (1, \ldots, d)$ in the affine transformation is expressed by the following equation (10):

$$T[(S_1, \ldots, S_d), (Q_1, \ldots, Q_d)] = R \tag{10}$$

This transformation is computed as shown in the following equation (11):

$$\forall i \in [1, d] R_d S_i^T = Q_i^T \tag{11}$$

If Rd is expressed as in the following equation (12):

$$R_d = \begin{pmatrix} l_1 \\ \vdots \\ l_d \end{pmatrix} \tag{12}$$

we obtain the following equation (13):

$$l_1 = (Q_{ij})_{j=1,\ldots d} \begin{pmatrix} S_1^T \\ \vdots \\ S_d^T \end{pmatrix}^{-1}. \tag{13}$$

$Q_{i,j}$ in the above equation (13) is the jth component of the point $Q_i$.

At this time, the centroids of the sets S and Q are matched, it is sufficient if (d−2) simplexes for (d−1) sets are considered. The computing time employing the linear spaces of the primitive methods is $O_d(n^d \log n)$. Meanwhile, congruence can similarly be detected for affine transformation. There is now proposed a simple deterministic algorithm for which time complexity employing the $O(n^{floor[d/2]})$ space for the d-dimensional congruent operator to the point set is $O(n^{floor[d+1)/2]} \log n)$ space, where floor[A] is the smallest integer which is not smaller than A. This method is based on a principle that the relation between the sets S and Q nd the convex closures thereof conv(S), conv(Q) is represented by the following equation (14):

$$S \equiv Q \rightarrow \text{conv}(S) \equiv \text{conv}(Q) \tag{14}$$

This is based on the fact that the following equation (15):

$$\text{conv}(T(S)) = T(\text{conv}(S)) \tag{15}$$

holds for the affine transformation T∈TA.

It is noted that the following equations (16) and (17) hold:

$$D(S) = \{d_2(S_i, S_j) > 0 | S_i, S_j \in S\} \tag{16}$$

$$D_S(1)\{\{S_i, S_j\} | S_i, S_j \in S s.t. d_2(S_i, S_j) = 1\} \tag{17}$$

Figure 19:
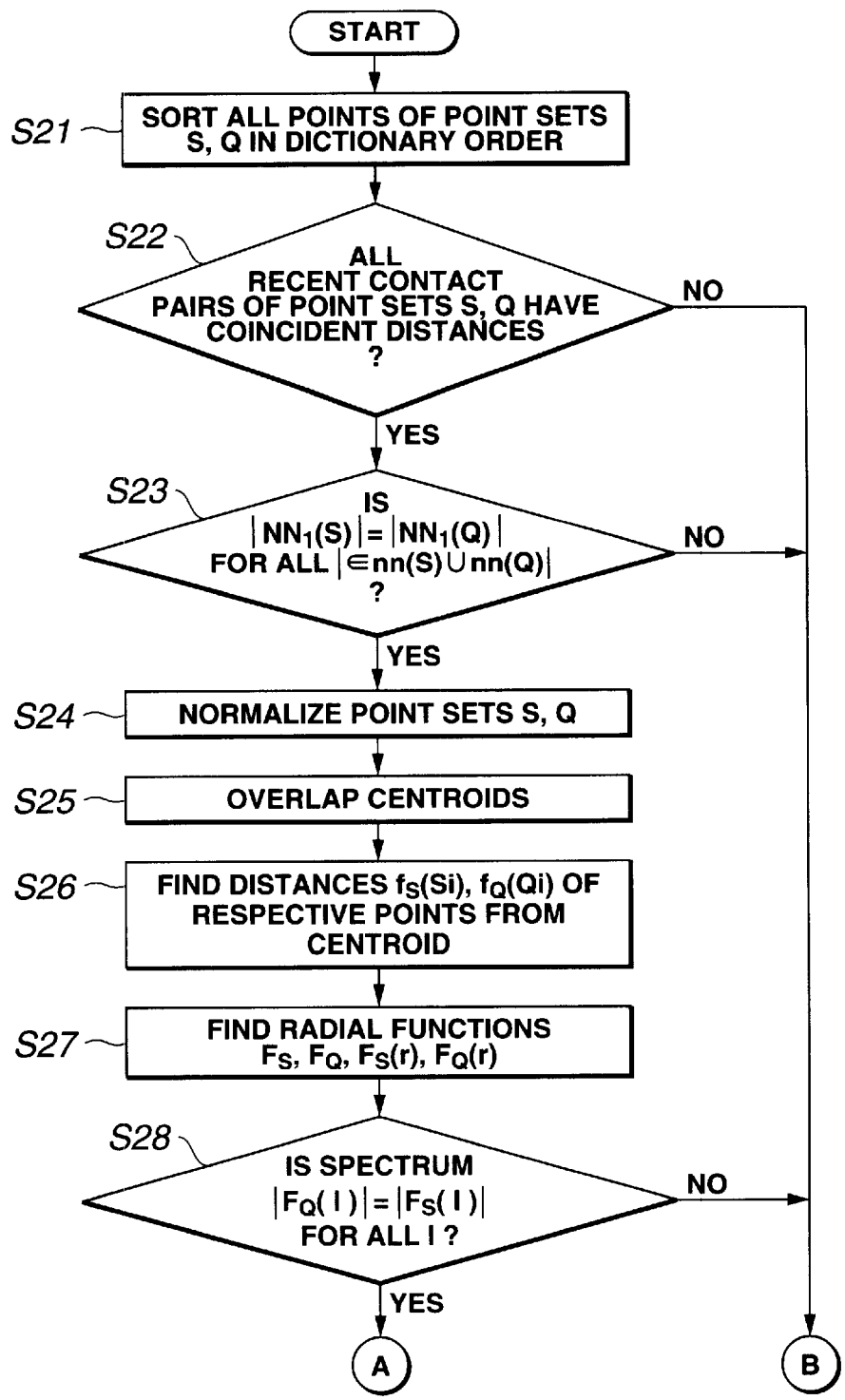
FIG. 19 is a flowchart for illustrating the sequence of the processing in detecting whether or not two point sets are congruent in an image processing apparatus and specifically for illustrating the processing for a former half portion.
Figure 20:
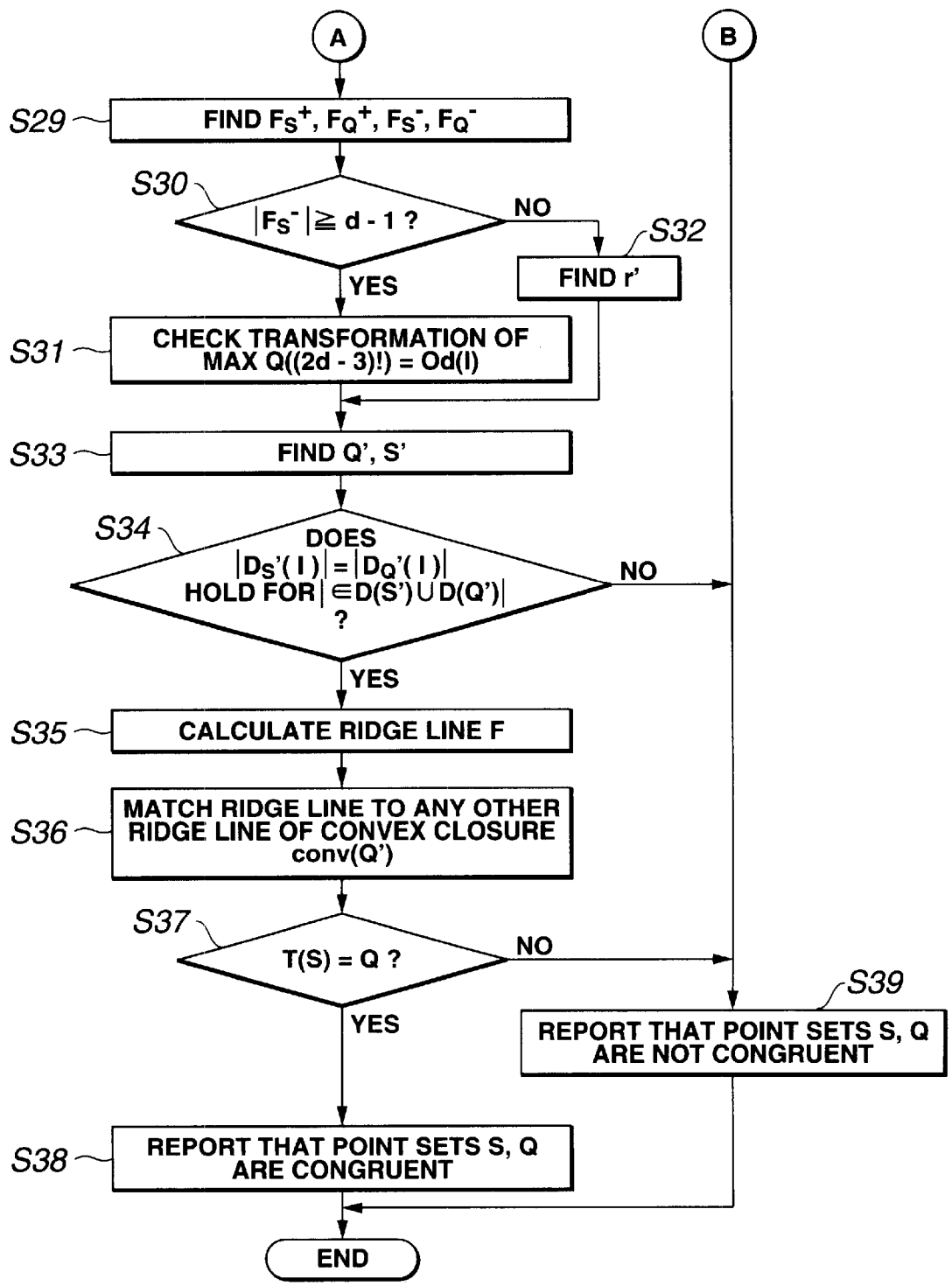
FIG. 20 is a flowchart for illustrating the sequence of the processing in detecting whether or not two point sets are congruent in an image processing apparatus and specifically for illustrating the processing for a latter half portion.
Figure 21A:
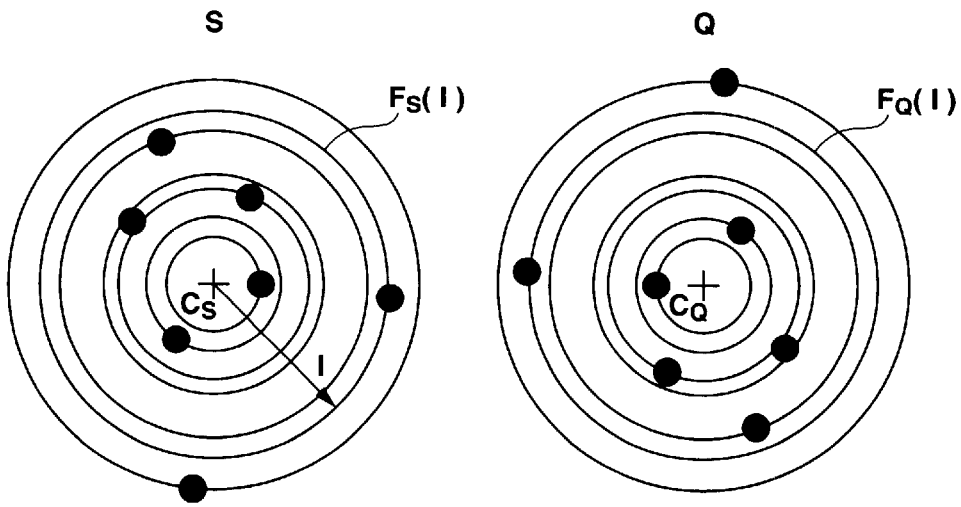
FIGS. 21A and 21B show examples of two congruent point sets, where
Figure 21B:
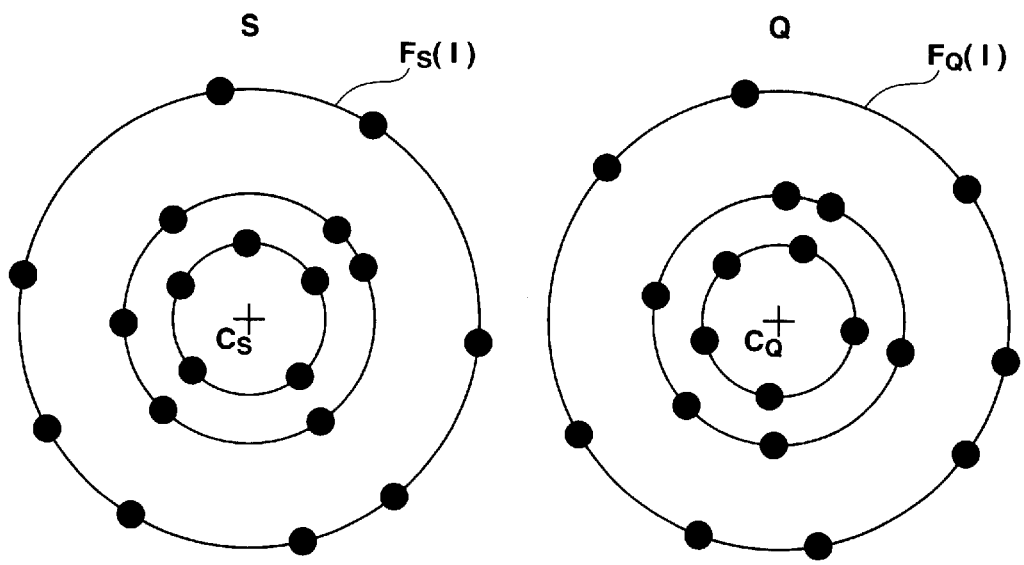

The image processing apparatus 10 performs a sequence of operations shown in FIGS. 19 and 20 to detect whether or not the point sets S and Q are congruent.

First, the image processing apparatus 10 inputs d-dimensional n point sets S, Q at step S21 in FIG. 19 to array the points of these point sets S and Q in a dictionary order.

The image processing apparatus 10 then verifies at step S22 whether or not the all nearest neighbor point pairs of the point sets S and Q at time $O_d(n \log)$ time have coincident distances. That is, the image processing apparatus 10 computes the following equations (18) and (19) for the respective points S∈S, while computing the following equations (20) and (21) for the respective points Q∈Q, the nearest neighbor point pairs are explained in "P. M. Vaidya, An O(n log n) algorithm for the all-nearest neighbors problem, Discrete Comput, Geom., 4:101–115, 1988".

$$nn(S)=\min_{S'\epsilon S/S}\{d_2(S, S')\} \quad (18)$$

$$NN(S)=\{S'\epsilon S s.t. d_2(S', S)=nn(S)\} \quad (19)$$

$$nn(Q)=\min_{Q'\epsilon Q/Q}\{d_2(Q, Q')\} \quad (20)$$

$$NN(Q)=\{Q'\epsilon Q s.t. d_2(Q', Q)=nn(Q)\} \quad (21).$$

It is noted that, if all nearest neighbor point pairs of the point sets S and Q are not of the coincident distance, the point sets S and Q are not congruent. Thus, the image processing apparatus 10 shifts the step S39 in FIG. 20 to report that the point sets S, Q are not congruent to terminate the sequence of operations.

If all nearest neighbor point pairs of the point sets S and Q are of the coincident distance, the image processing apparatus 10 shifts to step S23 in FIG. 19. Since the point sets S and Q are multi-sets, the concentration of these elements needs to be checked in its entirety. Thus, at step S23, with the following equations (22), (23):

$$nn(S)=\{nn(S)|S\epsilon S\} \quad (22)$$

$$NN_1(S)=\{NN(S)s.t. nn(S)=1\} \quad (23)$$

it is checked whether or not $|NN_1(S)|=|NN_1(Q)|$ for all 1 $\epsilon nn(S)Unn(Q)$. That is, the image processing apparatus 10 detects the multiplicity of the points and subsequently handles separate point sets.

If $|NN_1(S)|=|NN_1(Q)|$ does not hold for all 1 $\epsilon nn(S)$ $Unn(Q)$, the point sets S, Q are not congruent. The image processing apparatus 10 shifts to step S39 in FIG. 20 to report that the point sets S, Q are not congruent to terminate the sequence of operations.

If $|NN_1(S)|=|NN_1(Q)|$ holds for all 1 $\epsilon nn(S)$ $Unn(Q)$, the image processing apparatus 10 proceeds to step S24 in FIG. 19 to compute the smallest point-to-point distance strictly larger than "0" within $O_d$(n log n) time to normalize both the point sets S and Q. Thus, the image processing apparatus 10 can acquire a uniform zoom value, by employing $\equiv_{TI}$ in place of $\equiv_{TS}$, as may be seen on referring to "J. L. Bentley and M. I. Shamos, Divide-and-conquer in multidimensional space, In Proc. 8th Ann. ACM Sympos. Theory Compt., pages 220 to 230, 1976" or to "F.P. Preparata and M. I. Shamos, Computational Geometry: An Introduction, Springer-Verlag, New York, N.Y., 1985". A non-uniform zoom value is difficult to compute, even though it can be found by computing smallest tightly closed orthogonal box.

Then, at step S25, the image processing apparatus 10 computes the centroids of the normalized sets and overlaps these centroids. That is, the image processing apparatus 10 sets $c_S=c_Q$ and fixes the transformation $t_d$ at $c_Q-c_S$.

Then, at step S26, the image processing apparatus 10 finds the distances $f_S(S_i)$, $f_Q(Q_i)$ of the respective points from the respective centroids in accordance with the following equations (24) and (25):

$$f_S(S_i)=d_2(S_i, c_S) \quad (24)$$

$$f_Q(Q_i)=d_2(Q_i, c_Q) \quad (25).$$

The image processing apparatus 10 then finds, at step S27, the pertinent radius functions $F_S$. $F_Q$, $F_S(r)$ and $F_Q(r)$ in accordance with the following equations (26) to (29):

$$F_S=\{f_s(S_i)|S_i\epsilon S\} \quad (26)$$

$$F_Q=\{f_Q(Q_i)|Q_i\epsilon Q\} \quad (27)$$

$$F_S(r)=\{S_i\epsilon S|d_2(S_i, c_S)=r\} \quad (28)$$

$$F_Q(r)=\{Q_i\epsilon Q|d_2(Q_i, c_Q)=r\} \quad (29).$$

The image processing apparatus 10 then checks at step S28 whether or not the spectrum is $|F_Q(1)|=|F_S(1)|$ for all 1s.

If the spectrum is such that $|F_Q(1)|\neq|F_S(1)|$, the point sets S, Q are not congruent, that is the time is $O_d$(n log n), such that the image processing apparatus 10 shifts to step S39 in FIG. 20 to report that the point sets S, Q are not congruent to terminate a sequence of operations.

On the other hand, if the spectrum is such that $|F_Q(1)|=|F_S(1)|$, the image processing apparatus 10 at step S29 finds $F_S^+$, $F_Q^+$, $F_S^-$ and $F_Q^-$ in accordance with the following equations (30) to (33):

$$F_S^+=\{F_S(r)s.t.|F_S(r)|\geq d-1\} \quad (30)$$

$$F_Q^+=\{F_Q(r)s.t.|F_Q(r)|\geq d-1\} \quad (31)$$

$$F_S^-=S\backslash F_S^+ \quad (32)$$

$$F_Q^-=Q\backslash F_Q^+ \quad (33)$$

as shown in FIG. 20.

The image processing apparatus 10 then checks at step S30 whether or not $|F_S^-|\geq d-1$.

If $|F_S^-|\geq d-1$ holds, the image processing apparatus 10 selects at step S31 the smallest number of layers of $F_S^-$ having at least d-1 points to check the transformation of the maximum $O((2d-3)!)=O_d(1)$. Meanwhile, the image processing apparatus 10 performs similar processing on $F_Q^-$.

If $|F_S^-|\geq d-1$ does not hold, the image processing apparatus 10 shifts to step S32 to find r' in accordance with the following equation (34):

$$r'=\min\{|F_S(r)s.t.|F_S(r)|\geq d-1\} \quad (34).$$

The image processing apparatus 10 shifts to step S33 to find Q' and S' in accordance with the equations (35) and (36):

$$Q'=F_Q(r') \quad (35)$$

$$S'=F_S(r') \quad (36).$$

The image processing apparatus 10 then shifts to step S34 to compute geometric graphs of S' and Q', as disclosed in "H. P. Lenhof and M. Smid, Sequential and Parallel Algorithms for the k Closest Pairs Problem, Internet, J. Comput. Geom, Appl., 5:273–288, 1995", and verifies, within time O(n2), whether or not these have the iterative distance of the same number, that is whether or not $|D_{S'}(1)|=|D_{Q'}(1)|$ holds for 1 of 1$\epsilon$D(S')UD(Q'), by listing all distances of S' and Q' in the arrayed sequence.

It is noted that if the geometrical graphs of S' and Q' are not of the iterative distance of the same number, the point sets S, Q are not congruent, so that the image processing apparatus 10 shifts to step S39 to report that point sets S, Q are not congruent to terminate the processing.

Conversely, if the geometrical graphs of S' and Q' are of the iterative distance of the same number, the image processing apparatus 10 shifts to step S35 to compute the (d−2) plane F of the convex closure of S', that is a ridge line, using a linear program and a convex closure (Q') of Q', as disclosed in "R. Seidel, Constructing Higher-Dimensional Convex Hulls at Logarithmic Cost per Face, In Proc. 18th" Annu. ACM Sympos. Theory Comput., pages 404 to 413, 19867".

The image processing apparatus 10 then advances to step S36 to match the ridge line F to any other one of ridge lines of the convex closure (Q') which in general is a (d–2) plane defining (d–1) points. The ridge line pairs each define up to a maximum of a (d–1)! rigid motions.

The image processing apparatus 10 then verifies at step S37 whether or not T(S)=Q holds for the given rigid body motion T∈T.

If T(S)=Q does not hold for the given rigid body motion T∈T, the point sets S, Q are not congruent. Thus, the image processing apparatus 10 moves to step S39 to report that the point sets S, Q are congruent to terminate the sequence of processing operations.

If T(S)=Q holds for the given rigid body motion T∈T, the image processing apparatus 10 at step S38 reports that the point sets S, Q are congruent to terminate the sequence of processing operations.

It is also possible for the image processing apparatus 10 to treat not only the rigid motion but also affine transformation.

In this manner, the image processing apparatus 10 can detect whether or not the point sets S, Q are congruent. The image processing apparatus 10 can detect that point sets S, Q, each having only a sole point on a circle of a given radius, as shown in FIG. 2A, and the point sets S, Q, each having plural points on a circle of a given radius, as shown in FIG. 2B, are congruent. By detecting the congruence in this manner, the image processing apparatus 10 is able to identify an optional object in image data from an optional object in the image data from different sources.

Since the point sets S', Q' are spheres centered about $c_S=c_Q$, the points are in the non-degenerated positions. Thus, in the image processing apparatus 10, the convex closure algorithm can be simpler. The time complexity of the algorithm can be represented as O(hn log n+C(n, n)), using the number h of the facets of the convex closure conv(Q') and time complexity in computing all these facets C(n, h). If, for example, an optimum algorithm of Chazelle shown in "Bernard Chazelle, An Optimum Convex Hull Algorithm in any Fixed Dimension, Discrete Comput. Geom., 10:377–409, 1993" and the $O(n^{floor[d/2]})$ space, $O(n^{floor[(d+1)/2]} \log n)$ time algorithm is obtained. If the Seidel's shell method, disclosed in "R. Seidel, Constructing Higher-Dimensional Convex Hull at Logarithmic cost per Face, In Proc. 18th Annu. ACM Sympos. Theory Comput., pages 404–413, 1986", is used, it becomes possible to use a linear memory space. These results show that the maximum number of the congruence transformation is pertinent to the symmetry of the polyhedrals, as disclosed in "E. Sculte, Symmetry of Polytopes and Polyhedra, In Jacob E. Goodman and Joseph O'Rourke, editors, Handbook of Discrete and Computational Geometry, chapter 16, pages 311–330, CRC Press LLC, Boca Raton, Fla., 1997". More accurately, the algorithm computing time can be expressed as $O(n^{floor[d/2]}+tT_C(n))$, using the run time $T_C(n)$ necessary in checking a transformation and the number t of the rigid body motions defined by (d–1) sets of the point sets S and Q. Meanwhile, the image processing apparatus 10 also checks into coincidence of simplex volume previously defined by these sets.

If the degree of point wobbling is small as compared to the nearest distance between two optional points of the set S and that of the set Q, the algorithm shown in FIGS. 19 and 20 is strong. That is, it is sufficient if involute thin spherical layers prime to each other is considered in place of the resolution in the radial direction. The image processing apparatus 10 then processes in accordance with the following equation (37):

$$\epsilon' = \min\{1/2|r_i - r_j| > 0 \, s.t. |F_S(r_i)| > 0, |F_S(r_j)| > 0\} \quad (37).$$

Meanwhile, changes in the centroid relative to the white noise is small in comparison with ε.

If the diameter of the point set Q, which can be defined as a ratio $\Delta_Q$ of the maximum value of the point-to-point distance to the minimum value of the point-to-point distance of separate points given by the following equation (38):

$$\Delta_Q = \frac{\max\{d_2(Q_i, Q_j)Q_i, Q_j \in Q\}}{\min\{d_2(Q_i, Q_j) > 0, Q_i, Q_j \in Q\}} \quad (38)$$

is limited by $O(n^{1/d})$ in the most favorable case, better results can be obtained with the image processing apparatus 10, as proposed in "P. Indyk, R. Motwani and S. Venkatasubraminian, Geometric Matching under Noise: Combinatorial Bounds and Algorithms, In SODA: Symposium of Data Structures and Algorithms 1999".

In actuality, by employing a standard bucket, the image processing apparatus 10 is able to perform pre-processing of the point sets S, Q into a bucket of a size of $O(\Delta^d)$ within $O(\Delta^d + dn)$ by employing a standard bucket method. If the smallest point-to-point distance of the point set Q is expressed as $d_{min}(Q)$, the lateral side of each bucket is not in excess of $(d_{min}(Q) - 2\epsilon)/\sqrt{d}$. Therefore, each bucket has a point of the point set Q at the maximum. Because of the centroid coincidence, the image processing apparatus 10 performs geometrical inquiries of O(nd) concerning the points of the bucketized point set Q of the geometrical object with the number of orders of $O_d(1)$ of (d–1) points to a selected (d–2) simplex of the point set S of (d–1) points with the total cost $O_d(n\Delta^{d(d-1)/2})$. Meanwhile, an algebraic object is also found for the simplex of the point set Q. Once a reference point is selected, each point of the simplex $\delta \in S$ belongs to a common portion of d balls or cups. The image processing apparatus 10 computes, for each (d–2) simplex of the point set Q, (d–1)! at the maximum of the simplex matchings under rigid transformation are computed to check possible presence of matchings within O(dn) time. The total cost of the algorithm is $O_d(\Delta^d + \min(\lambda(d, d-2, n), n\Delta^{d(d-1)/2})$ Tc(n,m)). Meanwhile, $\lambda$(d, d–2, n) is a symbol shown in "T. Akutsu, H. Tamaki and T. Tokuyama, Distribution of Distances and Triangles in a Point Set and Algorithms for Computing the Largest Common Point Sety, Discrete and Computational Geometry, pages 207–331, 1998" and is the maximum number of congruent duplication of the (d–2) simplex in the d-dimensional n point sets. Clearly, $\lambda$(d, d–2, n)=$O(n^{d-1})$. Therefore, the executing time for the dense point set is $O_d(n^{(d+3)/2})$.

Meanwhile, it is open to discussion whether or not A will be increased with $n^{1/d}$. In actuality, this is related with the non-coincidence theory. On the other hand, if Δ is not related with n, there is a possibility that the "shape" or the main axis of the point set can be used for congruence detection. If two convex layers S', Q' are selected from the point sets S and Q, it is necessary for the image processing apparatus 10 to detect the congruence in $S_{d-1}$. This is possible by detecting the matching of particular subsets of dense $[0, 4\pi]^{d-1}$ of a density of at least $1/2^d$ equal to the proportion of the matching points. More accurately, the image processing apparatus 10 finds the n-point sets which is a subset of $2^d$n point set.

The symmetry detection algorithm for the point set in the d-dimensional space $E^d$ is explained. The algorithm used for congruence detection, as described above, is a core in efficiently finding point set symmetry. Here, it is attempted to list all transformations T(S) for which T(S)=S.

Figure 22:
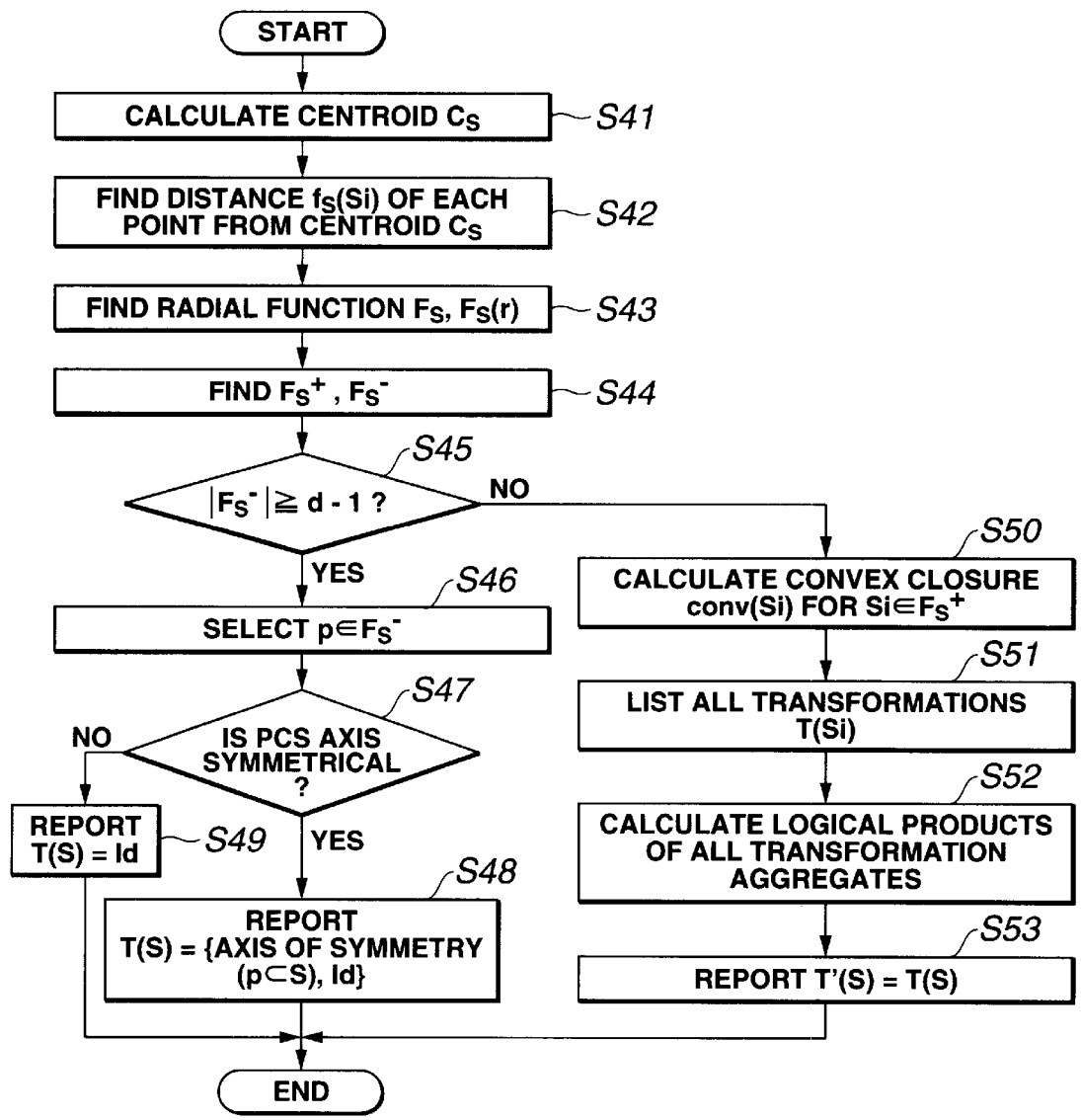
FIG. 22 is a flowchart for illustrating a sequence of operations in detecting symmetry of two-dimensional point sets in an image processing apparatus.

The image processing apparatus 10 detects the symmetry of the two-dimensional point set S by the sequence of process steps shown in FIG. 22.

First, the image processing apparatus 10 computes the centroid $c_S$ of the point set S at step S41. If a two-dimensional point set $S=(p_i=(x_i, y_i))$, where $n=1, \ldots, n$, is inputted, the centroid $c_S$ is found by the following equation (39):

$$C_S=(1/n)\Sigma_{i=1}{}^n p_i=(1/n)(\Sigma_{i=1}{}^n x_i, \Sigma_{i=1}{}^n y_i) \qquad (39).$$

The image processing apparatus 10 adds the transformation Id, as an identify mapping to T(S).

The image processing apparatus 10 then finds at step Serial/parallel conversion circuit 42 the distance $f_S(S_i)$ of each point from the centroid $c_S$ by the above equation (24).

The image processing apparatus 10 then finds at step S43 the relevant radius functions $F_S$, $F_S(r)$ in accordance with the above equations (26) and (28).

The image processing apparatus 10 then finds at step S44 $F_S^+$ and $F_S^-$ in accordance with the equations (30) and (32), respectively.

The image processing apparatus 10 then verifies at step S45 whether or not $|F^{S-}|\geq 1$.

If $|F_S^-|\geq 1$, the image processing apparatus 10 selects at step S46 a point for which $p \epsilon F_S^-$ and verifies at step S47 whether or not the axis of $p \subset S$ is symmetrical at the selected point p.

If the axis of $p \subset S$ is symmetrical, the image processing apparatus 10 reports T(S)={symmetrical axis $(p \subset S)$ Id} at step S48 to terminate the sequence of processing operations.

On the other hand, if an axis for which $p \subset S$ is not symmetrical, the image processing apparatus 10 at step S49 reports that T(S)=Id (identity) to terminate the sequence of operations.

If $|F_S^-|\geq 1$ does not hold at step S45, the image processing apparatus 10 at step S50 computes, for each $Si \epsilon F_S^+$, its convex closure $(S_i)$, and lists at step S51 all transformations $T(S_i)=(T|T(S_i)=S_i)$, using the convex closure conv$(S_i)$.

The image processing apparatus 10 then computes at step S52 a common portion, that is a logical product, of all transformation sets, in accordance with the following equation (40):

$$T(S)=\cap_i T(S_i) \qquad (40).$$

The image processing apparatus 10 at step S53 reports on T'(S)=T(S) to terminate the processing sequence.

Figure 23:
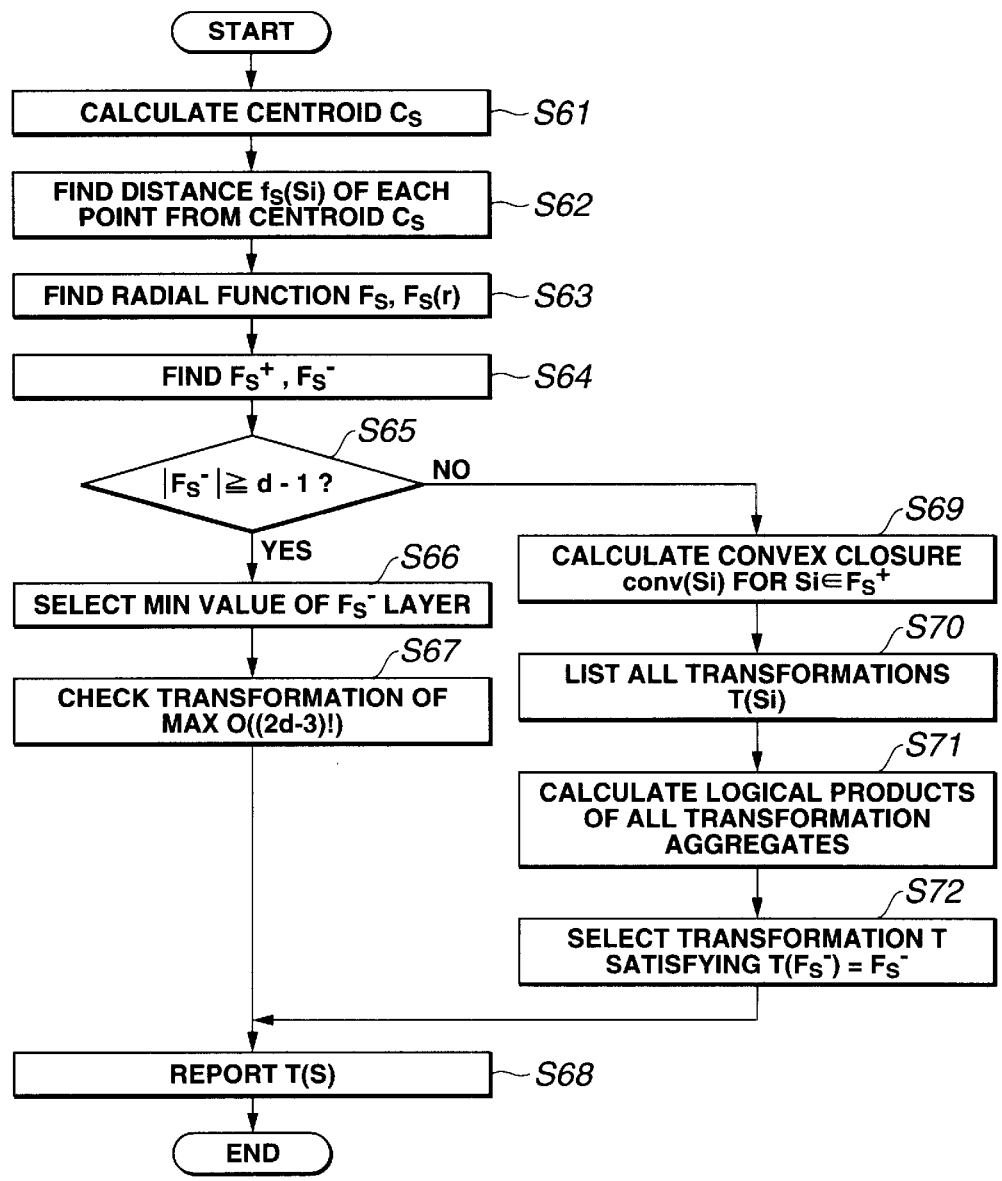
FIG. 23 is a flowchart for illustrating a sequence of processing operations in detecting symmetry of d-dimensional point sets in an image processing apparatus.

In this manner, the image processing apparatus 10 is able to detect symmetry of the d-dimensional point set S by the processing sequence shown in FIG. 23.

On the other hand, the image processing apparatus 10 detects the symmetry of the d-dimensional point set S by passing through a sequence of operations shown in FIG. 23.

First, the image processing apparatus 10 computes the centroid $c_S$ of the point set S at step S61, as shown in FIG. 23. The image processing apparatus 10 adds a transformation Id, as an identify mapping, to T(S).

The image processing apparatus 10 then finds at step S62 the distance $f_S(S_i)$ of each point from the centroid cs in accordance with the above equation (24).

The image processing apparatus 10 then finds at step S63 the relevant radius function $F_S$, $F_S(r)$ in accordance with the above equations (26) and (28).

The image processing apparatus 10 then finds $F_S^+$, $F_S^-$ at step S64 in accordance with the above equations (30), (32).

The image processing apparatus 10 then checks at step S65 whether or not $|F_S^-|\geq d-1$.

If $|F_S^-|\geq d-1$ holds, the image processing apparatus 10 at step S66 selects the smallest value of the $F_S^-$ layer having at least d−1 and at most 2d−3 points.

The image processing apparatus 10 at step S67 checks up to the maximum of O((2d−3)!) transformations and reports on T(S) at step S68 to terminate the sequence of processing operations.

If $|F_S^-|\geq d-1$ fails to hold, the image processing apparatus 10 at step S69 computes a convex closure $(S_i)$ for each spherical point set $S_i \epsilon F_S^+$ and applies symmetrical computing algorithm at step S70 to the convex spherical body to list all transformations $T(S_i)=(T|T(S_i)=S_j)$.

The image processing apparatus 10 then computes a common portion, that is a logical product, of all transformation sets, from the above equation (40).

The image processing apparatus 10 then selects at step S72 a transformation $T(F_S^-)=F_S^-$ from the transformations T.

The image processing apparatus 10 then reports on T(S)= $(T \epsilon T(S) s.t. T(F_S^-)$ to terminate the sequence of operations.

In this manner, the image processing apparatus 10 is able to detect the symmetry of the d-dimensional point set S.

The image processing apparatus 10 thus detects the symmetry to compress the data based on the detected symmetry.

Using time complexity $T_d(n)$ in detecting congruence of concentrical n-point point set, the time complexity of the above algorithms is expressed as $O(T_d(n) \log n)$. Since there is no necessity of checking into all transformations $T \epsilon T(S)$, it is possible to save the check time of the image processing apparatus 10.

Meanwhile, it occurs frequently that these algorithms, employing real RAM models for computations, are low in tolerance against noise such as NP difficulties known as a problem related to large noise. However, if the following equation (41):

$$T(S)=\cap_i T(S_i) \qquad (41)$$

is used, up to the maximum of $D_{min}/2$ of the noise can be tolerated in checking whether or not T(S)=Q. Although the algorithm cost is increased n an amount corresponding to the orthogonal region inquiry algorithm coefficient, it is possible to render the image processing apparatus 10 higher in reliability against noise of $\epsilon \leq d_{min}/2\sqrt{d}$ by using the following equation (42):

$$d_{min}=\min_{Si \sim Sj} d_2(S_i, S_j) \qquad (42)$$

It is also possible for the image processing apparatus 10 to check into toughness of the algorithm against all e represented by the following equation (43):

$$\epsilon \leq A_{min}=\max_{v \epsilon (1, \ldots, d)} \min_{i,j \epsilon i, \ldots, m} |Q_{i,v} - Q_{j,v}| \qquad (43)$$

by multiplying the algorithm with the coefficient $O(d \times d!)$. Meanwhile, if desired to raise precision in $\epsilon \leq dmin/2$, it is necessary to compute the nearest neighbor point in a higher dimension accurately.

It is possible for the image processing apparatus 10 to design an analogous algorithm, having the same time complexity against odd-numbered dimensions, based on the nearest neighbor point algorithm described in the above-mentioned "P. M. Viadya, An 0(n log n) Algorithm for the All-Nearest Neighbors Problem, Discrete Comput. Geom., 4:101–115, 1989".

The image processing apparatus 10 computes the nearest neighbor graph nn(S), nn(Q), NN(S) and NN(Q) of the point sets S, Q by the above equations (18) to (21) and subsequently verifies whether or not |NN1(S)|=|NN1(Q)| holds for all 1 $\epsilon$ nn(S)$\cup$nn(Q). That is, the image processing apparatus 10 detects the multiplicity of the point and subsequently handles separate point sets.

If |NN1(S)|=|NN1(Q)| fails to hold for all 1 $\epsilon$ nn(S)$\cup$nn (Q), the point sets S, Q are not congruent. The point $S \epsilon S$ can only be the nearest neighbor point for $k_d=0_d(i)=|NN(S)|$ or other points of the point set S placed under limitations but which satisfy the relation $k_d \geq 2^d$. If $O_{kd}(1)$ separate distances are present for nn(S), the image processing apparatus 10 checks for congruence in $0_d(T_c(n))$. If there are not present $0_{kd}(^1)$ separate distances in nn(S), there exists a distance value 1. This distance value is repeated frequently, that is, equal to $\Omega(n)$ for n<<d.

The image processing apparatus 10 then selects all of the ceil[(d−1)/2] possible combinations of the point sets Q having an edge value of 1 and a size equal to ceil[(d−1)/2]. The image processing apparatus 10 at this time adds a centroid to compute the transformation. It is noted that ceil[A] is the largest integer not exceeding A.

The time complexity of the algorithm is expressed by $O(n^{ceil[(d-1)/2]}T_c(n))=O(n^{ceil[(d+1)/2]}\log n)$.

Meanwhile, the above-described bucketing method can similarly be applied to the image processing apparatus 10. Since the algorithm executing time is a quadratic function, the image processing apparatus 10 can compute all NN's within $O(n^2)$ time.

Next, explanation is given on strict self-similarity. If and only if there exists $T \neq Id$ such that $T(Q)=Q$, the set Q is said to have self-similarity. If there exist r different mappings from the set S to itself, the set S is said to have r-times similarity. If n or n−1 is divisible by p, there exist 2p reciprocally similar planar point sets such that there are 2(n−1)/p similarities, as shown in FIG. 24. Moreover, because of mirroring, there are sets having duplex similarity for an optional n. It is an interesting problem to find the value of r in case a given integer n has r-times similarity of the sets, or to formulate a set of n points having r-times similarity for the given n. Another interesting problem is perform characteristization in a space of a transform T also termed an environmental space to find an answer to a question whether or not there exists a n-point set having different points having r-times similarity. Attention should be directed to the fact that the n-point set having r-times similarity necessarily becomes a concentric spherical points for a larger value of r. Zabrodsky et al., introduced symmetrical consecutive indices by minimizing the wobbling of input points in "Hagit Zabrodsky, Shmuel Peleg and David Avnir, Symmetry as a Continuous Feature, Pattern Analysis and Machine Intelligence, August 93". These consecutive indices can also be used as indices for the strength of the congruence detection algorithm.

Tables 1 to 3 collectively show the results known in the geometrical congruence problems with reference materials on the approximate pattern matching. Meanwhile, attention should be directed to the fact that the approximation coefficients coact with the noise parameter expressed by a symbol *.

| congruence problem | results |
|---|---|
| accurate | for $d \leq 3$, $\Theta(n \log n)$; "M.J. Atallah, On Symmetry Detection, IEEE Trans. Comput., C-34-663-666, 1985"; "P.T. Highmam, Optimal Algorithms for Finding the Symmetries of a Planar Point Set, Inform. Process. Leit., 22;2-19-222, 1986"; "M.D. Atkinson, An Optimal Algorithm for Geometrical Congruence, J. Algorithms, 8:159-172, 1987"; and "H. Alt, K. Mehlorn, H. Wagener and Emo Welzl, Congruence, Similarity and Symmetries of Geometric Objects, Discrete Comput. 3:237–256, 1988" $O(n^d \log n)$ time; primitive algorithm $O(n^{d-2} \log n)$ time; in "H. Alt, K.Mehlhorn, H. Wagener and Emo Welzl, Congruence, Similarity and Symmetries of Geometric Objects, Discrete Comput. Geom., 3:237–256. 1988"; d→d-1 contraction for $d \geq 4$, $O\,\hat{}\,(n^{(n+1)n} \log^2 n)$ time, $O\,\hat{}\,(n^{(d-1)n})$ space, in "Tatsuya Akutsu, On Determining the Congruence of Point Sets in d-dimensions, Comput. Geom. Theory Appl., 9(4); 247–256, 1998"; birthday paradox $O(n^{(d+1)/2} \log n)$, linear space; convex closure, NN graph homomorphic in $\infty_{poly}$ infinite dimension in "Tatsuya Akutsu, On Determining the Congruence of Point Sets in d-dimensions, Comput. Geom. Theory appl., 9(4):247–256, 1998" |

TABLE 2

| congruence problem | results |
|---|---|
| noise | NP difficult for $d \geq 2$; "S. Iwanowski, Testing Approximate Symmetry in the plane is NP-hard, Theoret. Comput. Sci., 80:227–262, 1991" |

TABLE 3

| congruence problem | results |
|---|---|
| approximate noise | $O\,\hat{}\,(n^{3/2}\text{ polylog } n)$ (wrong negation and affirmation); "P.J. Hefferman and S. Scirra, Approximate Decision Algorithms for Point Set Congruence, Comput. Geom. Theory Appln., 4:137–156, 1994"; "M.T. Goodrich, Joseph S. B. Mitchell and M.W. Orleisky, Practical Methods for Approximate Geometric Pattern Matching under Rigid Motion, In Proc. 10$^{th}$ Annu. ACM Sympos, Comput. Geom., pages 103–112, 1994"; "A. Efrat, Finding Approximate Matching of Points and Segments under Translation, Unpublished Manuscript, 1995" |

The problem in the approximate algorithm is that transformation is eventually not reported in correct fashion to a question on whether or not there exists congruence, depending on the degree of ambiguity, as will be understood from reference to "J. Hefferman and S. Scirra, Approximate Decision Algorithms for Point Set Congruence, Comput. Geom. Theory Appln., 4:137–156, 1994"; "M. T. Goodrich, Joseph S. B. Mitchell and M. W. Orleisky, Practical Methods for Approximate Geometric Pattern Matching under Rigid Motion, In Proc. 10th Annu. ACM Sympos, Comput. Geom., pages 103–112, 1994"; "A. Efrat, Finding Approximate Matching of Points and Segments under Translation, Unpublished Manuscript, 1995". This is caused by too simple modelling of the problem. Here, among the different randomizing algorithms, the wrong negation, which is an algorithm of not reporting the transformation despite the presence of the transformation, as shown in "P. Indyk, R. Motowani and S. Venkatasubramanian, geometric Matching under Noise: Combinatorial Bounds and Algorithms, In SODA: Symposium of Data Structures and Algorithms 1999", which is an algorithm of is distinguished from the wrong affirmation which is an algorithm of reporting a wrong transformation for hiding some problem. In the latter case, prolonged time is needed to check whether or not the reported transformation is a correct one.

Theorem 1: Assume that S and Q are n-dimensional n-point set. At this time, detection of whether or not S=Q can be performed ultimately within $O(n^{floor[(d+1)/2]} \log n)$ time.

In "J. -D. Boissonnat and M. Yvinec, Algorithmic Geometry, Cambridge University Press, UK, 1998", there is shown the fact that the largest polyhedral exists on a d-dimensional sphere $S^{d-1}$.

An interesting problem is searching the spectrum of a function FS(k, ϵ) related to the self-similarity in accordance with the following equation (44):

$$F_S(k, \epsilon)=\{T\epsilon T|\exists S_\epsilon|S\cap T(S_\epsilon)|=k\} \quad (44)$$

in which $S_\epsilon$ is expressed as in the following equation (45):

$$S_\epsilon=\{S'_i,S'_i\epsilon\text{ball}(S_i\epsilon S,\epsilon)\} \quad (45).$$

This spectrum is related to both the noise allowing properties and the execution time of the geographic pattern matching algorithm. Let $f_S(k, \epsilon)=|F_S(k, \epsilon)|$. In particular, if an input can be deemed to be reliable, that is if ϵ=0 approximately holds, the notation of $F_S(k, 0)$ $F_S(k)$ is usable. If and only if a n-point set S for which $f_S(n)=r$, the n-point set has r-times similarity.

As a natural extension, the following definition of the equation (46):

$$F_{SQ}(k, \epsilon)=\{T\epsilon T|\exists S_\epsilon Q_\epsilon|S_\epsilon\cap T(Q_\epsilon)|=k\} \quad (46)$$

is used.

The density function thereof is as given in the following equation (47):

$$f_{S,Q}(k, \epsilon)=|F_{S,Q}(k, \epsilon)| \quad (47).$$

This is related with the concept "inner product" of the following equation (48):

$$\lambda^{(d,k-1)}(n, m)=\max_{|S|=n,|Q|=m,S,Q\in E}{}^d f_{S,Q}(k, 0) \quad (48)$$

where, as an example, the following equation (49):

$$F_{S,Q}(k, \epsilon)=|\{T\epsilon T|C(T,S,Q,\epsilon)=\text{true}\}| \quad (49)$$

is used.

In the above equation (49), its density function is expressed by the following equation (50):

$$f_{S,Q}(k, \epsilon)=|F_{S,Q}(k, \epsilon)| \quad (50)$$

where C(·) is the constraint condition dependent on non-combinatorial parameters, such as, for example, the zooming range, surface constraint, match diameter.

By so doing, constraint can be imposed not only on the matching combination, but also os numerical figures. For example, in a visual system, only the transformation in which the angle ranges from −30° to +30° and the zooming ranges from 1/4 to 4 is preferably reported. Moreover, all transformations satisfying C( ) are preferably reported in the dictionary editing order, such as (θ, zoom). This is termed the constrained pattern matching.

Next, detection of whether or not the set S is congruent with the subset of the set Q is explained. This generalizes the above-described "congruent problems". The "subset congruence problem" is defined in such a manner that, given two point sets S and Q, subsets Q' of the point set Q for which S≡Q' are found, one of them is shown and all of them are reported. For example, given a point set S, obtained on extracting features by an angle detection program from an image symbolizing a car and a point set Q showing a scene containing three copies of the point set, as shown in FIG. 25B, the above-mentioned problem is searching the point set S from the point set Q.

In the non-constrained d dimension, this geometrical problem is shown to be NP-complete by reduction to partial graphic congruence, as described in "Tatsuya Akutsu, On Determining the Congruence of Point Sets in d Dimensions, Comput. Geom. Theory Appl. 9(4):247–256, 1998".

If |S|=1, the problem is self-explanatory, such that there exist |Q| solutions. If |S|=2, the problem is more difficult both in theory and in application and is relevant to the maximum number of repetitive unit distances. This problem has once been proposed by Paul Erdos. This technique can be applied to a non-accurate input, acting on an assumption that the allowed precession is smaller than the smallest point-to-point distance. If $A_{min}=\max_{1=1}, \ldots, {}_d\min_{i,j=1}, \ldots, n,i\neq j}||Q_{i,1}-Q_{j,1}|$, precession up to a maximum of $A_{min}/2$ becomes allowable simply by integrating the coefficients O(d×d!), the reason is that there exist L∞nearest neighbor point which gives the same result as the L2 nearest neighbor point. In computing L∞ NN, all possible axis substitution is made and the nearest one obtained on executing d one-dimensional NN search in logarithmic time is selected for each substitution. In an inquiry for an orthogonal range for finding NN', wobbling of a point within $\epsilon \leq d_{min}/\sqrt{d}$ is allowed. It is noted that dmin is expressed by the following equation (51):

$$d_{min}=\min_{Qi,Qj\in Q,Qi\neq Qj}d_2(Q_i,Q_j) \quad (51).$$

Figure 26:
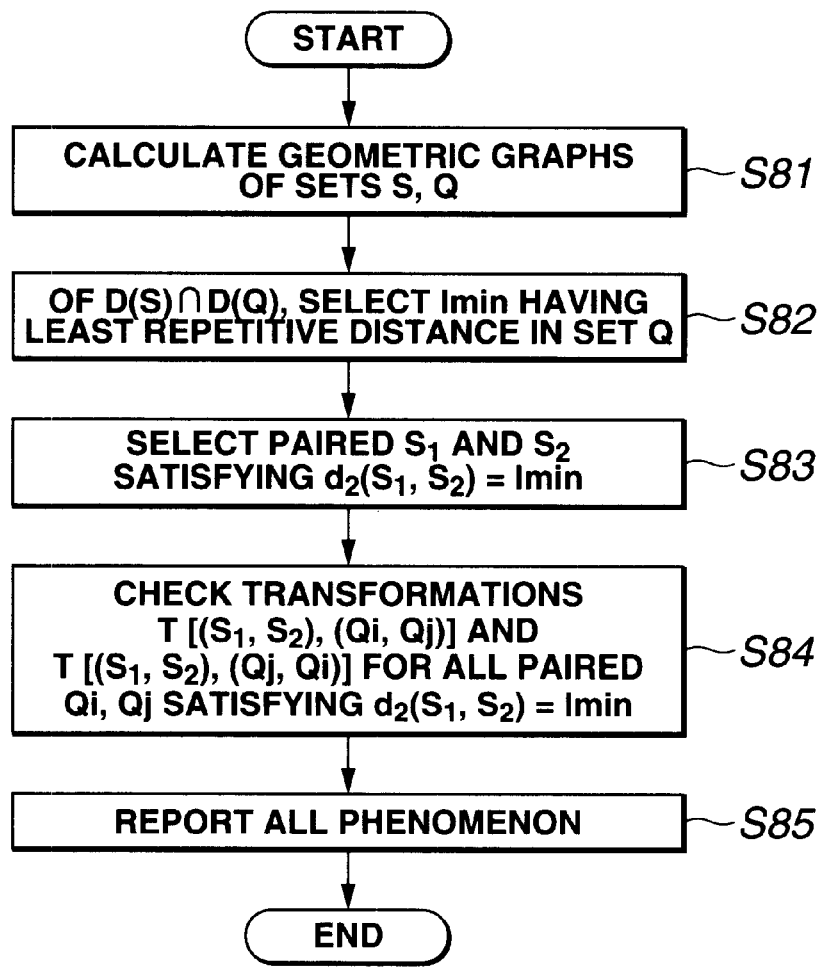
FIG. 26 is a flowchart for illustrating a sequence of processing operations in detecting subsets in case two sets are planar and do not permit zooming.

One of the features of the problem is that, although an outlier is present in the point set Q, there is no outlier in the point set S, that is all points in the point set Q are inliers, as shown in FIG. 25. The problem basically is made up of two problems, that is the problem of finding the matching transformation TϵT and solving the problem of subset matching. Meanwhile, as to the problem of the number of coordinates, there still is left the necessity of handling infinite alphabetical codes. The totality of the point set S should be matched and, given pairs of feature points $(S_1, S_2)$, $(Q_1, Q_2)$, there are two methods of completely matching them, such that, by using the methods, rigid transformation is determined by pairs $(S_1, S_2)$ of the point of S matched to the pair $(Q_1, Q_2)$ of the point set Q, the image processing apparatus 10 can detect whether or not the partial congruence exits by the sequence of processing operations of FIG. 26 if zooming is not allowed in the case of the planar point set.

First, the image processing apparatus 10 computes at step S81 a geometric graph of the sets S and Q and, by a listing algorithm, computes all of sorted $O(n^2)$ distances defined by the pairs of the points of the set S and all $(m^2)$ distances defined by pairs of the points of the set Q.

The image processing apparatus 10 the selects at step S82 $1_{min}$ of the values D(S)∩D(Q) of the common distances of the sets S and Q having the repetitive distance in the set Q having the minimum value kin represented by the following equation (52):

$$k_{min}=\min_{\epsilon D(S)\cap D(Q)}\{|D_Q(1)|\}=|D_Q(1_{min})| \quad (52).$$

Meanwhile, in case of constrained selection, such a value as has the maximum repetitive distance in the set Q is selected.

The image processing apparatus 10 at step S83 selects, from optionally selected point pairs $(S_1, S_2)$ of the set S, such pairs of $S_1$ and $S_2$ for which $d_2(S_1, S_2)=1_{min}$ holds. The image processing apparatus 10 checks into 2 $k_{min}$ transformations $T[(S_1, S_2), (Q_1, Q_2)]$ and $T[(S_1, S_2), (Q_1, Q_2)]$ defined by the $S_1, S_2$ pairs.

The image processing apparatus 10 at step S84 checks, for all $Q_1, Q_2$ pairs of the other pairs $(Q_i, Q_j)$ of the set Q for which $d_2(Q_i, Q_j)=1_{min}$, into all of the transformations $T[(S_1, S_2), (Q_i, Q_j)]$ and $T[(S_1, S_2), (Q_j, Q_i)]$.

The image processing apparatus 10 at step S85 checks into the partial congruence of each transformation and reports on all of the events to terminate the sequence of operations.

By so doing, the image processing apparatus 10 is able to search all events of the two-dimensional set S in the two-dimensional set Q.

The execution time for this algorithm is $O(m^2+k_{min}T_c(n, m))$. It is noted that $k_{min}=O(m^{4/3})$. On the other hand, $T_c(m,n)$ is the time necessary to search into one transformation. Meanwhile, $T_c(n,m)$ is also dependent on the allowed noise parameter and, if $\epsilon=0$, $T(n,m)=n \log m$ for a point set of an optional distance. Thus, this algorithm can be executed within $O(N^{7/3} \log N)$ time, thus improving the efficiency despite its simplicity. However, attention should be directed in this case to the fact that the scaling is here not allowed and the algorithm execution time depends on the maximum number of the repetitive distances of the common distance. That is, the spaced distance of the set Q here cannot be selected. If the smallest point-to-point distance is "1", the point set is said to be spaced by "1". In the image processing apparatus 10, these algorithms can be implemented using linear time memory and an optional time-listing algorithm.

It is noted that, if a pattern exists in a scene, attention should be directed to the fact that x common distances represented by at least the following equation (53):

$$x=(n/2) \tag{53}$$

is present in $D(S) \cap D(Q)$. The number of the different distances in the set S is known to be at least $\Omega(n^{4/5})$. Therefore, the smallest value of the same distance in the set S is $O(n^{2-4/5})=O(n^{1.2})$ at the maximum. On further meticulous search into $k_{min}$, it becomes apparent that $k_{min}$ is represented by the following equation (54):

$$k_{min}=O(\min\{m^{4/3}, m^2/n^{4/5}\}) \tag{54}$$

Therefore, if $m \ll n6/5$, $k_{min}$ is represented by the following equation (55):

$$k_{min}=m^2/n^{4/5}=\Omega(m^{4/3}) \tag{55}$$

Therefore, the upper limit of $k_{min}$ is $n^{1.2} \cdots m^{1.333} \cdots$, as shown in "J. E. Goodman and J. O. Rourke, editors, Handbook of Discrete and Computational Geometry, CRC Press LLC, Boca Raton, Fla., 1997".

This algorithm may be deemed to be the selection of a bar $S_1S_2$ (mechanism) in the point set S and lock of the selected bar in the point set Q.

The distance of the point set Q is denoted by $\Delta_Q$. The processing (bucketing) of the point set Q can then be executed in $O(\Delta^2)$ time, whilst a test of a transformation can be executed in $T_c(n,m)=O\Delta(n)$ time.

Figure 27:
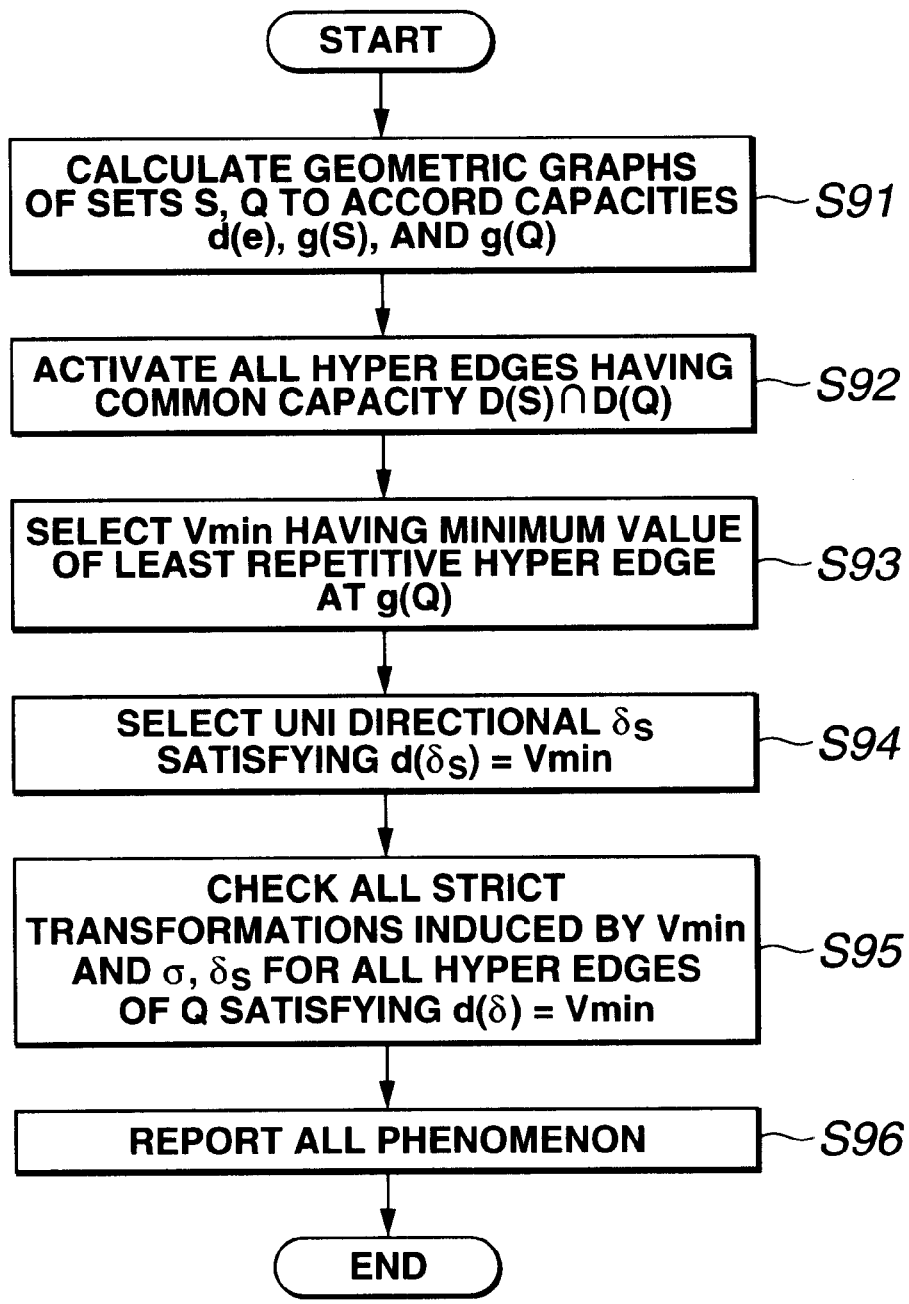
FIG. 27 is a flowchart for illustrating a sequence of processing operations in detecting large common subsets in case two sets are d-dimensional.

If the sets S and Q are d-dimensional, the image processing apparatus 10 is able to detect whether or not partial congruence holds by a sequence of process steps shown in FIG. 27.

First, the image processing apparatus 10 at step S91 computes the geometric graphs of the sets S, Q to afford capacities d(e), g(S) and g(Q) thereto.

The image processing apparatus 10 then activates at step S92 all hyper-edges which are the common capacity $D(S) \cap D(Q)$ of the sets S and Q.

The image processing apparatus 10 at step S93 then selects $V_{min}$ which is the smallest value of the repetitive hyper-edge at g(Q).

The image processing apparatus 10 at step S94 then selects the sole direction $\delta_S$ for which $d(\delta_S)=V_{min}$.

The image processing apparatus 10 at step S95 then checks all strict transformations induced by $V_{min}$, i and $\delta_S$ for all hyper-edges e of the set Q for which $d(i)=V_{min}$.

The image processing apparatus 10 at step S96 then checks into partial congruence for each transformation and reports on all events to terminate a sequence of operations.

By so doing, the image processing apparatus 10 is able to search all events of the d-dimensional set S in the d-dimensional set Q.

Theory 2: If S is a n-point set of the two-dimensional space $E^2$ and Q is a m-point set of the two-dimensional space $E^2$, decision on whether or not the point set S is in the point set Q can be made within $O(M^2+\min(m^{4/3}, m^2/n^{4/5})T_c(n,m))$ time for an optional point set. If diameter(S)=diameter (Q), such decision can be made within $O(m \log m+mTc(n, m))$ time, while it can be made within $O(m \log m+\min(m \log m, m^2/n))$ for a convex portion.

The above-described results represent improvement as to $m \ll n^{6/5}$, based on the concept of "T. Akutsu, H. Tamaki and T. Tokuyama, Distribution of Distances and Triangles in a Point Set and Algorithms for Computing the Largest Common Point Set, In Proc. 13th Ann. ACM Symps. Comput. Geom., pages 314–323, 1997".

There are two limting factors in the image processing apparatus 10. The first is initially computing in particular the geometric graph of the set Q and the second is independently testing the possible transformations respectively.

If $k_{min}$ is small or $m \ll n$, it is unnecessary to compute all of the x and y distances represented by the following equations (56) and (57):

$$x = \binom{m}{2} \tag{56}$$

$$y = \binom{n}{2} \tag{57}$$

which are geometrical graphs of the sets S and Q. First, the image processing apparatus 10 picks up pairs of optional points $(S_1, S_2)$ of the set S. The image processing apparatus 10 then makes degenerated cyclic inquiry for all $i \in [1, m]$. That is, the image processing apparatus 10 makes an inquiry into a circle having a center Qi and a radius $d_2 (S_1, S_2)$. The maximum number of the common distances 1 is relevant to the probability of occurrence of n points in m circles. This is known to be limited by $O(n^{2/3}+m^{2/3}+n+m)$.

As a method which replaces this geometric inquiry, an algorithm dependent on an output shown in "T. M. Chan, On Enumerating and Selecting Distances, In Proc. of Comp. Geo., 1988" may be used to list only the selected distances. Given the distance 1, the image processing apparatus 10 is able to report on the t2 pairs having the same distance in the set Q within $O(n^{4/3} \log^{8/3} n)$ time. That is, a $O(n^{4/3} \log^{8/3} n+t_2 n \log m)$ time can be realized, as discussed in "T. Akutsu, H. Tamaki and T. Tokuyama, Distribution of Distances and Triangles in a Point Set and Algorithms for Computing the Largest Common Point Set, Discrete and Computational Geometry, pages 207–331, 1998". The limitation is output dependent by $O(n \log+n^{2/3} k^{1/3} \log^{6/3} n)$, as may be seen from reference to "T. M. Chan, On Enumerating and Selecting Distances, In Proc. of the 14th Symp. of Comp. Geo., 1998".

Figure 28:
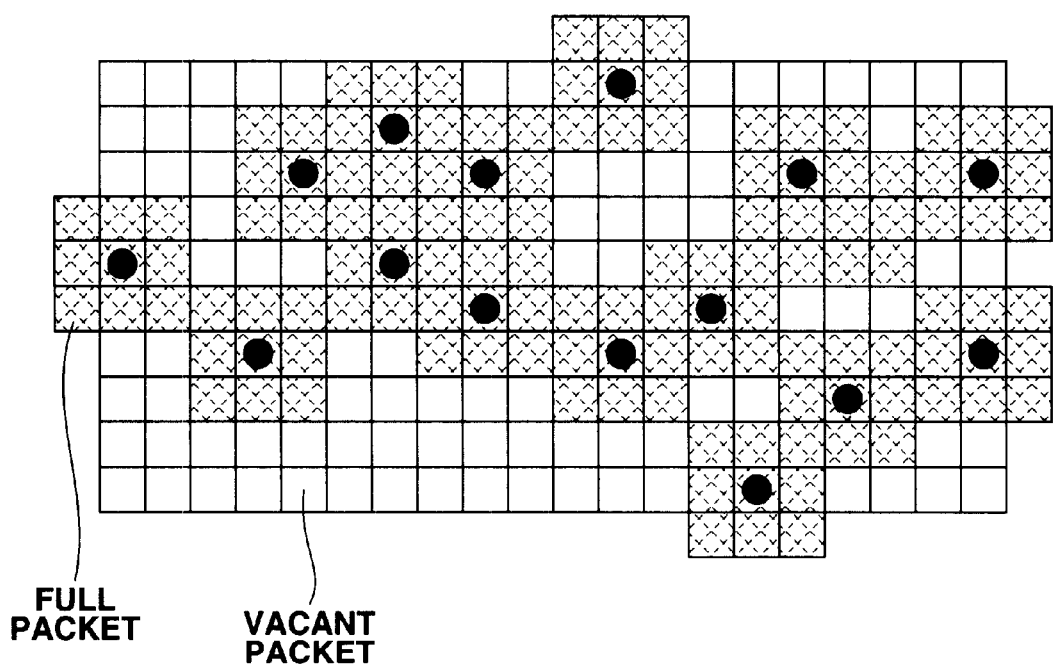
FIG. 28 shows an example of a Boolean bucket.

Another technique is preparing a bucket, using a lattice or a multi-lattice, as described above. Since only one point at the maximum is present at each position of the bucket, a Boolean bucket, as shown for example in FIG. 28, suffices. The image processing apparatus 10 makes a sole inquiry for each point of the set Q, for each inquiry $S_1 S_2$, and executes a sum total of O(n) inquiries, to check into the positions of O(nΔ) in the bucket.

In actuality, given pairs ($S_1$, $S_2$) of feature points, the image processing apparatus 10 selects all point pairs ($Q_1$, $Q_2$) for which $|d_2(S_1, S_2) - d_2(Q_1, Q_2)| \leq \gamma$, where $\gamma \geq 4$ on range zooming. This is done by making inquiries for all points in a circle having a center $Q_i$, an inner radius of $d_2(S_1, S_2) - 2\epsilon$ and an outer diameter of $d_2(S_1, S_2) + 2\epsilon$, where $Q_i$ is each point in the set Q. In one method, the distances $D_S$, $D_Q$ are sorted and all pairs in a distance range of from $1-2\epsilon$ and $1+2\epsilon$ in the set Q within O(log n+k). Therefore, the executing time of the present primitive method is $O(m^2 \log m + kT_c(n, m))$. If execution of the pattern matching algorithm is limited to within the zooming range [$Z_{min}$, $Z_{max}$], the image processing apparatus 10 performs the following range inquiries with respect to the given point pairs $S_1 S_2$ ($b = d_2(S_1, S_2)$). That is, the image processing apparatus 10 reports on all point pairs $Q_i Q_j$ of the set satisfying $(b-2\epsilon)*Z_{min} \leq d_2(Q_i, Q_j) \leq (b+2\epsilon)*Z_{max}$. It is also possible for the image processing apparatus 10 to impose angle limitations on $Q_i Q_j$ of $S_1 S_2$. For example, the image processing apparatus 10 limits the angle so that the tilt will not differ by not less than 30°.

Figure 29A:
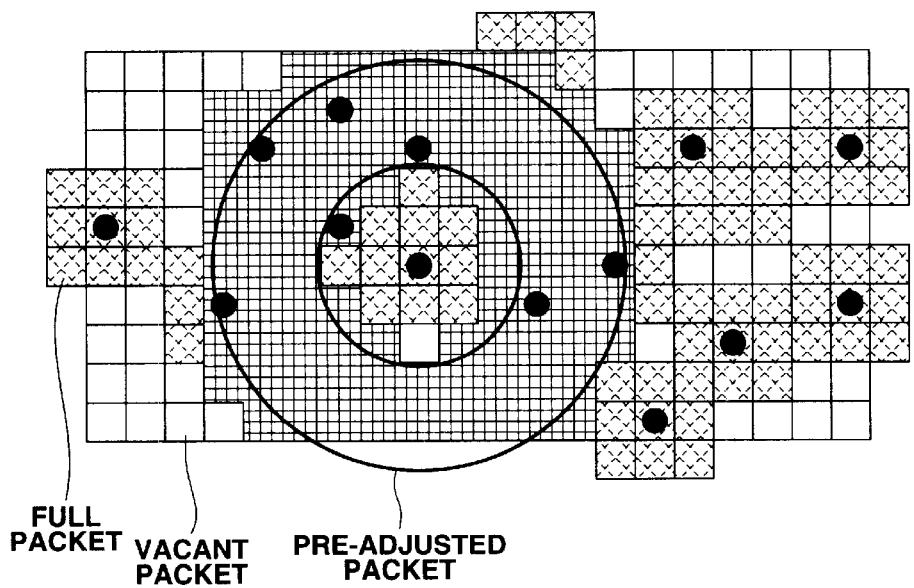
FIGS. 29A and 29B show an example of annulus or ring query, where
Figure 29B:
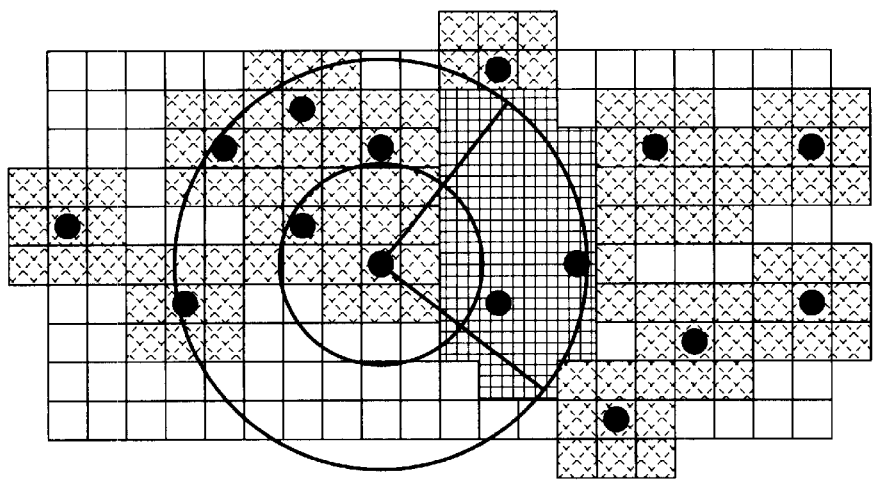

A data structure for cyclic inquiry is explained. The problem of "cyclic inquiry" is "reporting on all points in a ring for cyclic inquiries when a n-point set in $E^2$ is given", as in a sector inquiries shown in FIGS. 29A and 29B.

To this end, the image processing apparatus 10 is able to use a data structure shown in "P. Gupta, R. Janardan and M. Smid, On intersection Searching Problems Involving Curved Objects, In Proc. 4th Scand. Workshop Algorithm Theory, Volume S24 of lecture Notes Comput. Sci., pages 183–194, Springer Verlag, 1994" or in "P. Gupta, R. Janardan and M. Smid, Further Results on Generalized Intersection Searching Problems: Counting, Reporting nd Dynamization, J. Algorithms, 19: 282–317, 1995". The inquiry time necessary in reporting t points in the inquiry ring is O(log n+t $\log^2$ n), with the necessary pre-processing time being O($n^3$/log n). For counting numbers, the counting time of O($n^2$/log n) is required after the pre-processing time of O($n_4 \log^2$n). The task here is reporting all point pairs pq within a range of $d-2\epsilon$ and $d+2\epsilon$.

Examples of grouping and inquiries are shown below. The image processing apparatus 10 prepares p groups, with the maximum size being |n/p|, and executes processing of the total cost of O($n^3/p^3$ log n/p) for each group. The image processing apparatus 10 then reports on all of pq point pairs for which d(p,q) ∈R holds for a distance range of R=[$d-2\epsilon$, $d+2\epsilon$]. The image processing apparatus 10 executes m times of cyclic inquiries for the point set Q once for each point pair Qi∈Q. Therefore, the total cost is ($n^2$/p log n/p+t $\log^2$n/p) time. For balancing the inquiry time and the pre-processing time, it suffices if p is selected to satisfy the following equation (658):

$$O\left(\frac{n^3}{p^3 \log \frac{n}{p}}\right) = O\left(\frac{n^2}{p} \log \frac{n}{p} + t \log^2 \frac{n}{p}\right). \qquad (58)$$

At this time, the following two cases may arise. That is, if $t \leq n^2/(p \log n/p)$, $p = n^{1/2-\epsilon}$ is selected, in which case a $O(n^{3/2+\epsilon})$ time algorithm is acquired. If $t \geq n^2/(p \log n/p)$, $p = n/t^{1/3-\epsilon}$ is selected, in which case a $O(t \log^2 t)$ time algorithm is obtained.

Since the value of t is not known at the outset, the image processing apparatus 10 executes gross estimation, by $t \approx 2^{2(i/2)}$ ($i \leq 2\log \log t$). This method has an advantage that an output-dependant algorithm is obtained for a large value of t.

The bottleneck of this algorithm is evaluation of each transformation is expensive if the evaluation is carried out independently. Thus, the image processing apparatus 10 may f\refrain from executing the evaluation of each transformation independently.

It is assumed that $T(t_2)$ is a set of transformations reported by the above-described algorithms. The i19 selects the bars of different lengths D(S), one at a time, and executes iterative processing in the following manner. In the image processing apparatus 10, a number of different transformations $t_2^{(1)}, \ldots, t_2^{(1)}$ are obtained. The image processing apparatus 10 assumes that there exists a pattern and selects an initial one of analogous distances D(S)∩(Q). The image processing apparatus 10 then computes a common portion represented by the following equation (59):

$$T = \cap_{i \in [1, \ldots, t]} T(t_2^{(i)}) \qquad (59).$$

Meanwhile, attention should be directed to the fact that this algorithm reports on the entire copying of partial congruence.

Figure 30:
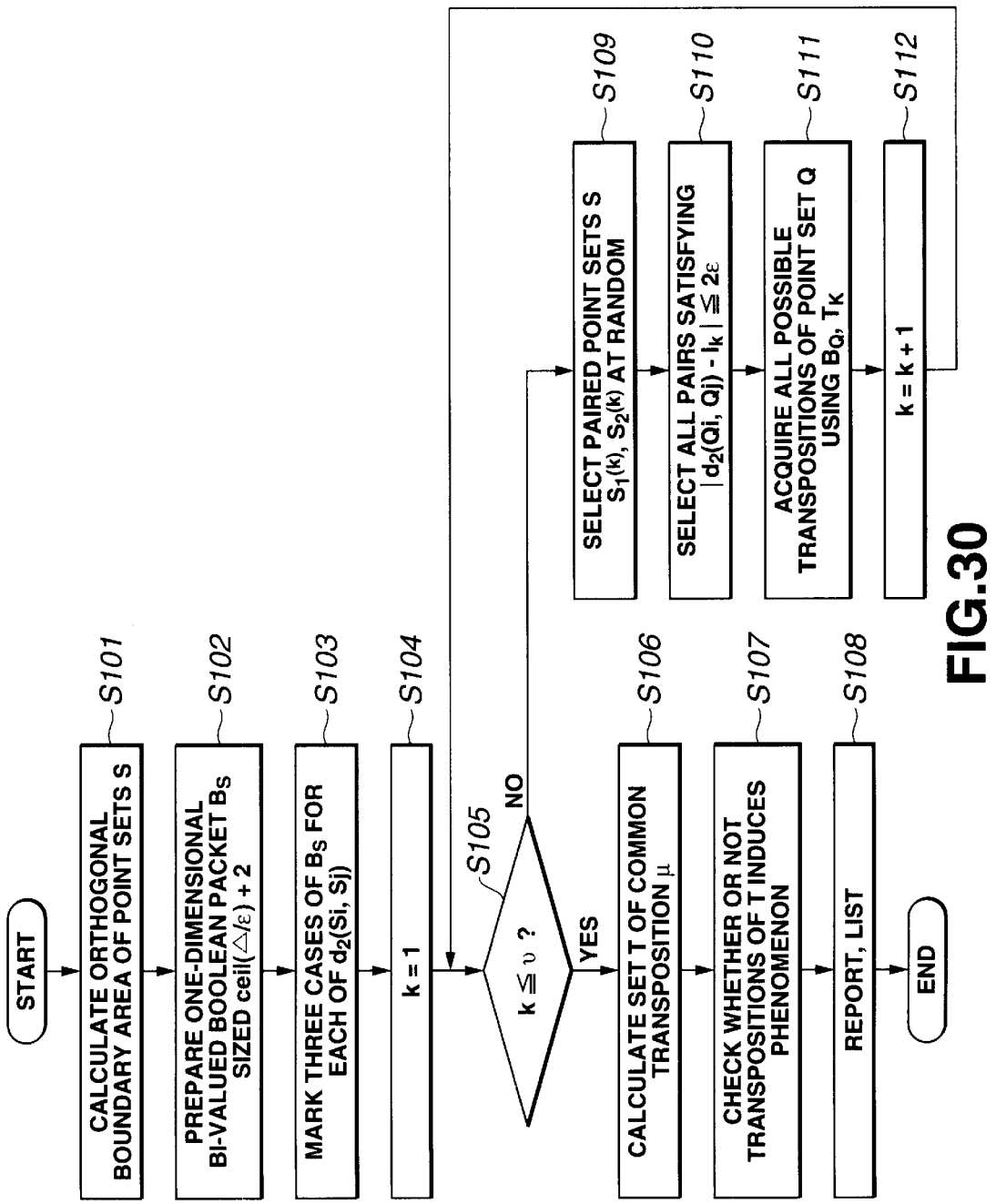
FIG. 30 is a flowchart for illustrating a sequence of processing operations in effecting pattern matching including translation and/or rotation in an image processing apparatus.

Specifically, the image processing apparatus 10 executes the sequence of operations of FIG. 30 to effect pattern matching including translation and/or rotation. It is assumed that the two-dimensional point sets S∈, Q∈ contain each a wobbling ∈.

The image processing apparatus 10 at step S101 first calculates an orthogonal boundary area of the point set S having a maximum side length b, with the upper limit of the diameter of the point set S being such that $\Delta = \sqrt{(2b)}$.

The image processing apparatus 10 at step S102 formulates a one-dimensional bi-valued Boolean bucket $B_S$ having the size of ceil[$\Delta/\epsilon$]+2 and having all dimensions set to an initial value of "0". This Boolean bucket $B_S$ is used for bucketing of a point-to-point distance.

The image processing apparatus 10 at step S103 affixes sets an index of a point-to-point distances $d_2(S_i, S_j)$ of an optional ($S_i$, $S_j$), with $S_i \neq S_j$, to 1=floor[$d_2(S_i, S_j)/\epsilon$], and affixes marks BS[1-1], BS[1] and BS[1+1]. The image processing apparatus 10 then formulates a list of point-to-point distances for each bucket $B_S$. It is noted that the point-to-point distance list is void in an initial state.

The image processing apparatus 10 at step S104 sets k=1 as an initial state value.

The image processing apparatus 10 then checks whether or not k≤ν, where ν is a predefined constant value.

If k≤ν does not hold, the image processing apparatus 10 shifts to step S109 to select involute point sets S, that is $S_1^{(k)}$, $S_2^{(k)}$ at random. The image processing apparatus 10 at step S110 sets $1_k = d_2(S1^{(k)}, S_2^{(k)})$, while setting $1b_k = $floor$[1_k/\epsilon]$. The image processing apparatus 10 checks into all pairs ($Q_i$, $Q_j$) of $P_S(1b_k - 1) \cup PS(1b_k) \cup PS(1b_k + 1)$ to select all pairs for which $|d_2(Q_i, Q_j) - 1_k| \leq 2\epsilon$. The set of transformations defined by these points is represented by $T_k$. Since it is assumed here that a pre-set zooming is used, it suffices to consider only the rotation and translation as parameters.

The image processing apparatus 10 at step S111 uses $B_S$ and Tk to acquire all of possible translation of the point set Q.

The image processing apparatus 10 at step S112 sets k=k+1 to repeat the processing as from step S105.

If k≦v is found to hold at step S105, the image processing apparatus 10 computes at step S106 a set T of the common translation μ represented by the following equation (60):

$$T = \cap_{\mu, k=1}^{v} T_k \quad (60).$$

For computing the set T of the common transformation μ, it is necessary to define when analogousness of two transformations become μ times. Two transformations $T_1$, $T_2$ re said to have analogousness μ when $d_2(T_1(P), T_2(P)) \leq \mu$ for all p∈S, the image processing apparatus 10 performs approximate inspection by sequentially inspecting the angles of the boundary boxes of the point set S in place of by inspecting all points of the point set S.

The image processing apparatus 10 then checks at step S107 whether or not transformations of T induces events. The image processing apparatus 10 performs this check by bucketing the point set S or by effecting 21–d times. Of buckets are used, each bucket has a width of ε.

The image processing apparatus 10 lists reports or transformations at step S108 to terminate a sequence of operations.

By so doing, the image processing apparatus 10 is able to perform pattern matching, including translation and/or rotation, in the two-dimensional point sets Sε, Qε each having a wobbling ε.

The time complexity in listing all matched transformations using this algorithm is $O((\Delta_S/\epsilon + n^2 + m^2 + v + tt' + t'T_c(n, m))$. Attention should be directed at this time that $\Delta_Q \geq \Delta_S$. However, if μ is 0, the image processing apparatus 10 sorts the matrix and calculates T represented by the following equation (61):

$$T = \cap_{=0, k=1}^{v} T_k \quad (61)$$

within O(t log t') time. Therefore, the time complexity is $O((\Delta_S/\epsilon) + n^2 + m^2 + v + (t \log t') + t'T_c(n, m))$.

It is noted that e is fixed at $\epsilon = d_{min}/2$, where $d_{min} = \min(d_{minS}, d_{minQ})$.

Figure 31:
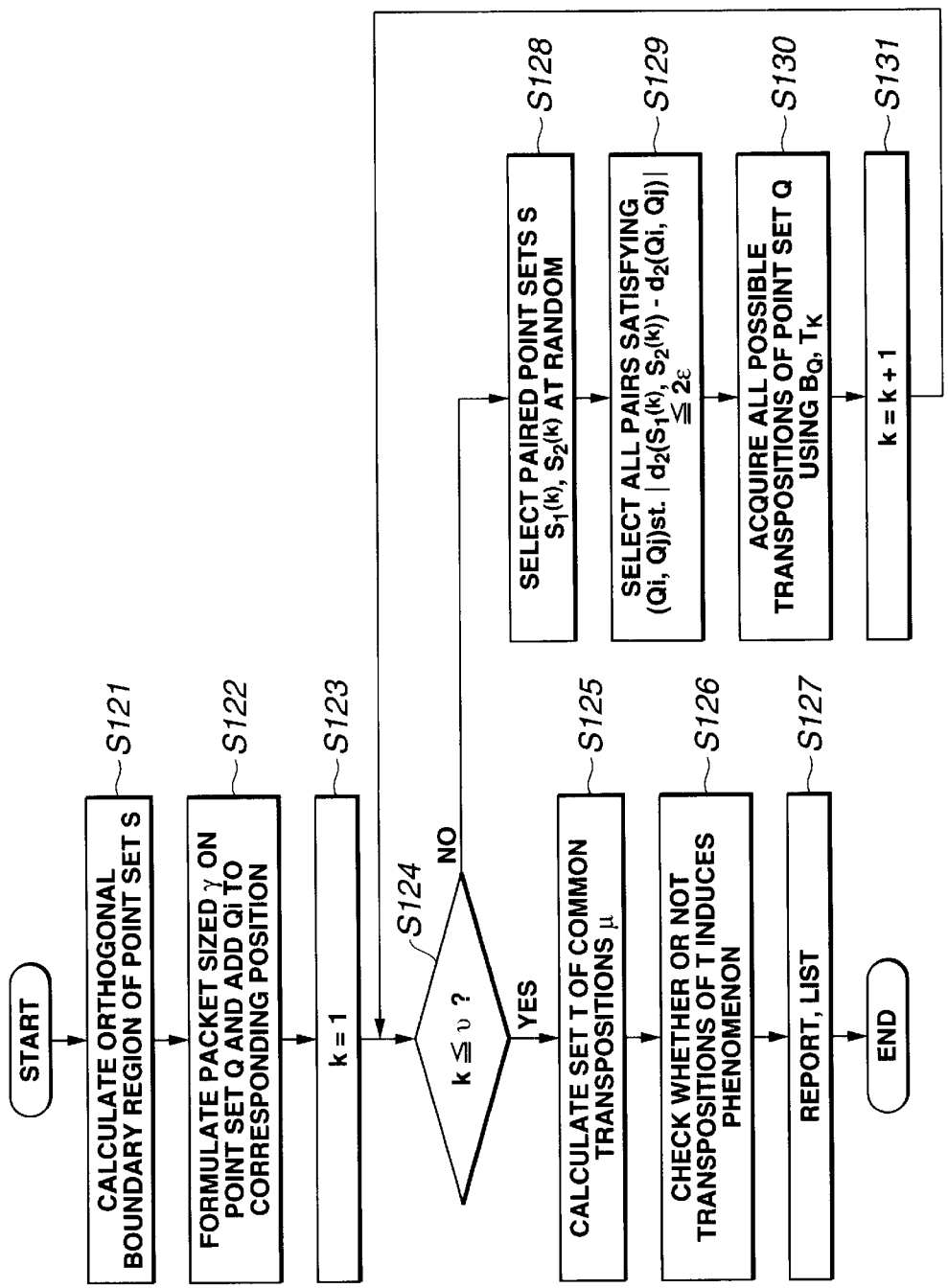
FIG. 31 is a flowchart for illustrating a sequence of processing operations in performing pattern matching including translation and/or rotation for a high point set density in the image processing apparatus.

In the image processing apparatus 10, for a large point set density, such as is encountered if $N^2$ is larger than the RAM memory size or in real-time operation, it is desirable to execute a sequence of operations shown in FIG. 31.

First, at step S121 in FIG. 31, the image processing apparatus 10 calculates the orthogonal boundary area of a point set S, having a maximum side length equal to b, 1and sets the upper limit of the diameter of the point set S to $\Delta = \sqrt{(2b)}$.

The image processing apparatus 10 at step S122 formulates a bucket $B_Q$ of a size γ on the point set Q and adds Qi at a corresponding position for each Qi∈Q. Attention should be directed to the fact that plural point may exist in one bucket.

The image processing apparatus 10 at step S123 sets the initial stage value to k=1.

The image processing apparatus 10 at step S124 verifies whether or not k≦v, where v is a predefined value.

If k≦v fails to hold, the image processing apparatus 10 shifts to step S128 to select pairs of $S_1^{(k)}$, $S_2^{(k)}$ of point sets at random.

The image processing apparatus 10 at step S129 sets $1_k = d_2(S_1^{(k)}, S_2^{(k)})$ and, using the bucketing method, retrieves all pairs for which $(Q_i, Q_j)$ s.t. $|d_2(S_1^{(k)}, S_2^{(k)}) - d_2(Q_i, Q_j)| \leq 2\epsilon$. The transformation set, thus obtained from the point sets, is Tk.

The image processing apparatus 10 at step S130 acquires all possible translations of the point set Q, using $B_Q$ and Tk.

The image processing apparatus 10 at step S131 sets k=k+1 to repeat the processing as from step S124.

If it is verified at step S124 that k≦v, the image processing apparatus 10 at step S125 computes a set T of common translations A represented by the above equation (59). The image processing apparatus 10 performs approximate inspection by sequentially inspecting the angles of the boundary boxes of the point set S, rather than by inspecting all points of the point set S, as at step S106 in FIG. 30. Meanwhile, accurate check as to whether or not the similarity is μ is only possible by checking points on a convex closure.

The image processing apparatus 10 at step S126 checks whether or not transformation of T induces an event. The image processing apparatus 10 performs this check by bucketing the point set S or by 21–d/2 search. If a bucket is used, each bucket has a width ε, as indicated previously and shown in FIG. 28.

The image processing apparatus 10 at step S127 reports and lists the transformations to terminate the sequence of operations.

The execution time of this algorithm is $O((\Delta_Q/\gamma)^2 + v + tt' + t'T_c(n, m))$. The parameter γ needs to be tuned depending on actual objectives. The image processing apparatus 10 estimates γ by passing through the sequence of operations shown in FIG. 32.

First, the image processing apparatus 10 at step S141 initializes γ by the program or by the user.

The image processing apparatus 10 at step S142 sets the number of transformations to be tested to Wσ.

The image processing apparatus 10 at step S143 verifies whether or not Wσ×check>CT(γ), where Wσ is the number of possible candidates and check is the time required for checking one transformation.

CT(γ) is the time required to obtain to count the number of possible candidates (i.e. it depends on parameter γ).

If Wσ×check>CT(γ), the image processing apparatus 10 at step S144 acquires a better smaller value of γ. That is, the image processing apparatus 10 sets γ=γ/2 or sets an optional value selected from point coordinates to γ. The image processing apparatus 10 then repeats the processing as from step S148.

If Wσ×check>CT(γ) does not hold, the image processing apparatus 10 at step S145 returns γ to terminate the sequence of operations.

In this manner, the image processing apparatus 10 is able to estimate γ so as to be as fast as possible.

The image processing apparatus 10 effects pattern matching to perform so-called scene analysis.

If the image processing apparatus 10 assumes that the point set is dense and distributed evenly, that is that $\Delta = \sqrt{(n)}$, it can refine the complexity analysis as follows:

That is, each bucket has $n\gamma^2/\Delta^2$ points on an average. Since the image processing apparatus 10 checks nΔ/γ of these points, there is obtained a super-set of involute points with a size of $n^2\gamma/\Delta$. Thus, by setting $\gamma = \Delta/n^{2/3}$, the image processing apparatus 10 can balance the pre-processing cost, that is $O((\Delta/\gamma)^2$ with the inquiring cost. Thus, if the value of v is small, the algorithm complexity is $O(n^{4/3} + (t \log t') + t'T_c(n, m))$. Attention should also be directed to $t \leq n^{4/3}$. With the image processing apparatus 10, the number of pairs to be checked can be counted easily.

This method can be applied on all dimensions. However, in higher dimensions, a d-dimensional simplex, rather than the simple bar system, needs to be handled. If the number of dimensions exceeds four, the number of the same distances defined by a sole point set is increased quadratically. In the Las Vegas and Monte Carlo method, the latest accurate boundary technique for universally using the randomness is disclosed in T. Akutsu, H. Tamaki and T. Tokuyama, Distribution of Distances and Triangles in a Point Set and Algorithms for Computing the Largest Common Point Set, In Proc. 13th Ann. ACM Symps. Comput. Geom., pages 314–323, 1997" and in "T. Akutsu, H. Tamaki and T. Tokuyama, Distribution of Distances and Triangles in a Point Set and Algorithms for Computing the Largest Common Point Set, Discrete and Computational Geometry, pages 207–331, 1998".

Also, given $\epsilon$ such that $\epsilon>0$, there may occur wobbling of points which might possibly lead to numerous degradations. Such wobbling may prove a factor possibly retarding the pattern matching algorithm. The matching of a pattern corrupted with noise is finer than the matching to the correct patten not corrupted with noise. Another method is allowing the same matching for all wobblings when $\epsilon'$ is given. The image processing apparatus 10 is adapted to perform only stable matching by limiting the $\epsilon$ boundary to one of 0, $D_{min}/2\sqrt{2}$, Amin/2 and dmin/2.

In the above-described algorithm, scaling is not taken into consideration, as when the partial congruence of a subset S or a partial congruence of a different size of a set S shown in FIG. 33A is contained in a set Q shown in FIG. 33B. Thus, in the following, partial congruence when doing uniform scaling is explained. If scaling is allowed, the problem solving method differs from that shown above. In this case, it is no longer possible to fix a bar above the set in order to check the transformation. The reason is simple and is that, if S is a set composed of two points, there exist x correct matches represented by the following equation (62):

$$x = \binom{m}{2} \qquad (62)$$

in the set Q. It is now tried to achieve a more efficient algorithm by combining the results. According to Elekes and Erdos, the number of analogous triangles is $\Omega(n^2)$, with the number of similar triangles being $\theta(n^{3/2})$. Thus, in the image processing apparatus 10, the algorithm is changed depending on the largest number $t_3$ of similar triangles of the set S. First, the image processing apparatus 10 computes the geometric graph of the sets S and Q in $O(N^2)$ time and associates a one-dimensional graph defined by an angle of cyclic consecutive points with each point $Q_i \epsilon Q$. The image processing apparatus 10 affixes connotations on the respective distances for the respective nodes.

If the triangle $T_s=(S_1, S_2, S_3)$ of the set S is selected, the image processing apparatus 10 simply executes the following processing. Meanwhile, if there exists a set S, such triangle appears in the set Q. First, the image processing apparatus 10 searches for all analogous triangles in the set Q. By each match, six possible rigid motions to be checked are defined. The total cost of this algorithm is $O_k(N^2 \log N+t_3T_c(n, m))=O(N^3 \log N)$. The image processing apparatus 10 may also simply select k subsets of the set S, in place of selecting the triangle, to execute the similar algorithm with the total cost $O_k(N^2 \log N+t_kT_c(N, M))$. Meanwhile, $t_k=\Omega(n)$ and, for a larger value of k, matching is at a boundary below the repetitive unit distance. The executing time of this algorithm is $O(N^{2+\epsilon}\log N)$.

Let $r=d_2(S_1, S_2)/d_2(S_1, S_2)$ and $\alpha=\angle S_2S_1S_3$. Meanwhile, it has been known that an angle $\alpha$ can be found within the maximum of $O(n^2 \log n)$ time.

Figure 34:
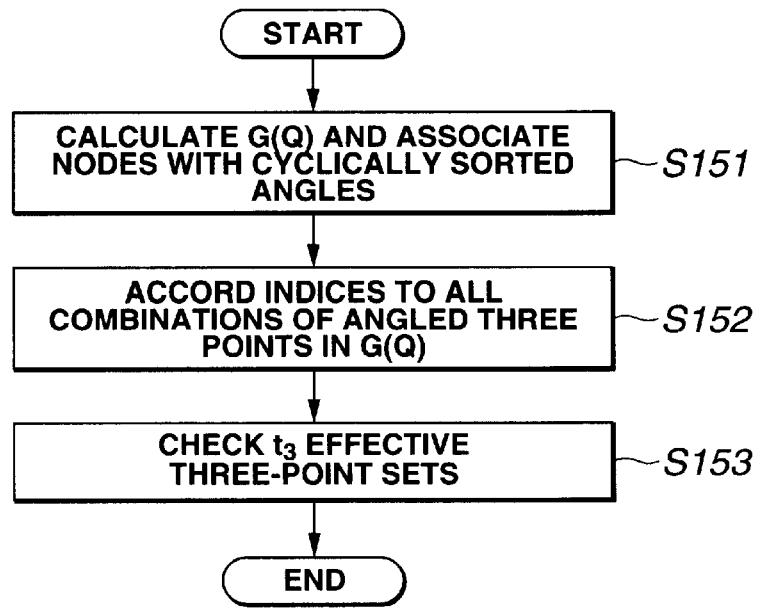
FIG. 34 is a flowchart for illustrating a sequence of processing operations in detecting the partial congruence in the image processing apparatus.

The image processing apparatus 10 detects partial congruence by passing through the sequence of operations shown in FIG. 34.

Referring to FIG. 34, the image processing apparatus 10 at step S151 computes G(Q) and relates the list of the cyclically sorted angles to each node. The image processing apparatus 10 sorts repetitive angles in the radial direction.

The image processing apparatus 10 at step S152 labels all of the combinations of three angled points in G(Q) within $O(m^2 \log m)$ time. The image processing apparatus 10 confirms whether or not the ratio of the three-point combinations is equal to r or 1/r. The ratio of a triangle xab to an apex x is given by the ratio of the length of sides incident on x, namely by $d_2(x, a)/d_2(x, b)$. Meanwhile, there are numerous three-point sets lying on the same straight line. This is the problem of pattern matching on S1. A set of transformations obtained by a triangle recognized to be valid is denoted $T_S(\Gamma)$.

The image processing apparatus 10 checks at step S153 all $t_3$ valid three-point sets to terminate the sequence of processing operations.

The total algorithm cost at this time is $O(m^2 \log m+t_3T_c(n, m))=O(N^3 \log N)$ time.

Figure 35:
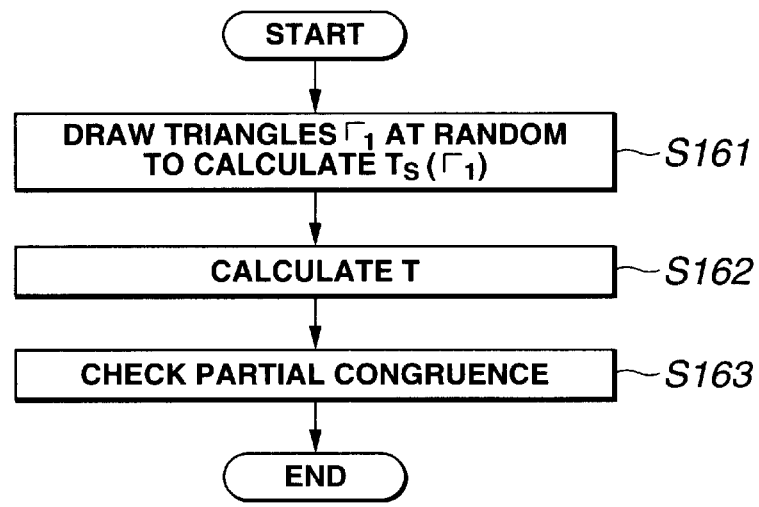
FIG. 35 is a flowchart for illustrating a sequence of processing operations in detecting the partial congruence in the image processing apparatus and specifically for illustrating a sequence of processing operations improved by applying an iterative method.

In actuality, there exists an absolute error $\epsilon$ such that $|T_S(\Gamma)|$ increases. Thus, the image processing apparatus 10 executes a sequence of operations, improved by using an iterative method shown in FIG. 35, to detect partial congruence.

First, the image processing apparatus 10 at step S161 randomly draws a triangle $\Gamma_i$ in the set S from i to 1 to calculate $T_S(\Gamma_i)$.

The image processing apparatus 10 at step S162 computes T represented by the following equation (63):

$$T = \cap_{i \in [1, \ldots, l]} T_S(\Gamma_i) \qquad (63).$$

The image processing apparatus 10 at step S163 checks into partial congruence of all transformations $T \epsilon TS$ to terminate the sequence of operations.

The execution time of this method is $O(1N^2 \log N+|T|T_c(n, m))$.

Figure 36:
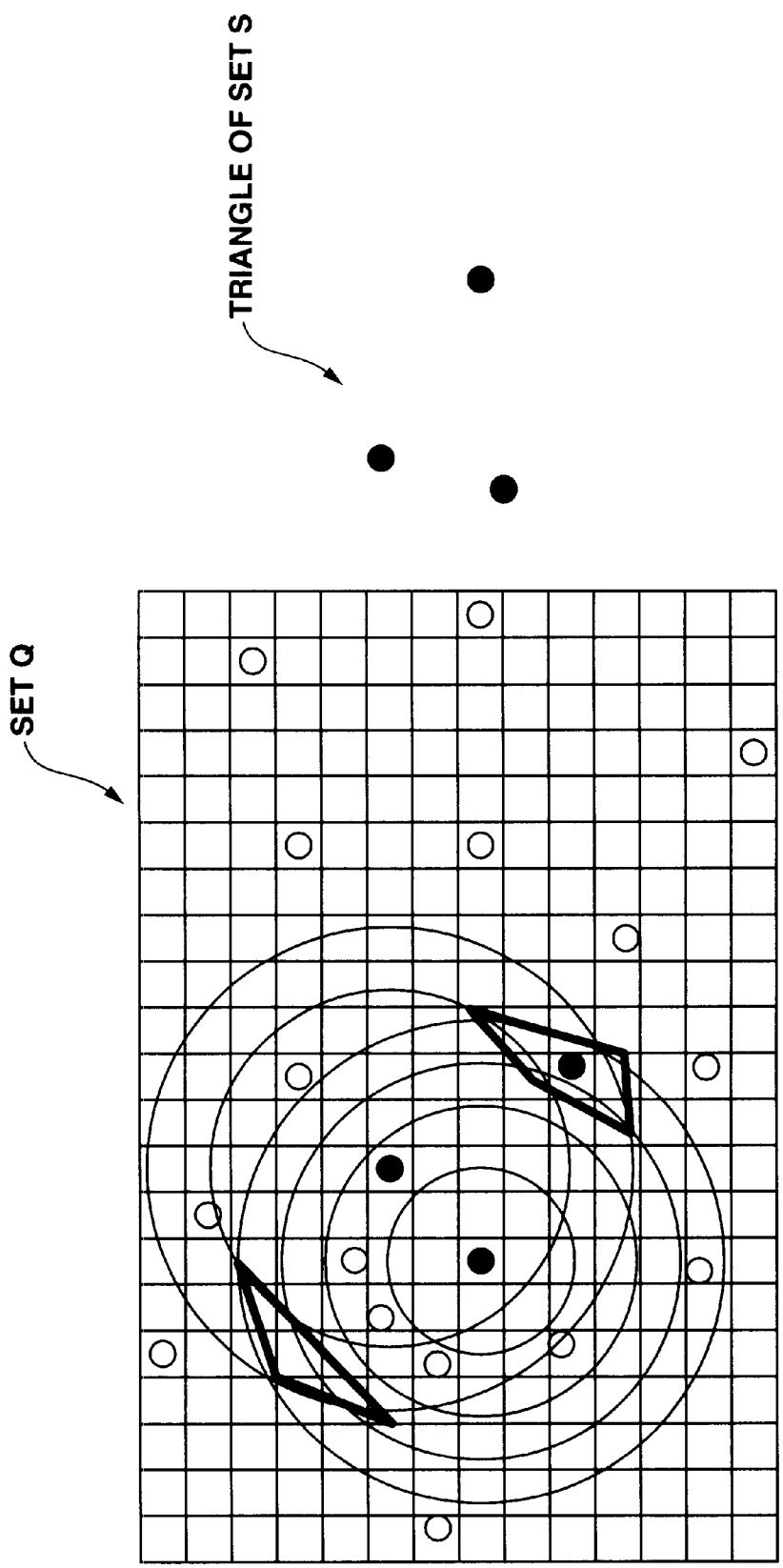
FIG. 36 illustrates an example of an inquiry for another subset of a set by a triangle.

Given a triangle, the image processing apparatus 10 can find out analogous triangles in the set Q by inquiries, as shown in FIG. 36. In actuality, the image processing apparatus 10 finds out matched congruent triangles and matched mirrored congruent triangles. The image processing apparatus 10 also inquires, starting from a selected sole point $Q_i$, whether or not there is $Q_2$ in a ring defined by $|d_2(S_1, S_2)-d_2(Q_1, Q_2)| \leq 2\epsilon$. For each point, obtained by this inquiry, the image processing apparatus 10 selects all points $Q_3$ in two combined elements defined by two mutually intersecting rings $|d_2(S_1, S_3)-d_2(Q_1, Q_3)| \leq 2\epsilon$ and $|d_2(S_2, S_3)| \leq 2\epsilon$.

By sweeping from an intersecting point of two geometric rings, the image processing apparatus 10 is able to execute this processing within O(1) time. Therefore, the algorithm executing time remains unchanged. If, when a subset composed of p points, the ith point is to be selected, an algebraic intersection of x rings, represented by the following equation (64):

$$x = \binom{i-1}{2} \qquad (64)$$

is computed. However, with $i \geq 3$, collapsing to a sole domain occurs.

It is now tried to search into all simplexes analogous with $\sigma_S=(S_1, \ldots, S_d)$ and to anchor an analogous simplex to each point $Q_i \epsilon Q$. For the simplex anchored to an analogous simplex, the image processing apparatus 10 initially finds out all Q2s present in the Ring($Q_1$, $d_2(S_1, S_2)-2\epsilon$, $d_2(S_1, S_2)+2\epsilon$). There are up to a maximum number of $O(\Delta^{d-1})Q_2s$.

The image processing apparatus 10 then finds $Q_3$ present in a common portions of the rings, that is $(Q_1, d_2(S_1, S_3)-2\epsilon, d_2(S_1, S_3)+2\epsilon) \cap ring(Q_1, d_2 (S_2, S_3)-2\epsilon, d_2(S_2, S_3)+2\epsilon)$. If bucketing is executed, there exist up to a maximum of $O(\Delta^{d-2})Q_3$s. The image processing apparatus 10 repeatedly performs this processing to find out $Q_i$ present in a common portion represented by the following equation (65):

$$\bigcap_{j=1}^{i=1} Ring(Q_1 d_2(S_j, S_i) - 2\varepsilon, d_2(S_i, S_j) + 2\varepsilon). \tag{65}$$

There exist up to a maximum of $O(\Delta^{d-1})$ such $Q_i$s. Therefore, there exist at the anchor point $Q_1$ a number represented by the following equation (66):

$$O\left(\sum_{i=0}^{d-1} \Delta^i\right) = O\left(\Delta^{\frac{d(d-1)}{2}}\right). \tag{66}$$

That is, up to a maximum of $O(n^{\Delta d(d-1)/2})$ of simplices analogous to σs in the set Q.

The largest common point set (S, Q) is explained. That is, the largest value of |S'| satisfying S'⊆S, Q'⊆Q, S'≡Q' is found. This is termed the "largest common point set problem". The problem of finding the largest one of common point sets of given k sets is known to be NP complete as described in "T. Akutsu and M. M. Halldorsson, On the Approximation of largest Common Subtrees and Largest Common Point Sets, In Proc. 5th Annu. Internet. Sympos. Algorithm Comput., Volume 834 of the Lecture Notes Comput. Sci., pages 405–413, Beijing, China, 1994, Springer-Verlag".

Let us now consider the following largest common point set problem: "Given two d-dimensional point sets S, S, find out the largest subset S'⊆S for which S'≡Q⊆Q".

The simple obvious algorithm in which x transformations represented by all of the following equations (67):

$$x = 2\binom{n}{2}\binom{m}{2} \tag{67}$$

and selecting the best one or voting takes $O(N^5 \log N)$ time, where $N=\max(n, m)$.

Let us now consider the following decision problem: That is, "given two d-dimensional point sets S, Q, is there any for which S'⊂S, Q'⊂Q, |S'|=|Q'|=k and S'≡Q'?"

Figure 37:
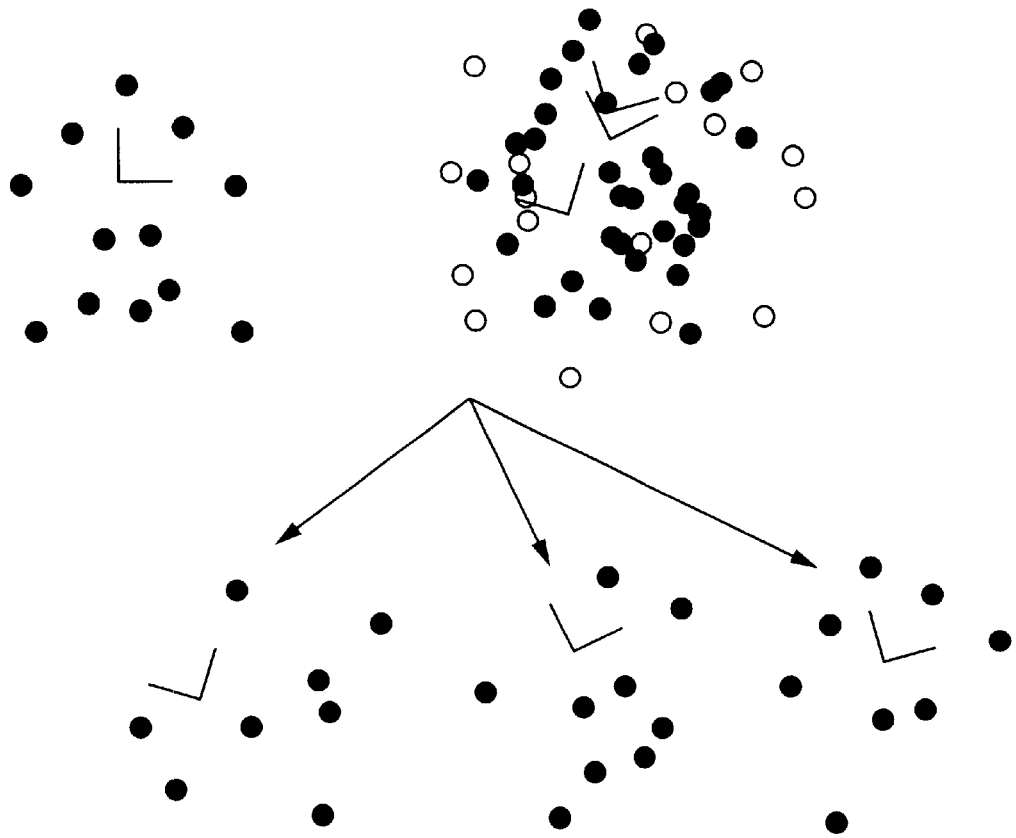
FIG. 37 shows an example of a maximum common point set and specifically shows a set of the largest common points and a set of the next largest common points.

FIG. 37 shows, as an example of the largest common point set, the largest common point set and the second largest common point set. The largest common point set can be found within $O(\log n)T_D(n, m)$ time, where $T_D(n,m)$ is the time necessary to solve the decision problem.

Figure 38:
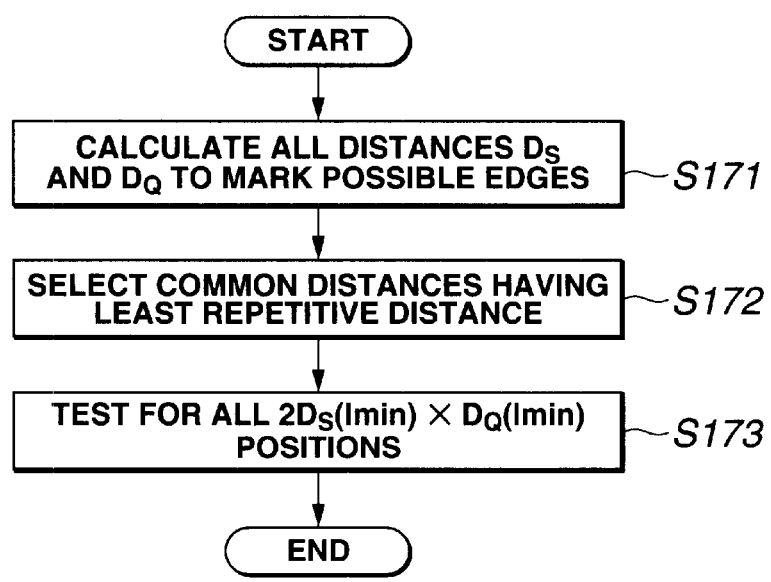
FIG. 38 is a flowchart for illustrating a sequence of processing operations in each stage in solving a decision problem.

An algorithm for solving the decision problem is hereinafter proposed. The image processing apparatus 10 executes stage-wise processing, as described above. Each stage is as shown in FIG. 38.

The image processing apparatus 10 at step S171 computes all of $O(n^2)$ distances $D_S$ of the set S and the $O(m^2)$ distances $D_Q$ of the set Q if $e \in D_S \cap D_Q$, an edge value 2 is likely to occur. The image processing apparatus 10 marks all possible edges and eliminates unlikely edges from $D_S$ and $D_Q$.

The image processing apparatus 10 at step S172 selects, from the common distances of the sets S and Q, those having the smallest number of iterative distances represented by the following equation (68):

$$D_S(1_{min})*D_Q(1_{min})=\min_{1 \in DS(1) \cap DQ(1)}\{(D_S(1)*D_Q(1)\} \tag{68}$$

The image processing apparatus 10 at step S173 tests all of $2D_S(1_{min})*D_Q(1_{min})$ positions. The time $T_c(n,m)=O(n \log m)$ time is needed to compute the matching size for a sole position, where in is the size of the matching in this stage.

At the next stage, the image processing apparatus 10 limits the matching size to at least in to select other distance values, In carrying out a test on the distance $d=d_2(p_i, p_j)$, the image processing apparatus 10 eliminates part of the outliers to simplify the point set to improve the speed of the algorithm. It is known that, if no large "matching" is present, at least one of the points is an outlier. Similarly, all analogous distances, that is $D_S$–$D_Q$, necessarily has one outlier point and is known if scaling is not allowed. The time complexity of the algorithm is $O(N \log N \times N^{16/9} N^{2-4/3})$, that is $O(N^{31/9} \log n) = O(n^{3.445} \log n)$ time.

On the other hand, the image processing apparatus 10 exploits the majority decision method as follows: That is, the image processing apparatus 10 discretizes the space of rotation by small rotational quantity $O(\Delta)$. For a fixed quantity of rotation, the image processing apparatus 10 applies the well-known Ballad's technique. For point pairs $S \in S$, $Q \in Q$, the image processing apparatus 10 considers all transformations T[S, S'; Q, Q'], T[S,S'; Q', Q]for which Q' is present in a ring Ring(Q, $d_2(S, S')-2\epsilon$, $d_2(S, S'; Q', Q]$. Each time such transformation is found. The image processing apparatus 10 adds a vote. The image processing apparatus 10 finally selects or reports the entire transformation which has acquired the maximum number of votes. For example, a transformation having the number of votes equal to p has a common point set having a size of p+1.

The largest common point set on zooming is explained. Here again, an analogous triangle is selected. The majority decision algorithm, analogous to the s-called Hough's method, is applied to it.

All of the algorithms, described previously, all have execution time dependent on the concept of partial symmetry. If at least two transformations are matched to at least two points, these transformations being modulo rotation matrix TR, these two transformations are said to exhibit partial symmetry.

Therefore, if a transformation T∈T matched to a point is found, that is if, with |M|=r, S∩T(Q)=M, it is possible to compute the rotational transformation matched to r points of M having point subset Q' of Q defined by the following equation (69):

$$Q'\{Q_i | d_2(c_M, Q_i) = d_2(c_M, M) \text{ for some } M \in M\} \tag{69}$$

It is noted that the symmetry set T (M) of M has already been added for evading carrying out transformation calculations twice, the image processing apparatus 10 holds the transformation list in a memory.

A random limitation arraying method is explained. It is assumed that k denotes the number of point pairs required in defining the transformation T∈T. For example, for uniform scaling in translation and rotation, that is zooming, k=2. It is assumed that a % of the points is matched. In this case, the image processing apparatus 10 can acquire transformations that meet the conditions at a probability of $1-\alpha^k$. In checking into the k-subset, the image processing apparatus 10 first checks into the subset with a size of r, if transformation matches a % of points. If this subset matches at least β %, the image processing apparatus 10 carries out tests on all sets. If this subset fails to match at at least β %, the image processing apparatus 10 discards this transformation. The image processing apparatus 10 repeats the processing O(1) time. That is, a t-time algorithm indicated by the following equation (70):

$$t = O_{\alpha\beta}\left(k!\binom{m}{k}C(m, r) + lc(m, n)\right) \quad (70)$$

is obtained. The following equation (71):

$$0 \leq l \leq k!\binom{n}{k} \quad (71)$$

is a cost in measuring the accuracy of the matching algorithm. The image processing apparatus 10 can similarly perform the measurement using the birthday paradox method, and repeatedly samples x points of both sets represented by the following equation (72):

$$x = O_\alpha(\sqrt{\sqrt{n}}) \quad (72)$$

It is assumed that one is interested only in a transformation T∈T meaningful in a certain application. For example, one is interested in a transformation in which $|d(T(S_i), T(SD_j)) - d(S_i, S_j)| \leq \omega$, where ω is a quantity dependent on input reliability. The image processing apparatus 10 initially selects points Q1∈Q and then selects, as candidates for Q2, only points inside a ring centered about this point $Q_1$ and having an inner radius $d(S_1, S_2) - \omega$ and a width 2ω, instead of testing all of k-subsets $(S_1, \ldots, S_k)$ of Q. The image processing apparatus 10 repeatedly performs this processing to make inquiries for the set Q in a geometric range which imposes the above-mentioned limitations on the transformation T. It is assumed that the following equation (73):

$$0 \leq t \leq k!\binom{n}{k} \quad (73)$$

is the number of the sets of k points of Q satisfying the above limitations, where t is a quantity dependent on the self-similarity of the point set Q.

For example, assume that k=2. Given point pairs $(S_1, S_2)$, taken randomly from the set S, the image processing apparatus 10 searches point pairs $(Q_1, Q_2)$ of Q for which $|d((Q_1, Q_2) - d(S_1, S_2)| \leq \omega$. Ideally, all point pairs of Q such that the distance is between $d(S_1, S_2) - \omega$ and $d(S_1, S_2) + \omega$ are listed. Thus, the image processing apparatus 10 executes the processing in the following manner. That is, the image processing apparatus 10 sequentially selects the points of Q and draws a ring having a radius $d(S_1, S_2) - \omega$ and a width 2ω with respect to the current point $Q_i$. The image processing apparatus 10 reports on all points of Q within this ring. Meanwhile, assume that t is the number of points reported in all stages. If ω=0, t also is limited by the number of distance repetitions in the fully geographical graph. Also, t is limited by the maximum occurrence ratio of m circles each having m points. This occurrence ratio is known to be $O(M^{4/3}) = o(m^2)$. According to Erdos, this value is supposed to be $O(n^{1+\epsilon})$. The image processing apparatus 10 formulates a data structure, based on the method described in "P. Gupta, R. Janardan and M. Smid, On Intersection Searching Problems Involving Curved objects, In Proc. 4th Scand. Workshop Algorithm Theory, volume 824 of Lecture Notes Comput. Sci., pages 183–194, Springer-Verlag, 1994", and reports on t point pairs to be tested. This technique can be generalized in optional dimensions. However, for d≧4, the number of unit distances is given by quadratic functions.

This inquiring method can also be used for checking whether or not the given transformation T is matched, in such case, O(1) points are initially checks and the extension is made to the entire set. Although the geometric filtering can be used as a general technique, it needs to be tuned in agreement with specified applications.

Thus, the image processing apparatus 10 is able to detect the largest common point set to synthesize an image to generate a panoramic synthesized image or a perspective synthetic image having superior perspective feeling.

Next, conditional geometric hashing is explained. The geometric hashing is first introduced in "Y. Lamadan and H. J. Wolfson, Geometric Hashing: a general and Efficient Model-Based Recognition Scheme, In 2nd Inter. Conf On Comput. Vision, pages 238–249, 1988" and further developed and improved by "Y. Lamdan, J. T.Schwartz and H. J. Wolfson, Object recognition by Affine Invarient Mapping, In Proc. IEEE Internat. Conf. Comput. Vision Pattern. Recogn., pages 335–344, 1988" or in "Y. Lamadan and H. L. Wolfson, On the Error Analysis of geometric Hashing, In Proc. IEEE Intern. Conf. Comput. Vision Pattern. Recogn., pages 22 to 27, 1991". The geometric hashing can be used in making multiplexed inquiries between a fixed point set Q, that is a model, and a variety of scenes, that is the point set S. Here, a method for formalizing for application of the geometric limitations to the geometric hashing is shown. The geometric hashing is roughly divided into a pre-processing stage and an inquiry stage. The pre-processing stage maps a model to itself, whilst the inquiry stage answers on the possible presence of matching in a short time. The transformation from Q to S is defined by two k-point sets.

As the pre-processing of the model Q, the image processing apparatus 10 selects an optional set QT from the k-point set of Q, the image processing apparatus 10 then inspects all of possible k! transformations, or all possible permutations, of the k-point set of Q, the image processing apparatus 10 formulates a set $T_i(Q)$ for $Q_T$ and a given transformation $T_i$, which is a transformation obtained from another k-point set, and stores a label "$T_i$" in a hash table for each point P∈$T_i(Q)$. That is, the image processing apparatus 10 stores the label "$T_i$" in H(P), using a Cartesian coordinate.

As an inquiry of the scene S, the image processing apparatus 10 checks all of the k-point sets of S to search all of the transformations $T_i'$ to a scene from a model which is the transformation concerning $Q_T$, the image processing apparatus 10 prepares a set $T_i'(S)$ for each transformation $T_i'$ to store the set in the hash table. More accurately, the image processing apparatus 10 sequentially checks into all points Pj∈$T_i'(S)$ to add a vote one-by-one to each transformation stored in the H($P_j$). After searching all of the transformations $T_i'$, the image processing apparatus 10 selects or lists the transformation having the maximum number of votes. Finally, the image processing apparatus 10 directly transforms the model to the scene, as will be explained subsequently.

The operation of the geometric hashing basically is derived from the fact that the transformation space is a group in which its optional transformation can be resolved into two transformations $T = T_1 \times T_2$ so that the transformation space can be deemed to be a product of matrices. For mapping a point set from the model $T_Q$ to a point set of the scene $T_S$, the image processing apparatus 10 first maps $T_Q$ to $Q_T$, as a reference set in Q, and then maps $Q_T$ to $T_S$. This gives the following equation (74):

$$T_{T_Q \to T_S} = T_{Q_T \to T_S} T_{T_Q \to T_S} \quad (74)$$

Meanwhile, the geometric filtering technique can be applied to the above-described geometric hashing. If, for example, processing is desirably carried out at a constant zooming, it is only sufficient if the image processing apparatus 10 searches on the hash table into the transformation of a zooming ratio of 1/b corresponding to the current transformation of the zooming ratio of b represented by the following equation (75):

$$T_{Q_T \to T_S}^{-1} = T_{T_S \to Q_T} \quad (75).$$

The term of $\epsilon$ is also replaced by $\epsilon/b$. Since the complete hash table is difficult to formulate since it consumes time and memory capacity significantly, the image processing apparatus 10 uses a random method, that is a subset Q' of the model Q. thus, the image processing apparatus 10 searches the hash table whether or not the S is matched satisfactorily with Q'. If S is matched satisfactorily to Q', the image processing apparatus 10 searches all pairs. If S is not matched satisfactorily to Q', there is a risk that the image processing apparatus 10 loses correct transformation. However, the probability of such loss is sufficient low as described in "Sandy Irani and Prabhakar Raghavan, Combinatorial and Experimental Results for Randomized Point Matching Algorithms, In Proc. 12th Annual ACM Symposium on Computational Geometry, pages 68–77, 1996".

With the image processing apparatus 10, as described above, plural image data can be synthesized efficiently to generate synthesized image data. This image processing apparatus 10 can be applied not only to the synthesis of plural image data, but to object identification, data compression and scene analysis. For example, the image processing apparatus 10 can be applied to mosaicking.

The present invention is not limited to the above-described embodiments. Fe, it can be applied not only to synthesis of two image data, such as image data I1 and I2, but also to synthesis of two or more image data to synthesize combined image data. In such case, the image can be synthesized efficiently by the above-described processing.

What is claimed is:

1. An image processing method comprising:
   a feature extracting step of extracting feature points of two or more images;
   a matching step of comparing feature points of one of the two or more images to those of other images for effecting matching;
   a computing step of performing computations for varying the relative position between said one image and the other image based on the results of said matching step;
   wherein said matching step detects the largest one of common point sets between a feature point group made up of all feature points on said one image and feature point groups made up of all feature points on said other images; and
   wherein said matching step includes a distance computing step of computing all of distances of the feature points making up the feature point group of said one image and the feature points making up the feature point groups of the other images;
   a selecting step of selecting a common distance having the smallest number of the repetitive distances from common distances common to the distances of the feature points making up a feature point group for said one image, as computed by said distance computing step, and to the distances of the feature points making up feature point groups for the other images, similarly as measured by said distance computing step; and
   a testing step of testing all positions equal in number to twice said smallest number of the repetitive distances; said matching step detecting said largest common point set.

2. The image processing method according to claim 1 further comprising:
   an overlapping step of overlapping at least portions of said two or more images prior to said feature extracting step;
   said feature extracting step preferentially extracting feature points lying in overlapping portions formed on at least partially overlapping said two or more images by said overlapping step and in the vicinity thereof.

3. The image processing method according to claim 1, wherein said matching step effects Hausdorff matching to synthesize said two or more images.

4. The image processing method according to claim 1 wherein
   said matching step effects bottleneck matching to synthesize said two or more images.

5. The image processing method according to claim 1 wherein
   said computing step causes translation and/or rotation of said one and the other images on a space, based on the results of said matching step, to vary the relative position between said one image and the other images.

6. The image processing method according to claim 5 wherein
   said computing step executes affine transformation or adjusts the perspective relation to carry out computations such as to change the relative position between said one image and the other images.

7. An image processing apparatus comprising:
   feature extracting means for extracting feature points of two or more images;
   matching means for comparing feature points of one of the two or more images to those of other images for effecting matching; and
   computing means for performing computations for varying the relative position between said one image and the other image based on the results of matching by said matching means;
   wherein said matching means detects the largest one of common point sets between a feature point group made up of all feature points on said one image and feature point groups made up of all feature points on said other images; and
   wherein said matching means computes all of distances of the feature points making up a feature point group of said one image and the feature points making up feature point groups of the other images, selects a common distance having the smallest number of the repetitive distances from the computed common to the computed distances of the feature points making up a feature group for said one image and to the computed distances of the feature points making up feature point for the other images; testing being made for all positions equal in number to twice said smallest number of the repetitive distances to detect said largest common point set.

8. The image processing apparatus according to claim 7 further comprising:
   overlapping means for overlapping at least portions of said two or more images;
   said feature extracting means preferentially extracting feature points lying in overlapping portions formed on at least partially overlapping said two or more images by said overlapping means, and in the vicinity thereof.

9. The image processing apparatus according to claim 7, wherein said matching process effects Hausdorff matching to synthesize said two or more images.

10. The image processing apparatus according to claim 7 wherein
said matching process effects bottleneck matching to synthesize said two or more images.

11. The image processing apparatus according to claim 7 wherein
said computing means causes translation and/or rotation of said one and the other images on a space, based on the results of said matching means, to vary the relative position between said one image and the other images.

12. The image processing apparatus according to claim 11 wherein
said computing means executes affine transformation or adjusts the perspective relation to carry out computations such as to change the relative position between said one image and the other images.

* * * * *